US008100552B2

(12) United States Patent
Spero

(10) Patent No.: US 8,100,552 B2
(45) Date of Patent: Jan. 24, 2012

(54) MULTIPLE LIGHT-SOURCE ILLUMINATING SYSTEM

(75) Inventor: Yechezkal Evan Spero, Mobile Post HaNegev (IL)

(73) Assignee: Yechezkal Evan Spero, Tifrach (IL)

( * ) Notice: Subject to any disclaimer, the term of this patent is extended or adjusted under 35 U.S.C. 154(b) by 0 days.

(21) Appl. No.: 10/604,360

(22) Filed: Jul. 14, 2003

(65) Prior Publication Data

US 2004/0105264 A1 Jun. 3, 2004

Related U.S. Application Data

(60) Provisional application No. 60/395,308, filed on Jul. 12, 2002.

(51) Int. Cl.
*F21V 21/00* (2006.01)
*F21V 9/00* (2006.01)

(52) U.S. Cl. ............... 362/231; 362/249.02; 362/276; 362/227

(58) Field of Classification Search .......... 362/276, 362/234, 230, 231, 800, 249.02, 235, 545, 362/227
See application file for complete search history.

(56) References Cited

U.S. PATENT DOCUMENTS

| 5,561,346 | A | * | 10/1996 | Byrne | 362/252 |
| 5,577,832 | A | * | 11/1996 | Lodhie | 362/249 |
| 5,749,646 | A | * | 5/1998 | Brittell | 362/231 |
| 5,921,660 | A | * | 7/1999 | Yu | 362/227 |
| 6,149,283 | A | * | 11/2000 | Conway et al. | 362/236 |
| 6,227,679 | B1 | * | 5/2001 | Zhang et al. | 362/236 |
| 6,340,868 | B1 | * | 1/2002 | Lys et al. | 362/234 |
| 6,379,022 | B1 | * | 4/2002 | Amerson et al. | 362/231 |
| 6,483,439 | B1 | * | 11/2002 | Vukosic | 340/815.65 |
| 6,498,440 | B2 | * | 12/2002 | Stam et al. | 315/291 |
| 6,499,860 | B2 | * | 12/2002 | Begemann | 362/230 |
| 6,820,998 | B2 | * | 11/2004 | Chen | 362/276 |
| 2001/0014019 | A1 | * | 8/2001 | Begemann | 362/231 |

* cited by examiner

*Primary Examiner* — Bao Q Truong

(57) ABSTRACT

A method and apparatus is provided for a multiple light-source illuminating device, the design and construction of which is derived from the lighting requirements of a specific lighting application. The resulting illuminating device (16) provides illumination according to the principles of lighting practice for the optimal performance of visual tasks. Coupling with sensors (21) and logical control (20) allows illumination intensity and spectrum to be varied according to changing user needs. The illuminating device includes multiple discrete light emitting components of different spatial intensity distribution and color spectrum mounted in specific orientations such that the application oriented combined lighting effect is created. The control is provided via a differentiated power supply (19) capable of affecting the current, voltage and duty cycle determining the relative contribution of each light source effecting a different spatial intensity distribution and color spectrum.

13 Claims, 14 Drawing Sheets

PRIOR ART
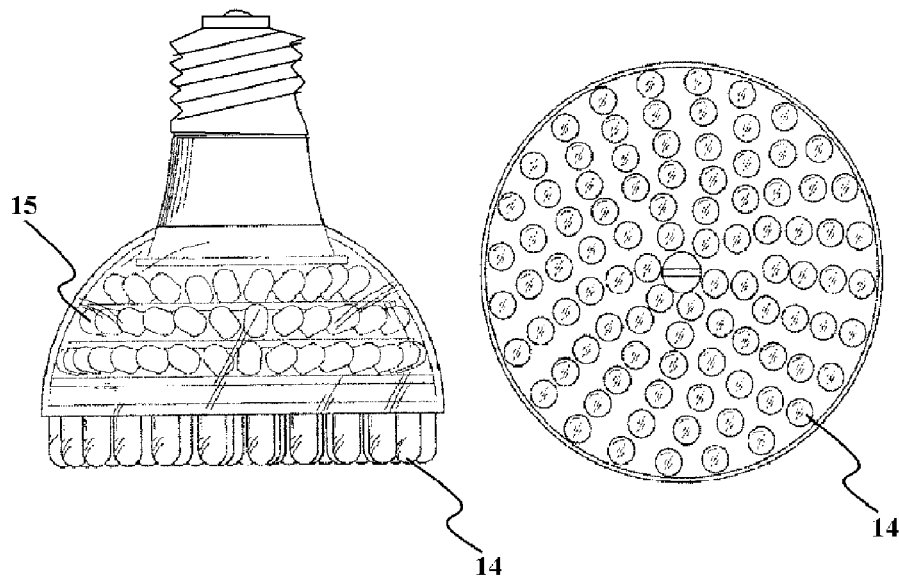
FIG. 2A
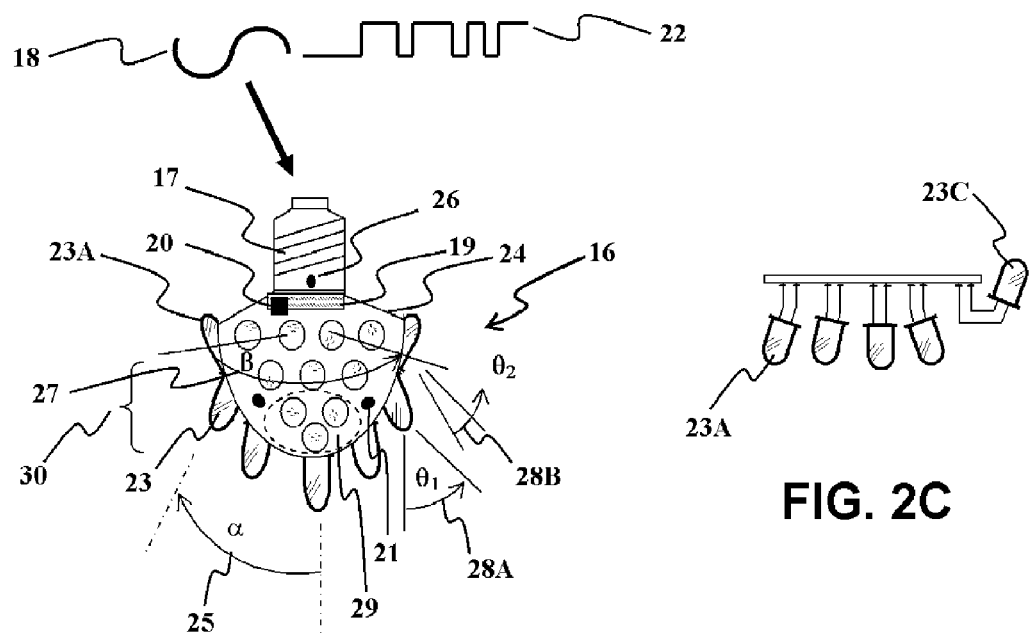
FIG. 2B
FIG. 2C

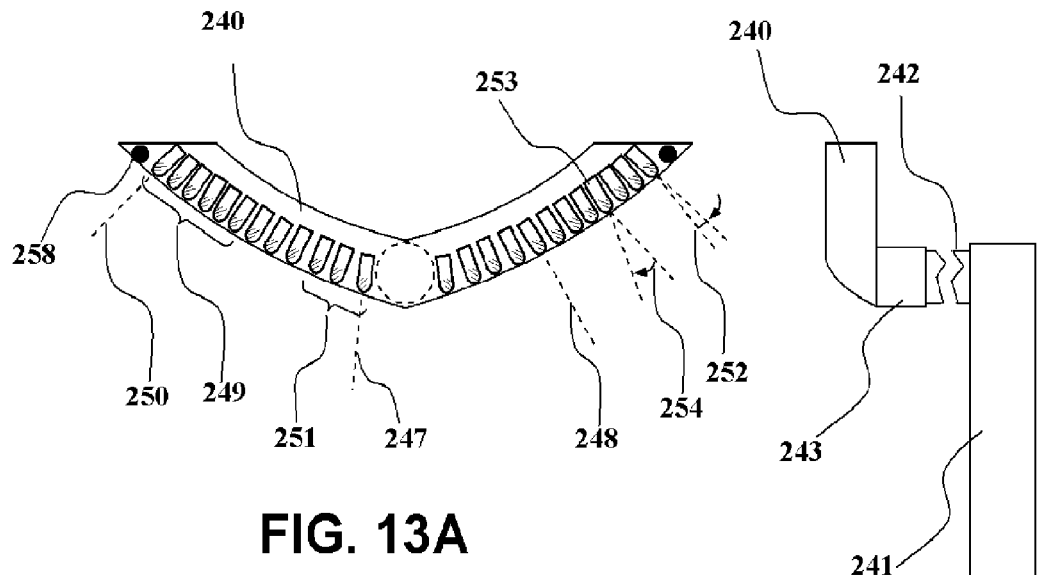
FIG. 13A
FIG. 13B
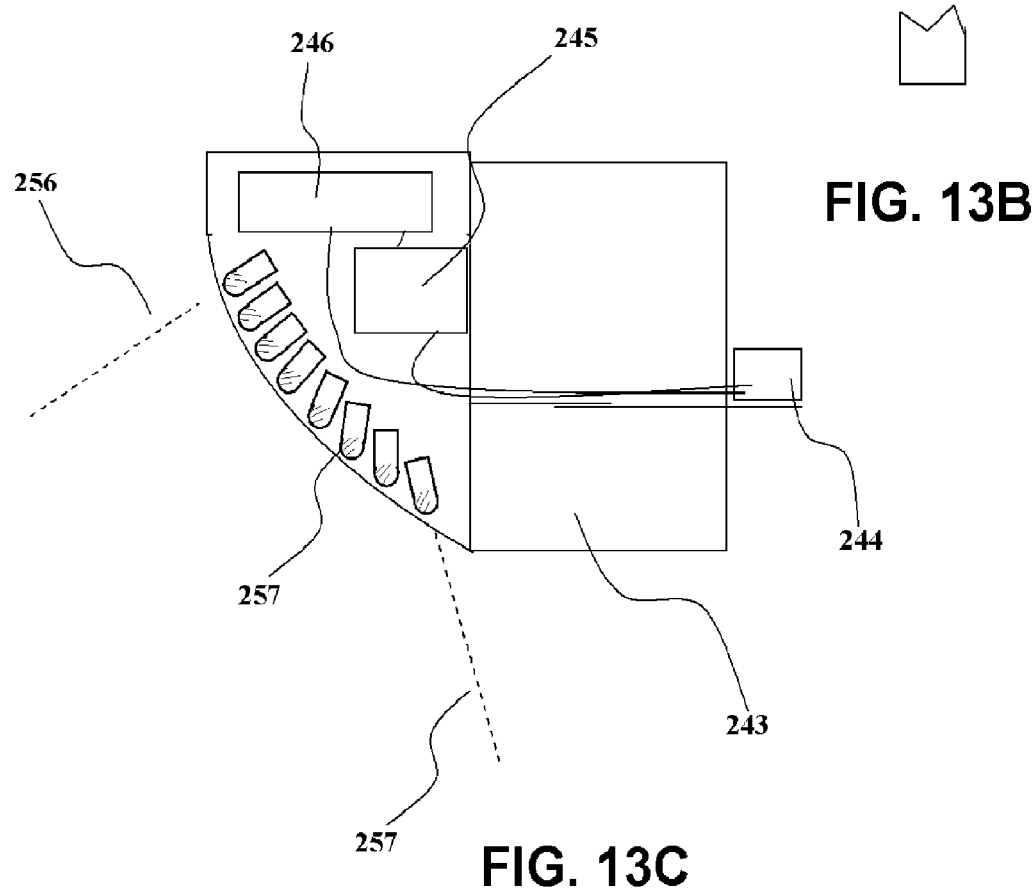
FIG. 13C

MULTIPLE LIGHT-SOURCE ILLUMINATING SYSTEM

CROSS REFERENCE TO RELATED APPLICATIONS

This application claims benefit of U.S. provisional patent application Ser. No. 60/395,308 Jul. 12, 2002, titled: Multiple light source illumination system.

BACKGROUND OF INVENTION

1. Field of the Invention

The present invention relates to multiple light source illuminating devices intended to replace incandescent, fluorescent and HID luminaries in general and specialty lighting applications.

2. Background and Description of the Prior Art

Prior art lighting practice utilizes an apparatus termed a luminaire or Lighting Fixture to provide illumination to indoor and outdoor living spaces, vehicles machinery etc for the performance of various visual tasks. A luminaire provides features other than just light which may include light distribution, shielding, man-machine-interfaces such as on/off switches, connection to power mains, apparatus for affixation to construction elements and aesthetics. A typical prior art luminaire is comprised of: a replaceable lamp, a lamp holder, wiring, optical control elements such as a reflectors and refractors, fasteners and brackets. In addition if the lamp has a negative resistance characteristic, then the luminaire includes power control elements such as a ballast. If a light control system is employed also included are elements including relays, logic controllers and communication devices which may be part of an electronic ballast design. All of these elements packaged together constitute a luminaire. In typical present day luminaire (lighting fixture) practice, a lamp with a mostly radially uniform spatial light distribution is placed within an optical assembly consisting of a reflector and or refractor for the purpose of having the light exit the luminaire in the desired direction and preferred distribution pattern. This is a process that involves cost and inefficiencies in redirecting the light.

Recently solid-state light sources have evolved from indicator lamps into illumination sources. The present art approach is to package these new lamp types into luminaires of the old lamp type with some minor adjustments. This was the case when fluorescents replaced incandescents and when HID replaced fluorescents. The question arises, is this really the best solution as far as functionality and construction are concerned. The question is especially cogent when the fact that solid state light sources are electronic devices with high reliability, long lifetimes and are capable of rapid change over a very wide operating range.

Examples of the inflexible prior-art approach based on today's designs include: lighting is often provided in rooms where daylight contributes significantly to the overall lighting level or in areas near the window but the lighting system is not flexible enough spatially to take advantage of the daylight contribution and reduce power; or the lighting is always on at maximum power irrespective of whether or not there is activity in the room to justify the lighting level.

Even when external dimming controls are provided to the lighting fixture, the color quality of the lighting is deleteriously affected. At a lower lighting level a warmer color temperature is generally required and the luminaire lamp color is not adjustable.

Lighting systems are generally based around a lamp source and lighting application. When a new lamp source arrives generally they are placed into present-day lighting luminaire designs which are not optimal for the new light source. LEDs are a light source which have a number of advantages due to relatively long life expectancy. In the future it is also expected that LEDs will have conversion efficiencies equivalent to those of discharge lamps. Presently however, the high cost of lumen per watt appears to make LEDs uneconomical for most lighting applications. A few applications of which step, stairwell, pathway and emergency lighting are examples require low lighting levels to begin with and thus present at this time a feasible application. An LED light source is well adapted to a number of additional applications. Very often in these additional applications the areas over which the lighting is to be provided are large and bringing electric power to the luminaire is a significant safety and cost consideration. An inherently low voltage light source such as an LED is suitable for use with safe 12 or 24 volt of a distributed power system with low current demands. The control of the light distribution, especially the beam cut-off necessary at low light levels to prevent discomfort, is well suited to the high directionality of the small LED light source. Maintenance of prior-art luminaires in outdoor applications and the requirement for watertight resealing, increases fixture cost and complexity. Robustness of luminaires is another requirement as they located on ground level endangered by passersby contact or vandalism.

In prior art lighting fixture construction, the lamp, reflector, socket and ballast are separate units. Foremost, the lamp must be replaceable and thus access provided, because the lamp lifetime is less than other components in the fixture. The reflector is large, to envelope the light source and provide ray control, and is manufactured of special, highly reflective, material. The power-conditioning device such as a core and coil ballast or more recently electronic power transistor components differs again from the glass lamp, reflector and fixture material. The dissimilarity of the manufacturing technologies, operating lifetimes and materials results in a multi-component fixture assembly held together by fasteners which don't lend themselves to mass production and the luminaires are not factory sealed for life.

In order to clarify the intent of the present invention and its dissimilar aspects from prior art, a nomenclature system is established.

Lamp: A lamp, other than a reflector lamp, is generally a device that generates light radially from the source. Due to the physics involved in the light generation process, it is difficult at the source to gain control of the spatial light propagation. A reflector lamp will partially control the emitted light which hits the reflector, but will not control the remaining light emanating from the filament or discharge tube. A lamp other than a solid-state lamp will generally produce light over a wide range of spectrum. The overall color is a function of the physics involved in the generation of the different photon energies. While some lamps spectra are closer to sunlight and have a good color rendering in relation thereto, other lamps such as low-pressure sodium are highly monochromatic with a yellow-orange appearance. A color temperature in degrees Kelvin based on the color of an incandescent filament is used to describe a lamp. An incandescent lamp color will be termed "warm" at 2000 Kelvin and a Metal Halide "cool" at 4000K. In general, there is no ability to affect the color over the intensity level even where dimming is afforded. A lamp is also intended to be a replaceable element. Lamps are constructed according to universal standards which allow for the substitution of lamps by other manufacturers. Prior-art lamps are thus provided with bulky bases which fit into bulky sockets and do not lend themselves to being permanently wired into printed circuit boards or bonded onto electronic chips.

Luminaire: A Lighting Fixture or luminaire (the terms are used interchangeably) is a device which is constructed around the lamp to provide lighting specific to the application including non-lighting considerations such as aesthetics, safety etc. Some LF designs are primarily based on aesthetics while others are based on tailoring the lumen output such that the lighting fixture output meets the visual task at hand. Between these two extremes there are many possible designs, with maintenance, fixture cost, hazardous and rough service location considerations also playing a role. This is essentially why the industry produces so many different types of luminaires. One type for high industrial building ceilings known as high-bay lighting, another for office lighting and a third for roadway lighting and a fourth for illuminating corridors. Each fixture has its photometric distribution characteristics, that is, how many candela at what angle are exiting from the luminaire. Other luminaire considerations include keeping the lighting from causing discomfort glare or from being a source of veiling reflections. The purely technical goal is to get the required amount of light at the work surfaces where visual tasks are carried out by man, animals, plants and machines. A LF has a longer life than the lamp, and the lamp is meant to be replaceable within the fixture. A luminaire is wired directly to the electrical mains while a lamp due to its need to be replaced has a base which fits into a socket by way of which the lamp receives its power. Prior art solid-state lamp assemblies are considered lamps, as they have no provision for being connected to the mains. A luminaire has apparatus whereby it is attached to the building structure while a lamp is mechanically affixed to the lamp holder or socket. Another aspect of distinction is, that in general, correct lighting practice principles are used to guide in the design of a LF while a lamp is "bare" and is expected to have reflectors, refractors, shades and louvers to prevent glare and redirect its rays to increase light utilization.

Digital: The term digital used herein in refers to the luminaire concept as espoused by teachings of this invention and is loosely defined in parallel to the fine control associated with digital equipment. The multiple light sources of specific characteristics provide quanta of power and spectrum which are smoothly added or detracted to generate a changed lighting effect. The digital aspect arises from the sufficient progression of values, varying by minute degrees to produce a continuum so as be non-discernable or irrelevant to the user. The added controllability is realized by breaking up the light-production, into discrete, specifically aimable, and dimmable elements which can be addressed by control electronics for the purpose of affecting the intensity, spectrum and spatial distribution of spectrum and of intensity of the illumination provided by the luminaire of the present invention.

The overall combination of control capability and discrete light sources yields a digital lighting fixture. The terminology "digital" as used herein also refers to the discrete nature of the multiple LED lamps provided in the luminaire, whereby, "digital" control results from the individual control of the discrete, i.e., "digital" lighting elements, the LEDs, in the luminaire.

Correct lighting practice: A bare incandescent lamp illuminating a room is arbitrarily termed poor lighting practice. The bare light bulb hooked up to the electric power via a light switch, causes glare, wastes light, delivering the light to useless areas, has no provision for dimming and is energy inefficient. The Illuminating Engineering Society of North America (IESNA) as well as other professional groups such as the International Association of Lighting Designers (IALD), have developed recommended lighting practices for specific applications in indoor and outdoor lighting. These recommendations and equations for implementing the recommendations can be found in the IESNA Lighting Handbook, 8th and/or 9th Editions (available from the Illuminating Engineering Society of North America 120 Wall St. Floor 17 New York, N.Y. 10005 included herein by reference. Factors in good lighting include lighting intensity levels which may be based on the age of the users of the light, the color rendering capacity of the light source, its color temperature, the non-production of glare, veiling reflections and energy efficiency amongst others. Recommendations for all aspects of lighting in terms of intensity, distribution, color temperature, color temperature as a function of light intensity and correct color rendering exist in the literature in terms of lighting applications that is the environment to be illuminated, in parameters such as lux for intensity, CRI for color rendering index and Visual Comfort Parameter (VCP) for glare. In recent years, the Unified Glare Rating (UGR) as recommended by the CIE has become widely accepted as a general formula for assessing glare. While the US may still use VCP ratings, all the lighting-practice engineering organizations worldwide have standards and recommended ratings for different activities. For example lighting levels of 500 lux and a UGR of 19 is recommended in offices while industrial areas intended for coarse work a UGR of 28 can tolerated. In good lighting practice, attention is given by lighting designers to the correct amount of uplight, that is light exiting from the luminaire towards the ceiling, which prevents a gloomy "dark cave" effect. Attention is also given to the cut-off angle of the luminaire, usually provided by shielding elements, such that high intensity rays are not emitted at an angle where they enter the occupant's eye during normal activity. A correctly designed luminaire for indoor lighting may provide 30% uplight and 70% downlight in the angles from the nadir 0 to 60 degrees and then again 135 to 170 degrees. A governing equation in lighting and used in "reverse luminaire design" of the present invention is the cosine law or Lambert's law, Equation 1:

$$E = \frac{I \cdot \cos\theta}{d^2}$$

Where:
E=Illuminance in lux or footcandles,
I=Luminous intensity in candles,
D=Distance between the source and the point of calculation in meters or feet,
θ=Angle of light incidence with illuminated surface Another useful equation used in fixture analysis to avoid glare producing designs yields the level of discomfort on the DeBoer scale. The DeBoer rating scale (1-9) describes the level of discomfort where: 1=Unbearable, 3=Disturbing, 5=Just acceptable, 7=Satisfactory, and 9=Just noticeable. The allowable level is dependant on the application. A surgeon performing an operation may be very sensitive to glare while a chlorophyll producing plant is not. The equation to determine the rating is Equation 2:

$$W = 5 - 2 \cdot \log \frac{E_i}{3 \cdot 10^{-3} \cdot \left[1 + \sqrt{\frac{L_a}{0.04}}\right] \cdot \vartheta_i^{0.46}}$$

where:
- W=glare sensation on a scale of 1 to 9,
- La=adaptation luminance (cd/m$^2$),
- $E_i$=illumination directed at observer's eyes from the i-th source (lux),
- $\phi_i$=glare angle of the i-th source (minutes of arc).

Using these equations and correct lighting practice covering preferred angles of lighting for visual tasks, it is possible to design from the specific application's illumination requirements the spatial light intensity distribution and yet avoid manufacturing a glare producing luminaire.

The present invention generally relates to an improved illuminator for use both in general and specialty lighting. The term general lighting includes use in living spaces such as lighting in industrial, commercial, residential and transportation vehicle applications. By specialty lighting we mean emergency lighting activated during power failures, fires or smoke accumulations in buildings, microscope, stage illuminators, billboard front-lighting, hazardous and difficult access location lighting, backlighting for signs, agricultural lighting etc.

Energy Efficiency and Costs. In an example to illustrate the advantages of an energy efficient lighting solution, the total cost of lighting a typical 300 foot by 300 foot retail facility at 1000 lux over a 10 year period using state of the art (2002) HID luminaires is assessed. Including equipment, installation and maintenance cost the total bill is over one million dollars. Approximately 80% of this is in energy costs. The commodity being purchased is lighting, the major lifecycle cost is electricity. To cut down on costs and also conserve energy it desirable to maximize the use of light generated. A Japanese survey of office luminaires (Japan Lighting Information Services-Seminar-Save Energy of Office Lighting-Loss of light in luminaire-.htm) shows LF efficiencies (light that exits the fixture vs. the light produced by the lamp) in an open office fluorescent luminaire without anti-glare louvers to be 84% while one equipped with louvers is only 52% efficient. The "utilization factor" (which equals the light flux which arrives at a work site (e.g. upper surface of a desk) divided by the sum of all light flux of the lamp) is 74% for an open fixture and only 50% for louvered version. This however, is still not what the customer is paying for. The customer is after the best lighting solution at minimal energy cost. Chances are, as experienced lighting designers know, that the light intensity, even in a good lighting design, is still not evenly distributed over the work surfaces. While care is taken in the lighting design computer runs not to fall below the minimum illumination intensity at any point in the room, there are non-trivial excesses at some points in the lighting layout design. This excess light, wasted energy as far as the customer is concerned, probably accounts for another 10% loss. While a fluorescent may be appear to be a superior and very efficient light source at 80 lumen per watt vs. 30 lumen per watt for LEDs this is not actually the case, in actuality 60% of the fluorescent LF's light is wasted. Thus, in terms of energy use, a properly designed LED luminaire can be, with the proper luminaire design of the present invention, as effective lumen per lumen as any discharge light source in illuminating living areas.

Expressed in terms of the above background and nomenclature, it is the goal of this disclosure to teach how to construct a luminaire which will radiate photons where needed, exactly in the correct amounts to accomplish visual tasks and/or create an atmosphere. The controlled radiation of light into a living space with a specific spatial intensity distribution also having optimal spectral characteristics for the seeing tasks at hand is provided by the present invention. Each visual task application has its own correct lighting solution with optimal light intensities, light color emanating at angles which will not cause glare that interferes with vision or causes discomfort. Tasks in living spaces vary with time so it is another objective of the present invention is to provide the optimal lighting solution in "real time" (at that specific moment in time).

As a light source of ever increasing choice, LEDs have been packaged in numerous forms and used in lighting applications. Special control circuits have been developed to take advantage of the variability offered by the new light source and are today being offered as a solution to specific applications. In general however the design process has not zeroed in on providing the correct lighting solution. A number of LED illumination devices create "white" light by combining two or more LEDs of various wavelengths. White LEDs are also made using phosphors. The goal has not been to vary this color spectrum in real time to coordinate with the usage of the living space. The term "white" light is loosely interpreted to cover a range of illuminating light acceptable to the user for that application. HPS's yellow light has even been called white by some and the term is exclusive only of almost monochromatic sources such as LEDs and LPS lamps. The terms light spectrum, spectra, spectrum, spectral and color are used to refer to the relative spectral power distribution of the light source.

A prior art LED light strip consists of circuitry including a plurality of LEDs mounted on a substrate and connected to electrical conductors. The circuitry is sometimes encased within a tube like, partially transparent protective sheathing and connected to a power source for selective LED illumination. Two examples of LED strip types are described in U.S. Pat. No. 5,130,909 to Gross, entitled Emergency Lighting Strip and U.S. Pat. No. 4,597,033 to Meggs et al., entitled Flexible Elongated Lighting System. Such strips are utilized in a variety of indoor and outdoor configurations such as emergency pathway markers, exit door indicators and ornamental lighting arrangements. The LEDs are being used as outline markers where the lighting strips are the object to be seen. It is not the purpose of the lighting strips to project light on other objects to make them visible. In other applications, where lighting distributed evenly along an area is required, these strips are placed at an edge. No attempt is made at obtaining an even illumination outward from the edge to the area perpendicular to the long dimension.

LED lamps and ballast systems can reduce maintenance costs due to an average rated life of 100,000 hours. This is five to eight times the typical service life of conventional fluorescent and metal halide lamps. The present system is especially well suited for applications where relamping is difficult or expensive.

U.S. Pat. No. 6,346,777 issued Feb. 12, 2002 to Kim teaches an illuminating lamp assembly. An LED lamp apparatus comprises a plurality of LED lamps including at least one LED chip mounted on a Printed Circuit Board (PCB), on which a driver circuit and/or a control circuit are provided in a printed circuit pattern to drive and/or control the LED chip. The device is independent of the lighting application and is simply a lamp not a lamp and fixture combination.

U.S. Pat. No. 5,018,290 issued May 28, 1991 to Kozek et al. Teaches an exit sign with a plurality of low voltage incandescent lamps mounted on a PCB to provide illumination from within a housing. There is no combination of different light source characteristics to build a new combined light source characteristic and this is a lamp replacement not a LF fit for general illumination.

U.S. Pat. No. 5,577,832 to Lodhie one of the originators of the use of LEDs for illumination, describes a multilayer LED assembly which is used as a replacement light for equipment used in manufacturing environments. On each layer of the multi-layer assembly, there are multiple LEDs which are mounted perpendicular to a base. The base is used to provide electrical and mechanical connection to a socket. The LED assembly may utilize multiple layers of LEDs, with each layer itself having multiple LEDs. The LEDs in each layer are mounted in a direction perpendicular to the base which results in light emanating in a direction perpendicular to the base. The LED assembly is used as a replacement lamp for equipment used in manufacturing environments. There is no attempt to match the light distribution to the task at hand.

U.S. Pat. No. 6,379,022 issued Apr. 30, 2002 to Amerson, et al. titled Auxiliary illuminating device having adjustable color temperature, describes an auxiliary illuminating device that has a least two preset ratios of light adjustable color temperature. The color temperature is adjusted by varying the light output at least two independently adjustable light sources. The light source is an array of at least 2 colors. The light source typically uses at least one set of LED's. The application specifically relates to use in producing correct lighting for photography but does not relate to general illumination so that its control equipment does not correlate the overall illuminance level to the color temperature over the range of illumination nor does its control equipment integrate the aiming function for correct light distribution. Essentially the auxiliary illuminating device is a lamp replacement for a photographic flash lamp.

U.S. Pat. No. 6,340,868, Illumination components, discloses a current control for an LED lighting assembly, where each current-controlled unit is uniquely addressable and capable of receiving illumination color information on a computer lighting network. The teachings of the above patent are incorporated herein by reference. Although this patent discloses how to construct controllable illumination light systems this patent does not relate to the concept of control within the parameters of accurate light distribution and correct lighting practice.

In U.S. Pat. No. 6,498,440 Stam, et al. incorporated herein by reference, describes a lamp assembly incorporating optical feedback to produce an illuminator assembly that is capable of utilizing a plurality of light sources to produce a desired resultant hue. The assembly includes a processor, a memory, a plurality of light sources and a detector. The memory is coupled to the processor and stores data and information. Each of the plurality of light sources are coupled to the processor and produce a different color. The processor is capable of independently controlling the intensity of each light source so as to produce a desired resultant hue. The detector is also coupled to the processor. The detector provides the processor with information which the processor utilizes in determining how to adjust the intensity of each of the light sources to provide the desired resultant hue.

In an earlier U.S. Pat. No. 5,803,579 titled: Illuminator assembly incorporating LEDs, by Turnbull, incorporated herein by reference, the different color LEDs light output is coincident in such a manner that this overlapped and mixed illumination forms a metameric white color and has sufficient intensity and color rendering qualities to be an effective illuminator. Electronic circuits for control of the independent light sources consist of microprocessor controlled adjustable current sources.

U.S. patent application Ser. No. 2,000,130,326 issued to Tamura et al., incorporated herein by reference, describes a lighting device that includes a plurality of LEDs arranged in an at least two-dimensionally dispersed manner; a transparent resin layer that covers the plurality of LEDs in an integrated form; a photo-detecting unit that detects an intensity of light emitted from the plurality of LEDs using a photodetector and a power supply circuit unit that controls driving of the plurality of LEDs based on a detection output from the photo-detecting unit. The purpose is to have a predetermined balance of light intensities of the colors according to an output detected as to each color by the photo-detecting unit. This device does not integrally cover the light distribution function within and does not correlate the lighting spectrum with the light intensity. It also does not provide a method to handle color shift over the lifetime of the illuminating device.

In U.S. Pat. No. 6,528,954 a light bulb is provided which may include a housing, an illumination source, disposed in the housing, and a processor, disposed in the housing, for controlling the illumination source. The housing may be configured to fit a conventional light fixture. The processor may control the intensity or the color of the illumination source. The housing may also house a transmitter and/or receiver. Although this device includes the desirable communications control aspect, this device does not relate to a multi-light source capability which allows for the smooth variation lighting and its even distribution.

In the prior-art approach, the LED manufacture and the power supply manufacture are separate units. Typically one power supply is good for a certain number of LEDs. This is similar to the historical lamp and ballast segregation that came about probably because one manufacturer was working with glass and the other with copper. Electronic light sources are semiconductor components as are the power supply components. A unique opportunity for integration exists in solid-state luminaire design which has not being taken advantage of.

In many energy conserving multi resident stairwell lighting systems the lights are typically activated by pressing a button in the hallway or in each apartment. This requires special wiring between the switches and the central controller. In many other stairwells and hallways the lighting is always left on wasting energy. With long life LED lamps, a low energy distributed lighting solution could always be on for orientation purposes and would only turn on to full output when activity levels require the lights turning on, using integral optoelectronic motion detectors.

A home lighting fixture is often left on at full power when really only lighting for orientation purposes is required. A light switch on the wall is provided and sometimes this has a dimmer option. An electronic power supply with programmable electronic controller with communication over a dedicated data line or alternately over the power line or alternately wireless is also possible in present art such as with the DALI (Digital Addressable Lighting Interface) protocol. With digital signals, power supplies become individually addressable compared to analog systems where only circuits are addressable. Additionally, DALI allows for bi-directional communication between the power supply and control. DALI also brings the capability of broadcast messaging to ballasts. With DALI or any other protocol much more than dimming can be effected. Control of spectrum, occupancy sensor controls and specific spatial intensity distributions can be modified. However, the present-day lamp or fixture is not designed to fully and efficiently take advantage of these new control capabilities.

OBJECTS AND ADVANTAGES

The present invention provides a unique approach to solid-state illuminating devices that is a departure from conventional prior art LED lighting practice. Prior-Art LED lighting technology manufacturers have been taking LED junctions and packaging them in evermore-powerful configurations to carry out the function of lamps. These LED lamps are teamed with reflectors and/or refractors similar to the techniques practiced with standard lamps or put on strips which is just another way of distributing the light over the area to be illuminated. This invention comprises a different approach which is to provide the end user with the most correct lighting solution not a new technology lamp to replace the old one. The present invention comprises a novel multi-light source approach to the design and construction of solid-state lighting fixtures (vs. solid-state lamps), which is termed a "Digital Lighting Fixture", due to the control of individual lighting element "digits" to provide the "correct" lighting solution for the situation at hand.

The invention embraces LED-illuminating devices covering a wide scope of applications including a room light and step light design as well as the general method for designing solid state luminaires from ground up from indoor to outdoor use in residences, factories, stores stadiums and streets. The general concept allows anyone to build a lighting fixture from the ground up, tailor made to the final application rather than building a fixture around a common lamp. This is because it difficult to control the high temperature processes of incandescent and discharge lamps. In addition it takes a tremendous amount of investment in tooling to manufacture an incandescent, fluorescent or HID lamp. Electronic components on the other hand are made of large quantities of discrete components which are masked or robotically placed on to substrates. These smaller building blocks can then be easily configured per specific applications.

This disclosure also teaches that when it comes to solid-state lighting big is not necessarily better. The approach of LED manufacturers trying to get into the lighting business by attempting to replicate the effect of present day lamps has been to make large, high current capacity, high lumen output electroluminescent junctions having marginally acceptable lighting characteristics. Lumileds Luxeon® DS25 Emitter running at 350 mA is an example of such an approach. In a few years manufacturers have raised currents from 50 mA to above 500 mA, at the time of this writing. These advances are certainly favorable at reducing costs and making LEDs a practical light source but attempting to get 1000 lumen (equivalent to a 60 W incandescent lamp) is not necessarily the best path to take, especially if it comes at the price of light conversion or distribution efficiency. In contrast to a prior art, single large, lamp replacement like light source, the present invention provides multiple, small sized sources of differing characteristics such that the effect of the whole is greater than the sum of the individual parts. The determining size factor then becomes when is there a sufficient progression of values varying by minute degrees or continuum so as be non-discernable or irrelevant to the user. That is, LEDs are generally of a single wavelength (color, frequency), have small optics close in to the individual light sources since they operate coolly, and have stable conversion efficiency over a wide range of currents and light output. The added controllability offered by breaking the total light output up into discrete ("digital") specifically aimable and dimmable elements which can be addressed by control electronics to effect intensity, spectrum and spatial distribution of intensity and spectrum, yields a lighting fixture (vs. lamp) of unparalleled performance. Unique to this patent is the approach. It is the approach of a lighting manufacturer who provides lighting solutions versus that of a lamp manufacturer who produces a generic lamp.

The advance over prior art is a solid-state light source with increased: 1. Efficiency—more effective lumen per watt electricity. 2. Durability—physical strength, life expectancy, lumen maintenance and spectral stability. 3. Lighting quality—as related to visual comfort and "atmosphere". 4. Functionality—ability to control the light placement, intensity and color temperature and do so as needed. 5. Energy savings 6. Lower overall lifecycle cost Integrating the light source with power conditioning electronics, control circuitry and sensors gives additional cost benefits and functionality including: 1. Mass production capability 2. Sealed-for-life fixture 3. Exact optical performance less spill light 4. Compact design 5. Feedback control and recalibrated color consistency over the device lifetime 6. Real-time lighting needs adaptability.

Therefore, it would be advantageous to have a luminaire that require no maintenance, has smoothly controllable light output in terms of intensity, spectra, spatial distribution, is robust, mass producible as a single unit, factory sealed against the elements, is self calibrating over its lifetime, is adaptable to changing requirements, works on high or low voltage, has an affixation apparatus and is aesthetic.

SUMMARY OF INVENTION

A lighting device incorporates multiple discrete light sources and their ancillary optical and electrical control equipment in an integrated illuminating element. The overall lighting effect is the result of the combination of these multiple sources and components operating together. Preferably, the power conditioning circuitry, light sources, logic control circuitry, sensors and optical elements are packaged together in one integral device. The system contrives a lighting device which replaces the present day multi-component lighting fixtures or luminaires including: the lamp; optical light control element/s such as reflector, refractor and shade; power conditioning devices such as a ballast; control equipment such as switch, dimmer, and timer. Detectors, emitters and sensors for light intensity, spectrum, temperature etc such as photodiodes, photocells thermocouples etc are provided. These provide data input to the controller, allow feedback and enable recalibration. An additional apparatus that conducts electric power along length, as electrical wiring, may be added to the system to provide further unitization. The integral lighting element is packaged in the shape of a globe, hemisphere, disc or strip and is designed to quick connect to the electric power carrying conductors. Provision is made for mechanical affixation to a structural surface. In the present concept over the life time of the fixture there is no lamp replacement only fixture replacement. It's assumed that after 100,000 hours it is time to change the fixture.

The method of creating a luminaire adapted to the usage and surroundings in which the luminaire will be integrated is disclosed. The process includes determining the correct lighting practice for the application, surroundings, the selection and placement of light sources and integration with mechanical support and electronic control elements to realize the objective.

BRIEF DESCRIPTION OF DRAWINGS

FIG. 2A is prior-art design and FIG. 2B an illustration of a preferred embodiment of this invention of a retrofit LED lamp illuminator while FIG. 2C is a side view of an embodiment of this invention using a PCB provided with standard 5 mm hole-through LEDs.

FIG. 3A is prior-art decorative LED luminaire design juxtaposed with

FIGS. 13A through 13C depict a streetlight fixture designed according to the teachings of this invention.

DETAILED DESCRIPTION

Figure 1:
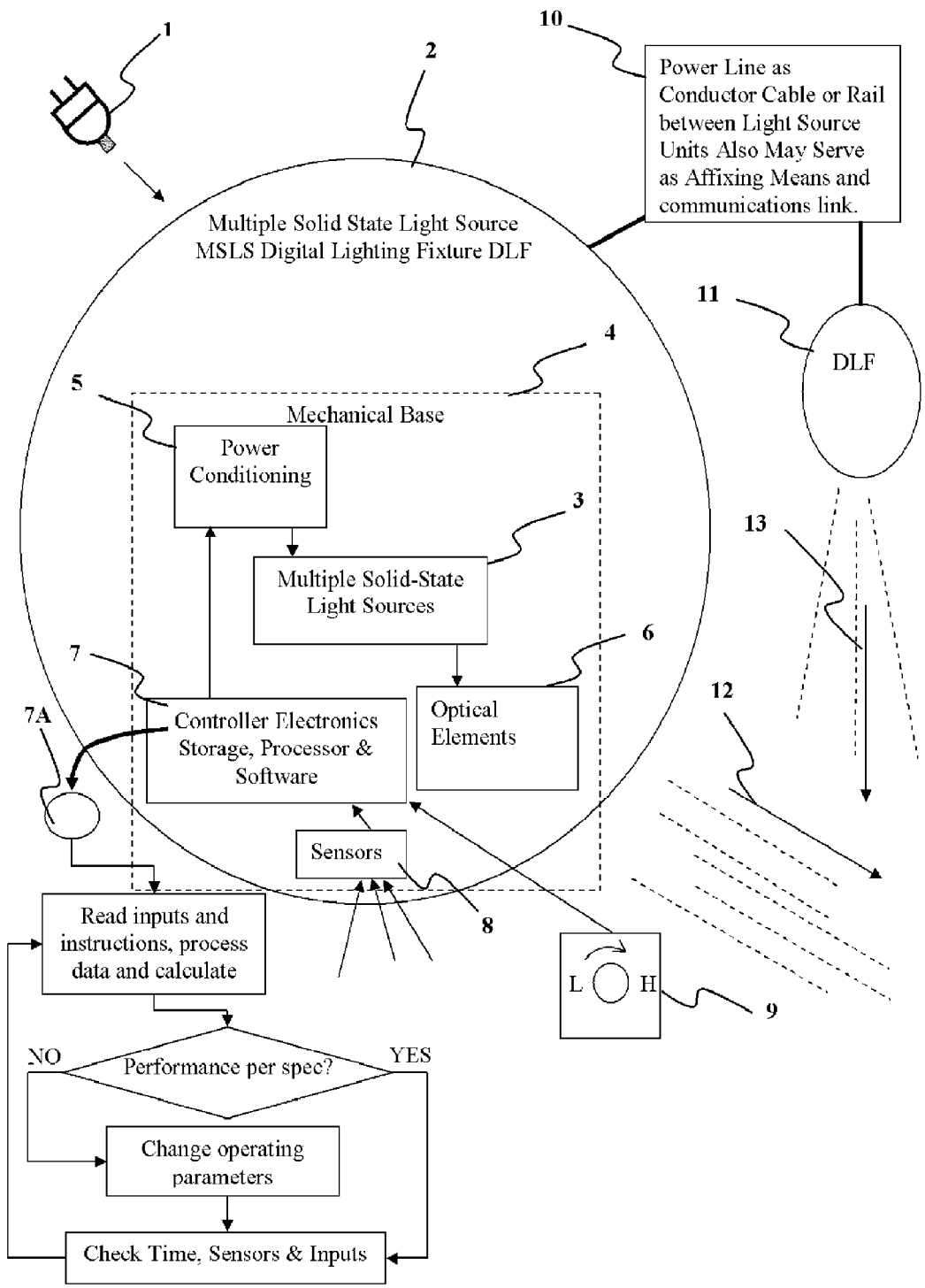
FIG. 1 represents a block diagram of the elements making up a Digital Lighting Fixture system.

The system is built around a "digital" light source. That is, the emanating lighting effect is the sum of the characteristics of a multiplicity of discretely controllable "digit" sources. The difference between the individual "digit" light sources and their summation manifests itself in the resultant light characteristic, be in its intensity, spatial intensity distribution, spectral energy content and spectral intensity distribution. All of these characteristics are also variable with time. A light source for this purpose may be electroluminescent such as a Light Emitting Diode (LED) junction, Organic Light Emitting Diode (OLED) or carbon-related field emission devices such as a nanotube-phosphor-combination, HID, fluorescent or even an incandescent source. While a one-source lamp will not have the flexibility to effect the most correct illumination characteristics, such as maintaining correct intensity and color temperature for the lighting task at hand over changing environmental conditions, two or more differentiated sources will have an increased operating range. This flexibility is useful as for example in a multi-source luminaire with spatially differentiated dimming capability used in an office lighting application. In a normal day's operation, such as in a windowed room between peak daylight and nighttime hours, the intensity and color temperature of the light varies greatly over different portions of the room. The smooth variation possible with many light sources ("digits") vs. one light source offers superior flexibility in providing the actual lighting needs. Therefore, the illuminating device may be described as a "digital" light source or as a Multiple Solid-state Light Source (MSLS), comprising many "digits", SLSs, and essentially replaces the lamp of present-day luminaires.

As used herein, the term "light source", LED or "solid state light source" means any system that is capable of receiving an electrical signal and producing light in response to the signal. Thus, the term "light source" should be understood to include light emitting diodes of all types, light emitting polymers, semiconductor dies that produce or emanate light in response to current, organic LEDs, electro-luminescent strips, and other such systems. Incandescent and discharge light sources are also included and multiples of incandescent and discharge light sources also provide a digital luminaire. In an embodiment, a "light source" may refer to a single light emitting diode package including multiple semiconductor LED dies that are individually controlled.

The term "illuminate" should be understood to refer to the production of a wavelength of radiation by an illumination source. The term "color" should be understood to refer to any wavelength of radiation within a spectrum; that is, a "color," as used herein, should be understood to encompass wavelengths not only of the visible spectrum, but also wavelengths in the infrared and ultraviolet areas of the spectrum, and in other areas of the electromagnetic spectrum.

In designing a multi-light source luminaire the minimum design criterion for intensity and spectrum differs for each application and is related to the end user who is the ultimate measuring instrument and economic consideration of the light provider. The regularity of the changes in effects is derived from the user's perception. It is generally accepted that the eye cannot discern changes in beam intensity that are smaller than a factor of two to ten and color temperature differences of 200 to 300K. Illumination intensity changes are discernable as a logarithmic function and depend on background illumination levels. For example illuminating practice allows for hallway lighting to be 20% of room lighting due to rapid eye adaptation. However the eye is very perceptive of intensity changes when comparing images such as in comparison of gray scales and thus lighting for an art lay-up room must be very even.

A further improvement is where the lamp and lighting fixture function are carried out in one device. In a typical present-day lighting fixture, a lamp with a symmetrical distribution in placed in a reflector to redirect the light, a requirement involving added cost of the reflector and performance inefficiencies. While PAR and other integral reflector lamps exist, they again have a symmetrical distribution in one of the axes and are large due to the high temperature of operation and requirement to distance reflective surfaces due to heat and large light source dimension consideration. Since the solid state or LED lamp is made of cool operating components which have a mechanical base (versus a 1000K gas discharge which is free floating) the LED allows for an integral small sized optical element near the power source. Where the terms optics or optical are mentioned herein, they refer to redirecting light rays through any of the known phenomenon including: reflection, refraction and diffraction. Typically, an LED will come packaged in an optical assembly consisting of a reflector and lens with 8° to 50° spreads being typical. A Surface Mount Device—SMD LED with no optics will still be limited to 180° due to its construction.

A power-conditioning device such as a ballast is required to operate efficient fluorescent and HID light sources but is separate therefrom in function and physical construction. In the MSLS the power source is electronic as is the control equipment and thus the electric power conditioning circuitry can be integrated with the light source circuitry and packaged as one on a PC board or integrated circuit manufactured in the same way of the same materials. Chip on board and chip on chip technologies are used as a packaging configuration for LED chips as well as power and logic control transistors and other components. Power transistors come packaged in plastic and so do LED junctions only that the LED package is light transmitting and can be formed into a lens. Transistors, molded in a transparent package together with LEDs, may be shielded from undesirably receiving illumination causing base photocurrent, by providing opaque "junction coat" over the transistor die, as is well known in the semiconductor industry. The packaging also lends itself to the same manufacturing methodology such as soldering elements onto a PC board. Both hole through and SMT configurations are presently available for most of the components. This combined unit of compatible, mass producible, apparatus, including the solid-state lamps, their optical assembly, electronic ballast gear and structural fixture equipment, provides a unique Digital Lighting Fixture (DLF) device.

In a preferred embodiment the DLF is provided with an onboard controller. The controller may be a computer board, embedded device, a Digital Signal Processor, etc. In general, the term "logical controller, controller or computer" can be broadly defined to encompass any device having control circuitry or a processor which executes instructions from a memory medium.

A further improvement is the reduction of all electronic and optical components to the chip level. That is, light-emitting junctions may be placed with power electronics in an integrated circuit. For example, combination GaAs LED-JFET technology may be used, the JFETs (junction FETs, acting as control devices for the LEDs. The carrier is made of materials and shaped to carry out optical and or heat transfer functions. Multiple light emitting junctions of similar or differing characteristics, a function of doping and diffusion, are placed with the control circuitry on chips. The VLSI techniques used in digital camera photodiode arrays containing millions of pixels is used to create arrays of light emitting diodes. Actually reversing the current flow on some photodiodes will cause them to emit light. This is how OLEDs were discovered. OLEDs began in the lab as photovoltaic cells until by error they were driven in reverse. Alternately other die bonding techniques are used to create chip on chip assemblies as is known in the art. Sets of chips with similar or differing characteristics may be geometrically arranged to provide a specific light distribution and color mixing. The total envelope is then a combined lamp, power supply and lighting fixture "luminaire", and is positioned within the room to be illuminated at the design height and position to give a consistent and sufficient lighting to the area under its control. Cooling is effected using natural convection or for air currents from a cooling fan or fluidic cooling using natural or forced circulation.

On the chip and die level further magnitudes of manufacturing and packaging efficiency are realized. The integration can avail itself of other more compact packaging technologies such as chip on board and chip on chip. Assemblies with conductive and non-conductive diebonding using epoxies and eutectic solders used for a variety of semiconductor die types including ASIC's, MEM's, LED's and Sensor's. These may be used on a variety of substrate materials including FR4, Alumina, Metallised Ceramic, Carbon Fibre and Chip on Flex as single die or multiple die arrays for Chip scale packaging/CSP's. Conductors are attached to the dies via Aluminium and Gold wirebonding using both wedge bonding and ball bonding. The manufacture of Multi chip modules/MCM or Chip scale packages/CSP are also possible and can be ceramic, laminate or PCB based. These assemblies can be single or multiple die assemblies with external components making it possible to manufacture all light, sensor, power and control components as a superior integrated device.

The present invention provides an illuminating device which serves as a replacement for the lamp, socket, reflector, electric power control gear, dimmer and mechanical structure of a present-day lighting fixture or luminaire. A semiconductor junction packaged integrally with light controlling components provides a Solid-State Light Source SLS and many together form an MSLS, which when combined with power conditioning, and optionally logic control, communications and affixing elements, provides a DLF. The basis of the invention is the use of a multitude of discrete light emitting sources ("digits") to generate light. The light control elements can be applied on a per junction basis or on a "white" color generating set grouping such as RGB or on a larger set which may be convenient for manufacturing or other color rendering considerations. The requirement for controllability is however, that the SLS output is definitive in relation to spectrum and spatial distribution.

The discrete light emitting elements by operating and not operating, at full power or at a fraction of, either partially or in unison, generate light with optimal intensity, spectral distribution, and spatial distribution of intensity and spectral distribution for the viewing task at hand. This is accomplished without recourse to separate (exterior to the DLF) reflectors to redirect the light, filters to alter color, shades to control glare or dimmers to control intensity. An example of light source used in a DLF would be an electroluminescent semi-conducting material an example of which is a LED. Such a source is characterized relative to a standard incandescent lamp by its small dimensions, low voltage, low current, monochromatic spectrum, high resistance to physical shock, high directionality of the light output, and at the present, relatively high cost. In addition, the intensity of the light output over a defined range is a function of the current and within limits may be varied by orders of magnitude without deleteriously affecting the efficiency or lifetime of the LED.

Although the light production of a typical 5 mm, 50 mA maximum rated, LED of between 1 to 2 lumen is much too low to be of any practical use for illumination, the combined output of a few to hundreds to thousands of LED's is quite significant. Higher current LEDs are now being introduced which operate at 350 mA and provide 20 to 30 lumen. This however, is still is highly impractical for use in lighting a room when compared to a 100 watt incandescent lamp of 1700 lumen. Based on progress to date it is expected that LEDs will reach comparative lumen per Watt efficiencies of 60 to 120 l/W as found in gaseous discharge lamps. This invention relates to technologies which are feasible at the present state of the art l/W as well as those which will become feasible in the future.

A "light bulb" of the present invention is comprised of a multitude of LED's where each LED or group of LED's may be of the same or different wavelength, (color—where said wavelength may be mono or multi-chromatic), light output, spatial distribution and operating frequency (as when an alternating signal is used or it is multiplexed). The light from an LED or group of LED's of red color operating with an LED of blue and green color impinging on an object would appear to the viewer as "white light". By varying the number and/or light power output of a specific color LED or group of LED's relative to the others, a different intensity and color temperature of light with a "warm" or "cool" appearance may be effected. "White" LEDs can also be used in the invention alone or with other monochromatic LEDs. A white LED comprises an emitter in the blue spectrum covered with a phosphor which fluoresces in yellow such that the combined output appears white. White LEDs come in various angular light distribution patterns and color temperature variations. White LEDs can also be combined to vary intensity and spectrum. In the preferred embodiments, "white" LEDs are not used, as the use of phosphor adds unnecessary conversion inefficiencies and output degradation with time. The ability to correct for color shift over the DLF lifetime with white LEDs is limited. However, the present invention includes the use of white or other multi-spectrum light sources.

Presently the efficiency of many types of LED's (the chemical make-up of the junction differs between colors) is high relative to incandescent but low relative to discharge lamps. However, the theoretical efficiency is quite high and the inefficiencies have to do with getting the light out between the junction and heat dissipation considerations. Expressed in lumens per watt LED's may produce up to 30 lumen/W versus 100 I/W for a discharge lamp and 18 I/W for an incandescent lamp. In the preferred embodiment, a highly efficient constant current power source is used to drive the LED's where the electronic circuit is a series connection of the discrete LED light sources. The open failure of an LED or series of LEDs which would interrupt the circuit is circumvented by the use of Zener diodes, placed such that the functionality of the lamp would not be seriously affected. The constant current power source has the advantage that different LEDs, of different forward voltage drops, from different manufacturing runs or chemical composition, may be operated together. Alternately, power circuits available in the literature for driving the LEDs are used as published in technical notes by manufactures such as Agilent®.

The life expectancy of an LED can be expected to be as high as 240,000 hours between failure. Due to light degradation over time average lifetime is normally rated at 100,000 hours. At best an incandescent's rated life may be 2,000 hours and that of a fluorescent, 20,000 hours. However, the LED operated in a circuit would have only the reliability of the circuit and MTBF divided by the number of series connected LED'S. A printed circuit board with the LED's alternately connected to separate circuits with redundant access to the power sources and with the use of Zener diodes every so many LED's to circumvent any failed sections could operate directly off of the 120/240V line. Any voltage AC or DC from 4V up to 480V is practical. The LED's of the hole—thru or SMT type would be soldered in place or the LED's connected leg to leg without using a PC board.

The LED's are mounted flat in rectangular patterns or in concentric circles or on or within holes situated on geometrically curved surfaces such as on a sphere or hemisphere of round, parabolic or elliptical shape according to the desired candle power distribution pattern. The LEDs can be mounted perpendicularly to the geometric fixture surfaces or at any other angle. When mounted perpendicularly the surface geometry is dictated by the light distribution pattern and the LED photometrics. This is the generally assumed design case in this disclosure. However, any geometry is possible with the non-perpendicular mounting of the light sources. A flexible PC board is manufactured in the flat and then "origami" style cutouts are made allowing the PCB to be bent and shaped into the preferred form. LEDs are insertable into holes made in plastic or metal forms to secure the LEDs in the correct location at the correct aiming.

For fluorescent lamp retrofit applications, the MSLS "luminaire" would be linear with LED's mounted all around the circumference or predominantly downwards for whichever lighting effect is desired. While a fluorescent's light distribution is usually not controlled in the longitudinal direction (the reflector can't get around the long dimension of the lamp) the LED version would be spatially directed so as to give uniform light. In comparison to a fluorescent lamp, where the light is produced equally in all directions irrespective of the final distribution pattern required in the room, the DLF has the advantage of producing light directed only where it's needed. The number of SLS aimed in a specific direction at the time of manufacture is such that the proportion and angle of the light going to the ceiling and floor are calculated to produce the desired result. Louvers and reflectors are unnecessary to prevent glare or redirect the light. Up to 40% to 60% of the light produced in a fluorescent fixture goes to waste due to these considerations.

In other embodiments of a linear fluorescent replacement SLS lamp "luminaire", the position regarding the nadir (floor) of the rows of SLS are adjustable. One or more SLS strips are free to move in an arc about a long axis such that they are aimed for uplight or down light. Apparatus is provided to fix the re-positioned SLS in place. Markers along the arc can delineate the angle. Thus, the installer can adjust the amount of up-light, down-light and floor coverage in the field, (markings on the fixture would indicate standard settings) just as an adjustable reflector changes luminaire light distribution. Here again, the difference is that there are no reflector-induced inefficiencies because of operation away from the ideal design point.

A pear shaped globe "luminaire" studded with LED's projecting light outward from the surface would give both downlight and up-light with more projection surface towards the down-light side in a typical 1 to 3 recommended ratio. Most buildings, rooms or areas to be illuminated are of a rectangular shape. The LED's on the DLF are concentrated at the 90-degree intervals. This yields a more square lighting pattern to ensure equivalent lighting in all areas of the room including the corners. This is in contrast to the chronic lack of even coverage obtained from the circular light pattern of present day light bulbs or most luminaires. At best these prior-art lamps give a circular light distribution which requires overlapping to ensure complete coverage of the area with the overlap lighting levels in wasteful excess of the requirements. A position oriented MSLS lamp has a greater concentration of LED's aimed at 90° intervals so that more light energy is directed into the far-off corners of a room to give an even illumination throughout the rectangular or square shaped area. A DLF is made with square, rectangular and even rounded light distribution if the application requires.

Typically, an incandescent or HID lamp is used in conjunction with a reflector to redirect the light to obtain a desired light pattern where more of the light is directed where it is most useful. A luminaire for area lighting will have a "bat wing" candlepower light distribution pattern, which yields equal horizontal illumination on a surface as it compensates for the "inverse square law" (a function of the cosine of the angle and the distance squared from the source). Generally, such an optical assembly has efficiency less than 80% due to losses on the reflector's surfaces. The MSLS needs no reflector to redistribute the light since each discrete SLS "digit" is aimed such that the candle power intensity varies with angle as is needed to give the optimum illumination on the room work surfaces for a given mounting height. The MSLS lamp distribution is pre-designed according to typical house or office settings. Thus, there is no need for a reflector to redirect the light and its consequent inefficiencies in order to obtain a "bat wing" distribution. The present approach by LED manufacturers is to provide single high output LEDs with optics yielding a "batwing" distribution. These batwings are usually less than optimal and are circular. The "digital" approach of this invention would yield a finer control and thus a more accurate batwing, generating a more even distribution in a rectangular/square vs. circular pattern.

In a DLF it is possible to combine a task light having a very narrow "spot" beam at the correct aiming with a general area lighting "flood" beam into one fixture. The digital lighting fixture is positioned according to recommended lighting practice near a workstation and correctly oriented such that the DLF gives a wide (though still controlled, so as not to cause glare on a computer display) general illumination distribution as well as a narrow distribution aimed at the desktop for high intensity task lighting. In a preferred embodiment a positionable task lighting spotlight located on a section of the DLF can be aimed manually or by servomotor to project onto the work area.

In another example of prior art practice a table lamp for reading is provided with a shade. The shade is there to partially redirect the light onto the book and also prevent direct, glaring, rays from the lamp used for general lighting from reaching the reader's eyes. According to the present invention, instead of having a glaring lamp producing light which is then made non-glaring by a shade at a loss in excess of 50% the LF is built such the amounts of light directed downward at useful angles and the amount of light directed upward are in the correct ratio. The surface area, from which discomfort-glare causing rays exit, is designed such that the luminous exitance is within recommended UGR levels for home use. The fixture has no need for a shade to protect from glare; the glare was never produced at those angles to begin with due to proper geometric design. To get the desired luminous exitance expressed in terms of lumen per sq. meter or luminance in terms of candela per sq. meter, the light exiting the source of specific intensity at angles which normally reach the room occupant's eyes, is spread over an area such that the exiting light is non-glaring. These lighting design parameters serve as the product specification and are incorporated into the initial design. There is no need to add on components to achieve correct lighting.

In MSLS technology an antique style table lamp uses a MSLS "bulb" specifically designed for the application, there is no need for an additional shade other than for aesthetics. The shade is a decorative element which diffuses a small amount of light for the rustic effect. The small amount of light which would be directed between 70° to 150° (the glare zone) would cause as little discomfort glare as that which is obtained from a shaded incandescent lamp but without the waste. This is done by sizing the area and intensity of the light source responsible for providing light at those angles such that the luminous exitance from the surface is within acceptable non-glaring luminance values. If desired, uplight to the ceiling above the glare zone is provided with light sources projecting between 150° to 180°. To maintain the aesthetics that people are used to or for the good feeling, a shade may be placed over the "digital" table lamp. A few LEDs can be dedicated for the purpose of illuminating the shade, either by projecting thru the shade and diffusing the light or projecting the LEDs into the shade as in a light guide. Colored LEDs could make the shade look yellow, pink or blue as preferred and programmed by the user.

The dimming capability of the MSLS is quite dramatic. A typical LED of today such as an Agilent® HLMP25-ED-xxxx will produce light at a tenth of a milli-Ampere and may be operated up to 50 mA. At 0.1 mA it may produce 5 milli-lumen while at 50 mA over 1000 ml. This is a hundred-fold range. Another radiation output control technique is to provide pulsed power in place of constant current. LEDS are operated on DC as well as pulse power and current as well as timing in terms of duty cycle, pulse width and other signal modulations are useable by the controller to effect intensity changes.

Correct lighting doesn't only include an even light distribution and a lack of glare but a list of other factors including intensity, warmth and color rendering. Experiments have shown (IES Lighting Handbook 8th edition p. 99) a graph of preferred color temperature of light sources at various illumination levels. The graph specifies a warmer color temperature say 2,500 Kelvin for lighting levels in the 100-lux range and a cooler temperature say 3,500 for 1,000 lux. However, a typical dimming system used in a fluorescent luminaire will lower the lighting level but will not change the color temperature. A DLF of the present invention will change the balance of the different spectrum light sources in order to achieve the correct color temperature for the new lighting level. As far as dimming goes, it possible to get an instantaneous "instant on" from the SLS light source. Thus, with a built in or exterior motion detector, the DLF can be operated at emergency lighting levels, sufficient for orientation, and then immediately power up to full level when someone enters the room. Whereas a fluorescent dimmed to 50% power will give a negative return of only 10% light an LED will generally give a linear if not positive decrease in power with light reduction. Auto-dimming circuits taking sunlight into account have been touted as an energy saving technique.

In another embodiment, the electronic luminaire has a light level detector and automatically adjusts the output to the required level. If the lighting level on only one side of the room is enhanced by the sunlight, directional luminance meters, external or integral to the DLF, detect the imbalance and the controller dims only those SLS oriented to illuminate in the sunlight illuminated direction. This detailed spatial distribution intensity control is not possible with other lamp types.

The MSLS lifetime is long such that there is essentially no need for "lamp" replacement over the life of the DLF luminaire. However, power supply circuit and light source characteristics may vary over time and correct lamp color will deviate from the standard. A feedback control loop using sensors would recalibrate color based on daylight readings over the twenty-year lifetime of the fixture. Thus a photodiode with an RGB filter is calibrated under natural light conditions. Alternately, discrete wavelength or alternately stable "white", or color, LEDs which are used only for calibration or only operated in a regime where their color is known not to shift are used as the recalibration color standard. This basis serves the dimming system in its color temperature control over its lifetime. The controller is programmed over the lifetime to seek possible recalibration opportunities. These may include using daylight or other artificial light sources available when the LSLS is not producing light. The systems can determine the accuracy of this source partially by comparing it to its previous factory or onsite calibration. Time of day analysis and initial small deviations would allow the system to evaluate whether the source was a reliable standard to use over its lifetime to correct for component color shift.

To ensure higher reliability the MSLS in the preferred embodiment will make use of large-scale integrated circuit technology where the LED junctions, Zeners and other elements are interconnected on, a chip. The chips then mounted into plane surfaces which are flat, rounded or X-hedrons.

The MSLS lifetime is long such that there is essentially no need for "lamp" replacement over the life of the DLF. This requires that the designs of the other electronic components are similarly reliable. The fixture mechanical design is again a significant departure from prior art. The fixture is sealed for life. There are no openings, gaskets, and sockets and there is no need for a mechanism to open the luminaire. All the components can be encapsulated for life to prevent water and dust ingress and thus provide a reliable, maintenance free, weatherproof and hazardous location ready lighting fixture.

The small dimensions of the light sources makes them ideal for use in conjunction with fiber optic light transmission systems. One of the primary requirements of such systems is the ability to collect the generated light into the narrow fibers. The excellent controllability of the light beam and the small source size allows for the generation of high-power narrow non-dispersing beams as would be used in flashlight, searchlight and beacons.

Multiplexing of the lamps is possible for power and lighting effect considerations. Slower duty cycles will reduce energy consumption, increase lifetime and would be used in a number of applications. Aircraft warning beacons which flash is an application, as the on off cycling of an LED is not harmful to lamp life as it is to an incandescent lamp. Disco lighting-effect lamps are another flashing application. Dimming as well as illumination color can be carried out with both the duty cycle and current being altered.

In summary, as opposed to LED industry trends of going with a single large source, the present invention provides multiple smaller sized sources of differing characteristics such that their combined effect is greater than that which could have been offered by sum of the individual parts operating separately. The added controllability offered by breaking the total light output up into discrete specifically aimable and dimmable elements, "digits", which can be addressed by control electronics to effect intensity, spectrum and distribution, yields a lighting fixture (vs. lamp) of unparalleled performance.

DESCRIPTION OF THE PREFERRED EMBODIMENTS

In order to better understand the preferred embodiments and methods of this invention reference is now made to the following figures.

FIG. 1 is a block diagram of the elements which in combination provide a digital lighting fixture (DLF). The DLF serves as a complete luminaire solution including: power conditioning circuitry, control electronics, sensors, mechanical fixture and light source. The DLF replaces the lighting fixture, ballast, socket, lamp, dimmers, reflector, gaskets and fasteners with a sealed for life electronic assembly. An electric power source 1, supplies power at line Voltage 110 to 480V or at low Voltage 12-24 Volt to the DLF 2. The DLF includes more than one light source 3, which is preferably an electroluminescent solid-state light source but may be any other light source, such as incandescent, high intensity discharge, fluorescent, etc such that the individual characteristics of each lamp's light are combined in operation to achieve a sum of the characteristics presenting a benefit not achievable from a single source alone. The light sources are affixed or contained within a mechanical device 4, which may serve as containment to all of the components and facilitates affixation to building surfaces. The electric power is received in the correct waveform, voltage and current from the power source 1, or is conditioned within the DLF 2, by power conditioning elements and circuitry 5. The direction of light exiting from the DLF as a whole or from each SLS individually is controllable by optical elements 6, such as reflective surfaces and or refractors, and may be electronically variable optical elements.

The separate light sources may be of the same color and intensity characteristic or may have different color and intensity characteristics. Thus for a 3-stage light bulb equivalent, each of three sources can have the same lumen rating or two sources are used where one is twice the output of the other. In a finely variable, digital embodiment the effect of continuous dimming effect is achieved when the differences in the lighting level is imperceptible to the people in the room. Typically a 5% change will not be perceived. Thus with twenty equivalent intensity LEDs as a base (one additional would add less than 5%), additional quanta could be smoothly added, or on the other hand, to in reality perform perceptible dimming (which is the objective) a greater than 5% change should be effected. The same is true for the final spectral color of the light emanating from the DLF to illuminate objects. The eye adds the radiation reaching the eye and cannot perceive the separate components, contrary to the ear's recognition of sounds where each frequency is individually resolved. Therefore, quanta of specific spectral color energy may be added to the mix without perception. For example changes up to 200 degrees Kelvin in HID lamps are not perceived. Thus to effect a noticeable color change, a quanta of spectral color power would need to be added or detracted from the sum.

In a preferred embodiment the DLF contains logic control electronics unit 7. Logic control electronics unit, 7, receives input and/or feedback from motion, intensity and/or spectral sensors 8, or from manual control button 9 and increases or decreases or turns on or shuts off the power to one or more of the SLS to effect the desired change. That is, the control logic unit 7 has stored parameters for intensity and spectral distribution and operates the MSLS lamp within the predefined range. The control unit may include a DSP or computer with storage media, computer algorithms, signal input and output electronics, analog to digital converters, and communications elements to carry out intensity, distribution, dimming and color balance control. Computer algorithms and instruction sets 7A are induced by the logical controller to manipulate data, calculate results generate output signals and maintain the operating parameters within the specifications. Measured parameters are checked against the stored parameters and the control circuitry adjusts the power to SLS.

Sensors 8 include any of the following: light, temperature and motion detection devices. Two types of optical detection sensors may be used: A photo detector with specific spectral sensitivity to detect a specific color. For example a standard red, blue and green set which would then indicate how "white" the light is. Alternately, a wide spectrum photo detector that irrespective of color measures the intensity of each excited die as it is test fired, based on the eye visual sensitivity curve. The optical sensor may be lensed and capable of forming an image, that is a camera and the detector may be a detector array of photodiode pixels. The detector array may be a CMOS or CCD VSLI array and may be monochromatic or color as in a monochromatic or digital camera. Such arrays are readily available in mega-pixel resolution.

With changes in ambient lighting the light sensors detecting conditions at a specific location receive input. The detector instantaneously reads the ambient during a momentary shut off the artificial light source. The momentary shutoff is of short duration, e.g., less than one millisecond duration, at rates undetectable to the users as the eye does not discern flicker rates above $\frac{1}{100}$th of a second. The controller then readjusts the driving circuitry to the correct power level. The sampling of multiple sensors around the DLF can be simultaneous using buffers in the controller to facilitate analysis by methods known in the art. Alternately, the light sources and coordinated detectors at specific locations are turned off, sampled, turned on again and sampled, to verify that the illumination is within recommended specifications. Interaction between DLFs, located in close proximity to each other, is avoided, by the use of the short-duration momentary shut-off controller readjusting time interval. The probability of simultaneous controller readjustment of two adjacent DLFs is very small. Further, the timer which controls the time between the controller readjusting time intervals, is preferably analog, such that there is very low probability of two DLFs having the same time between controller readjusting intervals.

In a system with feedback, changes in the light source output reflected back to the lamp such as color shift and diminishing flux over time can be compensated for. A typical fluorescent or HID source will experience serious color shift over its 10,000 to 20,000 hour lifetime. It would be a significant advantage to have a 100,000 hour life lamp with color accuracy over the complete lifetime of the lamp.

In a preferred embodiment a re-calibration system will operate as follows. The DLF is provided with a reflective rod or strip the surface of which has a wide spectrum, non-angle of incidence dependency and stable reflection characteristics over time. The reflective rod or strip is positionable so that the rod or strip can reflect light back to the outward facing photodetector based on the DLF body. In another embodiment the DLF is provided with a calibration wand on which inward facing photodetectors are placed. The calibration wand is capable being positioned such that the detectors can detect SLS performance. Both the reflective rod/strip and calibration wand can be narrow such that they can be permanently deployed about the DLF and not block light. In another embodiment the rod, strip or wand is stored and is only deployed when calibration is required. When called upon, the rod, strip or wand is rotated around the DLF to read SLS intensities. Alternately, the DLF body rotates and the rod, strip or wand remains fixed. The DLF is originally calibrated in the factory using external detectors. The spectral output of each SLS is calibrated with the power supply controller over the range of power outputs and the characteristics are stored in a memory device for recall during operation. The calibration wand or reflective rod or strip is then used by the DLF in an internal calibration where the DLF detector's readings at the initial SLS power settings are recorded. These readings become the standard for future calibrations, where the controller will affect the power to individual junctions such that proper intensity and color is produced.

The DLF has a clock unit and/or a communication unit capable of receiving signals from the US government operated "atomic clock" which is located in Colorado. The DLF automatically searches for the signal or once a day it automatically recalibrates its time. On a periodic basis after degradation is assumed to be significant, the controller 7 invokes the calibration routine.

In another preferred embodiment the DLF surroundings are used for calibration in place of the calibration strip. A short time following installation, (after the furniture and decor has settled down), an on site calibration is scheduled and run at the first opportunity. The purpose of this on-site calibration is to have the controller check the spectral characteristics of the illuminated area. A specific die on an SLS is fired on a timed basis and the controller reads the photo detector value. The new site-specific reading is then taken and compared to the original calibration and stored. The site-specific reading will serve as the base for the next calibration, as it is assumed to render the surroundings correctly based on still calibrated light sources. The next calibration may be scheduled for night and holidays to ensure a date when dark conditions prevail. If darkness cannot be ensured, the incremental shift in intensity above the ambient can be measured. Photo diode detectors of known field of view are placed on the DLF such that SLS output is detected. In lights out conditions of darkness the controller takes a base reading sample of a detector. The base reading allows the subtraction of "noise" from further readings. During the calibration the base reading may be repeated to ensure accuracy. Periodically, possibly every half a year, more or less depending on manufacturer data of how much the LEDs drift from their initial performance, a calibration routine is run. If a change in decor has been made, then the drastic change will signal the logic controller to ignore the latest reading and use the present "white" setting to recalibrate the new decor. Although photodetectors are stable devices, over a 30 year DLF lifetime it may be necessary to calibrate the photodetectors as well. Absolute intensity readings can only be recalibrated against a laboratory standard. However, daylight may be used to recalibrate color sensitive photodetectors over the 20-year lifetime. At the post installation calibration session a day reading of photodetectors is performed and the readings analyzed for daylight sources. This is done using the clock where daylight will show a predicable spectral shift over the hours of the day. The controller will then compare the readouts of detectors over the day to identify those exposed to daylight. First during the day readings of the photodetectors are taken.

The detectors facing the daylight are assumed calibrated to read "white light. In darkness SLS units, SLS 1 in view of one calibrated daylight facing detector, detector 1 and one uncalibrated detector, detector 2, are powered to produce white light as determined by the calibrated detector. Now detector 2 is calibrated. Moving stepwise around the DLF the process is repeated with now calibrated detector 2 used to adjust SLS 2 located between detector 2 and not yet calibrated detector 3 to produce "white" light. SLS 2's output is then used to calibrate detector 3. The process continues around the DLF till other daylight-calibrated detectors are reached. For greater accuracy the process can then be preformed in the other direction, moving stepwise until detector 1 is reached again. By using this nodal analysis method discrepancies propagated in the calibration process are reduced.

A power guide 10 can serve as both a power distribution and mechanical affixation device to the placement of additional DLF units 11 within an expanse. Light output 12 from one DLF may differ in distribution from another 13, if say one MSLS is in the center of a room and the other is at the edge or one light illuminates steps between the landings and another is the last step before the landing, the last step would be illuminated in a different color.

Since an LED device is operable over a wide range of currents, when an LED serves as the light source, dimming and color balance are smoothly and infinitesimally variable.

For the purpose of illustration, a preferred embodiment of the present invention is presented in FIG. 2B juxtaposed with a prior art solution using LEDs shown in FIG. 2A. A typical "bulb" shape with a screw in base is provided for retrofit locations where a socket is available. The prior art design depicts LEDs spread out on the surface of what looks like a reflector lamp. It is evident from the downward facing 5 mm hole-thru type LEDs—14 that no attempt has been made to extract a "batwing" or any other effective type of light distribution pattern. Upward facing LEDs—15 seem intended for uplighting and again it is clear from the symmetry that no attempt has been made to provide a rectangular pattern which will give a better use of light for indirect lighting.

FIG. 2B illustrates the teachings of the present invention. In this case, although packaged to appear as a typical "A" shaped light bulb, the device is actually a DLF and provides a complete lighting solution. Although shaped like a lamp with a screw base to facilitate replacement when the "lamp" burns out, this is not necessarily the intent. Rather, in the present concept, after 100,000 hours (over 30 years in typical use) its time to refurbish the room and change the fixture. The outward design is thus generated by what people expect to purchase and not what a DLF, that is not a lamp should look like. A true DLF design would not include the ceiling mounted socket and would be provided with a wiring connector and accoutrements and fasteners for attachment directly to the ceiling.

A retrofit MSLS lamp or digital lighting fixture/luminaire 16 intended to replace the lamp, fixture, reflector or shade and control-gear combination of a typical lighting fixture, includes a screw base 17, which receives line power 18 into the electronic power conditioning circuitry 19. In a preferred embodiment, control circuitry 20 is provided in the lamp. The input to the control is from an external source or internal logic circuit or both and in a preferred embodiment a sensor pack 21 with one or more radiation and communication sensors capable of detecting motion, day/night, spectrum, luminance etc is provided. In external control, a control signal 22 rides on the power signal 18 and enters via the screw base 17 or an infrared or other radiation detector provided in 21 picks up the control signal. Discrete packaged light sources, e.g. Solid-state Light Source SLS 23 containing one or more junctions are mounted on the DLF lighting fixture body 24 and connected to the controlled power circuitry that determines which of the SLS 23 will operate and at what power. Each SLS with it spectral and distribution characteristic is mounted in a specific location on the surface of the DLF with an angle $\alpha$, 25 from the nadir. Any angle from the nadir is possible including 180 degrees and the light flux can serve to provide uplight or illuminate a picture on a wall.

In a position oriented lamp arrangement, that is where the socket has a distinct stop point, detent or pin and is mounted substantially oriented to the room or its contents such as a work desk or wall painting, and also the DLF has a specific mounting orientation relative to the socket, then the light distribution can be nonsymmetrical and tailored to the needs of the room. The screw base 17 has a detent or pin 26 that coincides with the stop point on the socket, which is mounted in a specific location radially around the lamp at an angle $\beta$, 27 in reference to pin 26 and a design start point on the circumference of body 24. The SLS are placed at an angle $\beta$ horizontally and vertically angled $\alpha$ to illuminate specific areas and also have their own spatial light distribution angle $\theta_1$ 28A. An SLS aimed to illuminate an interior area may have a wide distribution or a distribution without a sharp cutoff 28A while those SLS located at the edge of the area to be illuminated may be of narrow distribution $\theta_2$ 28B and have a sharp cutoff. This technique is similar to how a sport playing field is illuminated with multiple floodlights. Floodlights of narrow beam spreads such as a NEMA 2 are used to illuminate at the edge of the illuminated area while wider NEMA 4 beam spreads are used near the center of the playing area. The MSLS lamp will have concentrations of SLS at specific aimings to provide a wide "flood" type distribution to one part of the room and a "spot" type distribution to another such as to a painting on the wall. Each illumination target is at a different light intensity and color temperature or color rendering.

In another embodiment SLS, which perform an equivalent to a task light function with a very narrow beam, are combined with SLS performing a general background lighting function in one fixture. While general lighting recommendations in an office call for the provision of 300 to 500 lux over the working plane, specific task lighting, for example where copy work is to be illuminated by auxiliary lighting, 1,000 lux is required. To this end a section 29, containing SLS on the DLF, provides a narrow beam of higher intensity, to provide added light flux to the working surface. In an alternate embodiment section 29 on the DLF is on a swivel and can be manually adjusted to be aimed at the worktable. In an alternate embodiment the swivel is positioned by a servomotor and controlled by a remote control unit. In an alternate embodiment to the fixed task light section 29, in an attempt to cut down on separate fixture types with left or right handed spot or other asymmetric orientations, the MSLS portion of the DLF body 24 is rotatable in relation to the affixing base 17. Such an embodiment also obviates the need for a position oriented socket and base pin 26.

In another embodiment, modulating the output of wide distribution and narrow distribution LEDs by the controller varies the net resultant beam spread characteristics. The fixture is placed near a workstation and gives a wide distribution general lighting as well as a narrow high intensity beam for increased illumination level task lighting on demand.

In order to assure an even distribution of light from a point source over an area, it is necessary to take the effects of the angle and distance to the illuminated surfaces into account as stated in the inverse square law. Often a "batwing" type of candlepower light distribution is used. In a prior art luminaries the reflector, which concentrates reflected rays in the higher angles, accomplishes this. In a preferred embodiment of the MSLS there are more, or more powerful, SLS over a range 1 aimed at higher angles to increase light flux at those angles in order to maintain an even light distribution. If the lamp is specifically oriented in relation to the room concentrating more light into the distant corners effects a squared distribution pattern, which would fill in the corners of a square room with equivalent illumination. An added amount of SLS are added on the DLF body 24 at 90 degree angles on $\beta$, 27 where SLS aimings will push added light into areas corresponding to the "corners". To effect uplight towards the ceiling or for indirect lighting SLS 23A are aimed towards the ceiling such that an optimal utilization of the light is achieved.

In the preferred embodiment color of light emanating from an SLS 23 is "white" light. This is accomplished by using a "white" light producing arrangement of LEDs that is comprised of two or more spectrally differentiated junctions, which then combine their light output such that the illuminating light appears white. Other white LED technologies use phosphor or other coatings over the junction which causes a shift to longer wavelengths. The separate junctions in an SLS or separate SLS may be independently controlled. In a multi-junction SLS the total color of the illumination may be shifted to "warm" or "cool" light in correct accordance with the illumination level (see FIG. 10) or other considerations. In another preferred embodiment, a motion detector is used to conserve energy. The room lamp is dimmable to a lighting level sufficient for safe orientation. A motion sensor 21 picks up activity and increases the illumination level to meet the activity level. This integral placement significantly reduces the wiring from sensor to power supply and again back to lamp in prior-art dimmer—motion sensor applications.

In alternate embodiment each SLS 23 may have a non-white color. The operation of many SLS in unison of different or similar wavelength may be used to create any color desired from white to monochrome in any specific region to be illuminated. A spectrum sensor 21 inputs data to controller 20, which maintains color at predefined level. Such a feedback mode allows for the MSLS to maintain constant color over the full lifetime of the lamp even if specific wavelength SLS shift output characteristics such as light flux and spectrum with age within bounds of the sensors calibration over age. Constant color is maintained in a room with an influx of a less desirable color temperature light on one side. Spectrum sensor 21 with a specific orientation would detect a "cool" light reflection emanating from a specific side of the lamp and will increase "warm" e.g. 2000K light to compensate. Over the long lifetime the DLF could recalibrate its spectral sensors 21 to white light based on readings of daylight where such daylight is available and the controller has determined that the room at the time of calibration is being illuminated with white light "daylight" of a specific color temperature per orientation and time of day.

The same light distribution effect based on light source aimings could have been accomplished as in the prior-art, easy to manufacture flat pc-board configuration by simply angling the LEDs 23B from the perpendicular as shown in FIG. 2C. Shown is a side view of a PCB provided with standard 5 mm hole-through LEDs. The LEDs are produced with standoffs on the legs such that after soldering automatic machinery can bend the legs so that the LEDs project at the required angle from the nadir to achieve the required photometric pattern. Lead bending as is known in the art also allows for uplight as with LED 23C. Though not as elegant as DLF 16, this easy to manufacture configuration will accomplish much of the sought after light distribution.

Figure 3A:
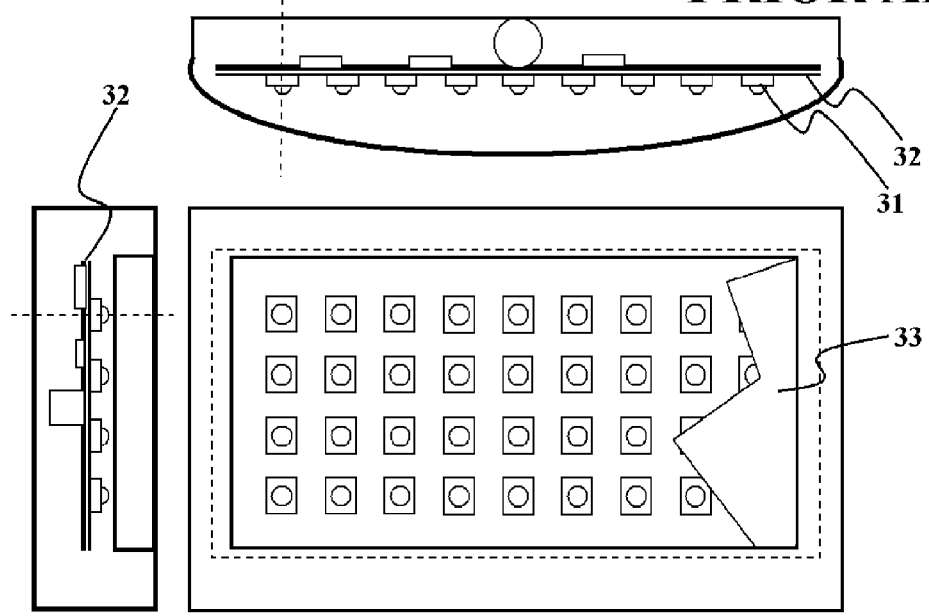

FIG. 3A is an illustration of a prior art wall sconce for outdoor use displayed by a leading LED manufacture in at a lighting trade show in 2003. It is juxtaposed with FIG. 3B to highlight the difference in the design methodology as taught buy this invention. The very aesthetic prior-art wall sconce fixture encased in a curved decorative frame is portrayed in top, front and side views. It uses a multiplicity LED light sources to shine through a diffuser to produce an even glow. "White" LEDs 31 were placed on a flat printed circuit board 32 and the light was dispersed via a white diffuser 33 with the light exiting lambertianally in all directions. The good optical control initially present on the LED 31 is now squandered on the prior-art diffuser in an attempt to prevent glare from the pinpoint LED source and produce a pleasant glow on the diffuser. Light is projected evenly in all directions including uselessly upward, where it will help drown out starlight. The prior art flat PCB and optional metal heat sink 32B facilitates manufacture and heat transfer and that is probably why the design is the way it is, with production feasibility considerations driving the design, rather than correct energy saving lighting principles.

Figure 3B:
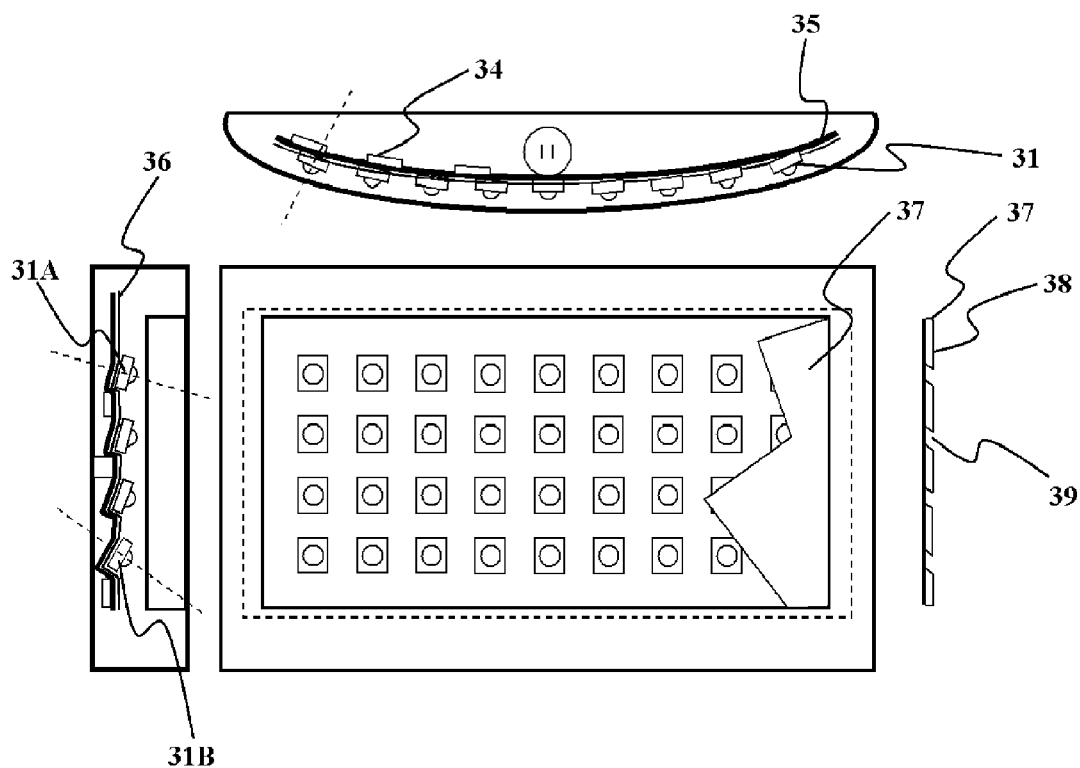
FIG. 3B to illustrate another manifestation of the same improved lighting design methodology embodying the components suggested in the block diagram of FIG. 1

FIG. 3B illustrates how the same improved lighting design process can be accomplished for an outdoor wall sconce DLF intended to illuminate a walkway at night. According to the teachings of this invention, the LEDs 31, power supply and other electrical components 34 are assembled on strips of semi-flexible printed circuit boards 35. The LEDs can be multi-colored or monochromatic LEDs with overlapping coverage or white LEDs. As illustrated in the top view of FIG. 3B, the LEDs 31 are mounted on a convex surface 35 such that some face to the left, some right and a smaller quantity towards the middle. The middle aimings require fewer light sources due to the inverse square and cosine law for a point source as is this DLF, where light at the angle of illumination of 0 degrees is more intense than for light at an angle greater than zero and a point closer to the DLF is more intense by the square of the distance in the denominator. The exact solution for the aimings is such that for a desired coverage and illumination level the illuminance equation 1 is used to calculate the necessary light intensity in candela at each aiming angle. The side view shows the LEDs 31A and 31B with varied downward angles, such that even illumination is produced on the walkway out to the prescribed distance from the wall. The PCB strips are optionally affixed onto a curved and angled aluminum heat sink 36 with electrically insulative but thermally conductive adhesive such as Dow Corning® SE 4400 Thermally Conductive Adhesive.

The diffuser 37, is shown in the side section view to have white diffusing sections 38 and clear, fully transmissive slots 39. The controlled angular distribution light emanating from the LEDs 31 passes through the clear slots 39 and illuminated the walkway. The diffuser 37 is illuminated by stray light emanating beyond the controlled angle of the LED 31 or one or more LEDs can be dedicated to the task and aimed into the diffuser material, using it as a light guide to spread the light within the diffuser as is practiced in the art.

FIG. 3B illustrates how the same end result as the prior art fixture FIG. 3A, of having a pleasantly illuminated diffuser can been accomplished while not compromising on the energy efficiency and correct lighting output of the luminaire. The fixture aesthetics can be maintained while a more physically compact design can be carried out. The components depicted in FIG. 3B are possibly more complex and thus initially more costly. However in a comparison of the life cycle cost per effective lux, which includes the electricity charges over the life of the fixture, the DLF is certainly superior to the prior-art.

The above design depicted in FIG. 3B is easily adapted to a hallway application where some light to the ceiling is beneficial. To provide up light a row of LEDs 31A is aimed towards the ceiling instead of downwards.

Figure 4:
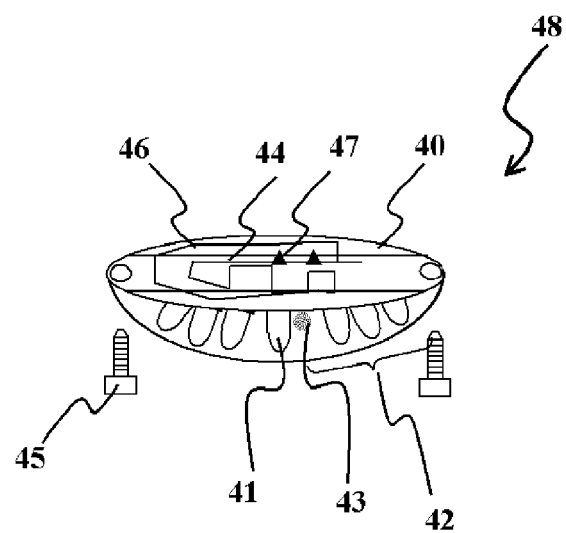
FIG. 4 is an illustration of a Surface or Railing Mounted Digital Lighting Fixture.
Figure 4:
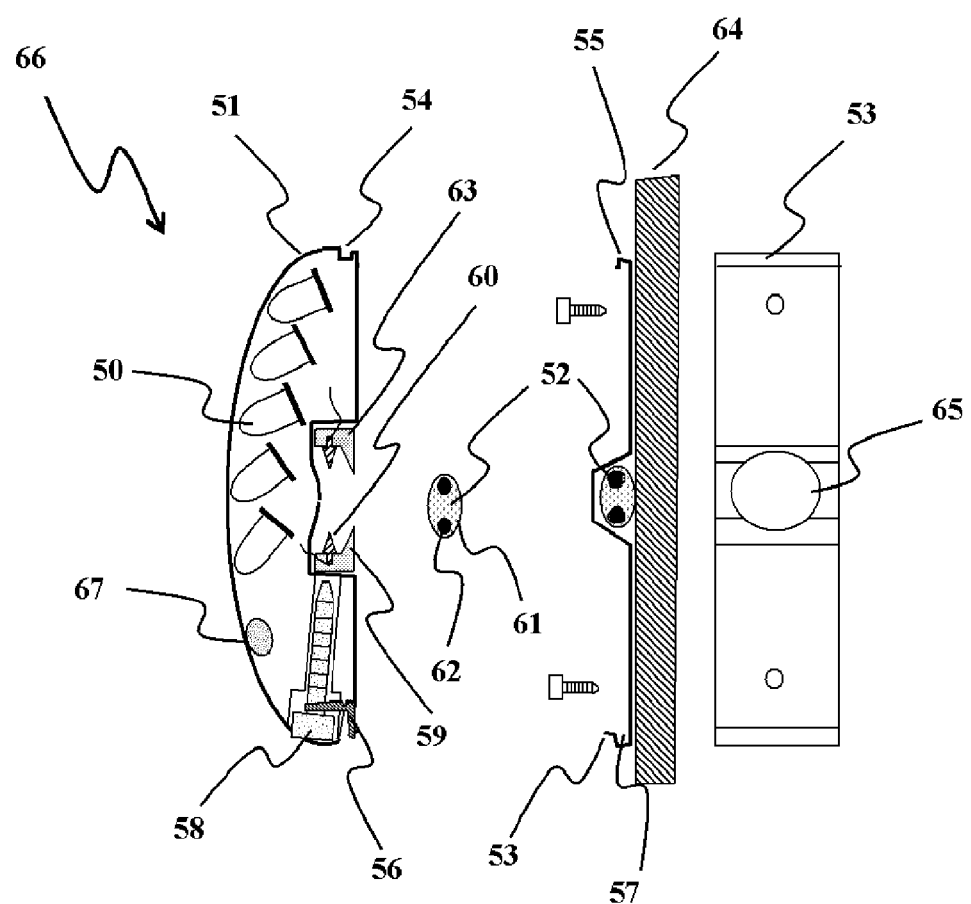

FIG. 4 illustrate additional embodiments of a DLF which may take on any shape be it disc shaped or linear depending on the aesthetic choice of the designer and the lighting application at hand. Thus, a preferred luminaire configuration for lighting an area from within, (using a number of lighting fixtures to prevent shadows) would be a concentrated point source design. To illuminate from the perimeter of the room or along a walkway, a linear configuration luminaire or many distributed point source luminaires are optimal. In FIG. 4 a disc shaped containment 40 would contain SLS 41 where again, the radial position of each SLS and the aiming is such as to yield a specified lighting pattern on the surfaces to be illuminated therefrom. A smooth light distribution is achieved by aiming relatively more SLS 42 in the direction of the more distant (or less perpendicular) surfaces or objects to be illuminated. One or more sensors such as motion, day/ night, spectrum, luminance, are provided for in 43 or any other location as is required. A printed circuit board with power and control circuitry is provided for 44, as are screws 45 and or adhesive on the rear 46 for affixing to a surface. Electrical connection is made via a connector or sharp prongs to a conductor 47 which are pressed against the conductors to make electrical contact. The total assembly 48 with its light sources at specific positions and aimings, its power conditioning and control equipment and connection to power source, be it integral such as with on board batteries, or external from a power line constitutes a complete lighting fixture replacement element.

Based on the disc or puck shaped integrated luminaire above an application featuring a snap on Step Light 66 used outdoors is illustrated. One or more SLS 50 are contained in housing 51 which is substantially transparent in the area in front of the SLS. The SLS light source is very long lived therefore the unit is sealed watertight for life in the injection molding process or via glue. The SLS 50 are aimed so that the distribution pattern, at standard mounting height, effectively illuminates the steps. In one embodiment the luminaire is provided in two models each specific to a right side and left side installation with opposite aimings in order to yield an even distribution along either the receding or proceeding stairs.

A two-conductor cable, which conducts power 52, is installed along a building surface or railing along the area to be illuminated. A bracket 53 is attached to the wall 64 on which the light puck is to be placed. The slot 54 atop the puck is inserted under the top clip 55 of bracket 53. The puck is hinged down and the bottom pivoted, catch lever 56 enters within the void of bottom clip 57. The screw 58, which can be a tamperproof screw to prevent removal by vandals, is tightened forcing the protruding leg of top-heavy catch lever 56 to fill the void in the bottom clip 57 of bracket 53 and lock the light puck in place. At the time of tightening screw 58 pushes contact block 59 with conductive piercing prong 60 against power cable 52. Conductive prong 60 pieces outer insulation layer 61 of power cable 52 and makes contact with electrical conductor 62. Further tightening of the screw 58 forces the prong on the opposite contact block 63 to pierce through the insulating layer and make electrical contact. A power cable 52 conducting current at low voltage, say 24 Volt, may be directly affixed to the wall 64 without enclosure in a conduit, and the light puck attached at points along the power cable. A bracket or clip 53 is used to affix the lighting puck fixture to the wall and has an opening 65 for the contact blocks 59 and 63 to fit through. The fixture 66 may be sealed for life during manufacture since there are no serviceable parts inside for the lifetime of the electronic components.

Other applications include stairwell lighting that is activated by motion detector or is always on due to the low power consumption or a combination of constant low level on state, with the increase to full power based on activity. Distributed along a power strip running along the stairwell are disc shaped DLF units such as luminaire 66. A motion detector 67 in the first and last units between the floor landings is used to turn on the lamps ahead of the person using the stairs. An outdoor solar energy step light application will use a photocell or any other arrangement to turn the system on at night and a motion detector to turn the lights on for a short duration after motion is detected thus reducing the amount of energy needed to be collected in solar cells. Instead of being in a totally off state, the lighting can be partially on, such that it is visible in order to give definition to the landscape and help in orientation. This power usage is very low since even at very low current LEDs are visible at night. Upon being initiated by the motion detector it can go to full power to illuminate obstacles in the path.

Last Step or first step could be indicated by a different color of light. A motion detector could accordingly change the MSLS output color if the individual is approaching the steps say to green and to amber or red when reaching the last step.

Figure 5:
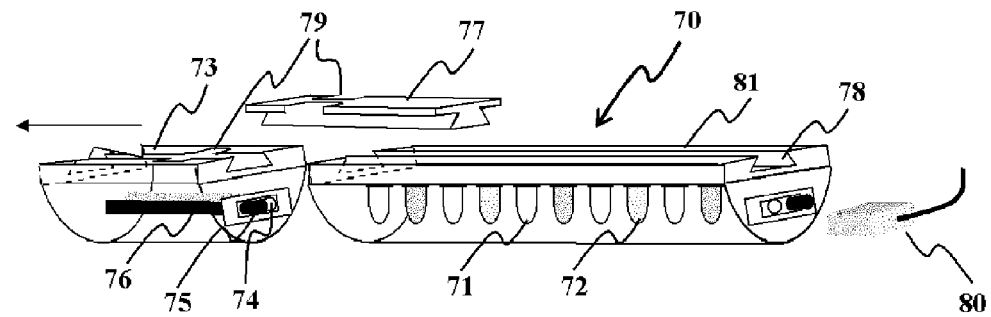
FIG. 5 is a Surface or Railing Mounted Distributed Digital Lighting Fixture.

FIG. 5 illustrates another DLF embodiment, a linear lighting fixture 70 where the similar or different SLS 71 and 72 are distributed along the area to be illuminated such as is typical with fluorescent lighting fixtures used in soffit lighting. The system may have a power conducting strip of a similar shape 73 which connects to lighting strip 70 via receptacle 74 and pin 75 set and which are attached to conductor set 76. The two strip types, the lighting fixture strip and the power conducting strip may be adjoined together or affixed directly to the wall or attached to bracket 77 which may slide into a slot 78 in 70 and 73 and where there may also be provided matching cutouts in the lighting fixture and bracket. The matching cutouts 79 allow for a quicker, straight on insertion before sliding horizontally in the slot 78. The bracket is thus first attached to the wall and the strips are brought up to the bracket and moved sideways to latch.

Many lengths of strips 70 or 73 up to the power capacity of the conductors can be joined together and connected to a power source with a connector 80. Interchangeable sections of the power strip can contain LEDs of different colors for effects or alternate between power strips and lighting strips for a similar aesthetic architectural design.

The lighting/power strip may be thin and linear substantially in one or two planes or for aesthetic considerations have curves or be constructed of a flexible material and have the ability to be manipulated into curves and bends in three planes, to make such designs as an arc, wave or circle. The electrical conductors may provide the malleability to shape the strip and then hold the configuration after it is bent up, for example if they are made of copper or aluminum or alternately an additional bendable, yet shape-retaining material may be inserted in the casing 81 or the casing material itself may have such properties.

The Lighting strip 70 and Power strip 73 may also conduct light and radiate light to give a lighting effect all along its length. Alternately, the strips may be a light conductor with little light exitance from the surface and the total internal reflection is selectively frustrated to let light out along the length in a specific direction or at desired intervals. The strip lighting may come from SLS specifically aimed to project light into the strip or from light leakage from regularly placed optimally (per the main lighting application) aimed LEDs.

Figure 6:
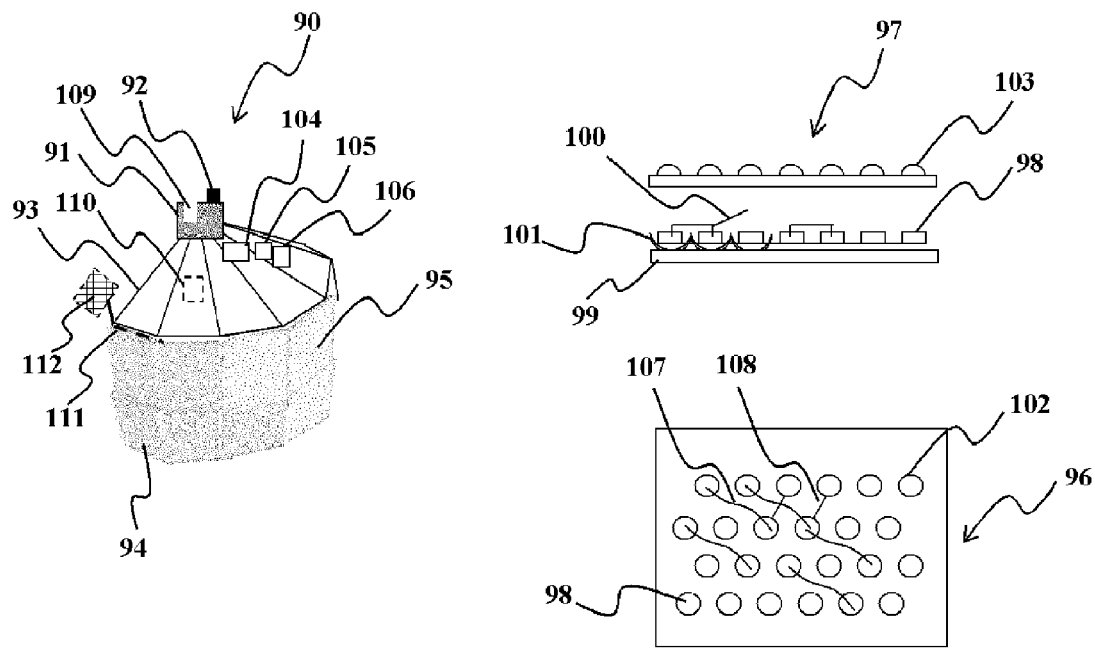
FIG. 6 is an Asymmetric Light Source made of Directional Chip Facets.

Another embodiment of a solid-state lighting fixture, DLF or luminaire is shown in FIG. 6. Whereas previously described luminaires were described as incorporating LEDs in standard hole-through or SMD packages, here, a luminaire using the unpackaged solid-state light source junction is described. A multifaceted luminaire 90 is comprised of any of the following list including a mechanical affixing method to a surface 91, an electrical connection to an outside power source 92, a mechanical frame 93 to hold the one or more light sources 98 or lighting facets 94. Power conditioning, heat rejection and control elements are contained on or within the interior of the structure 93. A number of light sources, facet or many facets are placed in position radially around the lamp and angled vertically to effect the desired light distribution. Thus while facet 94 is positioned in the frame 93 radially and angled so as to be aimed substantially downward to the left of the fixture position, facet 95 is positioned and angled to illuminate an area further out and to the right.

A detail of a lighting chip or facet is shown in front view 96 and side view 97. In the first embodiment P/N junctions 98 of light emitting semiconductor material are placed on a thermal conducting and or light-reflecting surface 99. Electrical connection 100 is made between the junctions often referred to in the industry as dies, such that different color junctions may be located in close proximity to each other and their combined light spectrum yielding the desired color. The power and control circuitry have access to each individual die, a cluster of dies or to a total facet. This allows for the dimming and color temperature adjustment of the illumination. To more tightly control the light intensity distribution the surface 101 beneath the light-emitting junction is formed concave to reflect and concentrate the radiation into a narrow beam. Alternately, or if additional optical control is needed, the top layer of the junction 102, if it is light transmitting, is formed to act as a lens such as a Fresnel lens or a surface 103 above the die serves as a lens.

The level of miniaturization is irrelevant. The principal is the method of powering and controlling the light source intensity directionality and color spectrum in one integral unit by varying power signal to specifically positioned light sources of specific spectral power distribution. Device 90 contains for this purpose any or all of the following: unit 104 for effecting the power conditioning of electric current supplied to the light emitting elements, a control unit 105 to vary power to specific junctions or chips and sensor units 106 to provide input and feedback to the control elements as described earlier in devices 2 and 14. The earlier described DLFs of FIGS. 1 through 5 are also designable using the facet light source building blocks.

In an LED, light is produced at the p-n junction of the diode. It is known that one of the major losses of light output from solid-state lamps is the absorption of light within the epitaxial layer of the chip. On a submicron level, other inefficiencies derive from defects caused by the lattice mismatch. Often LEDs are producing light at a quantum efficiency of approximately 5 percent. Depending on the chemistry and the junction molecular geometry a specific thickness of light emitting layer is required. Also the width of the junction is important as light is absorbed in the interior.

Light extraction from AlGaInN-based LEDs is limited by the various parasitic optical loss mechanisms present within or surrounding the AlGaInN epitaxial layers. These mechanisms include absorption at the semi-transparent metallic layer as well as absorption within many layers comprising the epitaxial portion of the LED, such as the buffer layer the active region and the heavily Mg-doped GaN contact layer. Because of the refractive index step between the multi-layered epitaxial structure (n=2.4) and the sapphire substrate (n=1.77) or the encapsulation epoxy layer (n=1.5), only approximately 25% of the light generated within the active region escapes into the epoxy or the substrate upon first encountering these interfaces. The rest of the light is trapped in a waveguide formed by the encapsulation epoxy layer above the chip and the substrate. The trapped light must travel distances on the order of the length of the chip to escape from the sides of the LED. Such distances require many passes through the various loss mechanisms within the LED structure, increasing the probability of absorption. Thus, much of this trapped light is eventually lost, decreasing the overall light output of the LED.

The LED is designed to allow the light produced to escape through an end face. However not all of the light is able to escape a diode in air because a portion is totally internally reflected at the interface between the diode and surrounding air. Due to the very high refractive index of most semiconductor materials, the portion of the light totally internally reflected is very large.

Therefore contrary to the present trend in high flux LED design of building very large, high current diodes, it would be advantageous to build a multitude of very small diodes with relatively large surface areas relative to volume and lessen these losses.

The layout of the facet in FIG. 6 is applicable to a submicron-sized dice 102 with nano wires 107 and other subminiature connectors 108 bringing power to the junction. To prevent absorption of light by the neighboring junction the cusped reflective structure 101 of the lower surface surrounds the lower hemisphere of the junction.

The reflector as mentioned earlier for the dice on the micron level may be similar to the one described in "Semiconductor light emitter" U.S. Pat. No. 5,537,433 by Watanabe, where a semiconductor light emitter, such as the light-emitting diode or the semiconductor laser, having a structure in which a light emitting area or an active layer; a transparent layer which is pervious to light radiated from the light emitting area or the active layer; and an opaque layer or an opaque substrate which is impervious to the radiated light are arranged in order or in the inverse order. The semiconductor light emitter includes (a) total reflection layer(s) arranged between the transparent layer(s) and the opaque layer(s) so as to come into contact with the transparent layer. The refractive index of the total reflection layer is smaller than that of the transparent layer. Therefore, at least one part of the light, which has been radiated from the light emitting area or the active layer and which has been reflected by the total reflection layer thereafter, is either radiated outward from side surfaces of the transparent layer or returned to the active layer.

To carry away heat from the electronic components, a hollow center 109 will act as a thermal chimney and components are mounted on heat sinks. In compact applications, a fan or pump 110 is used in forced circulation cooling. In alternate preferred embodiment, a highly optically transmissive cooling fluid, 111 surround the chips, junctions or facets 94. The fluid absorbs waste heat and circulates to a radiator area 112 on the body 93 where the heat can be transferred to the surroundings. The circulation can be natural thermo-siphon circulation, based on the density differences or forced, utilizing a pump 110. An added benefit can be derived from the optical coupling of the fluid between the junctions 98 or facets 94 and the cover 103. At an air plastic or glass interface typically 4% of the light is reflected back. With two such interfaces the loss will be 8%. The cooling fluid is selected such as to have a refractive index that it is close to the plastic, ceramic or glass used in the cover 103 and this loss mechanism is eliminated boosting efficiency.

Figure 7:
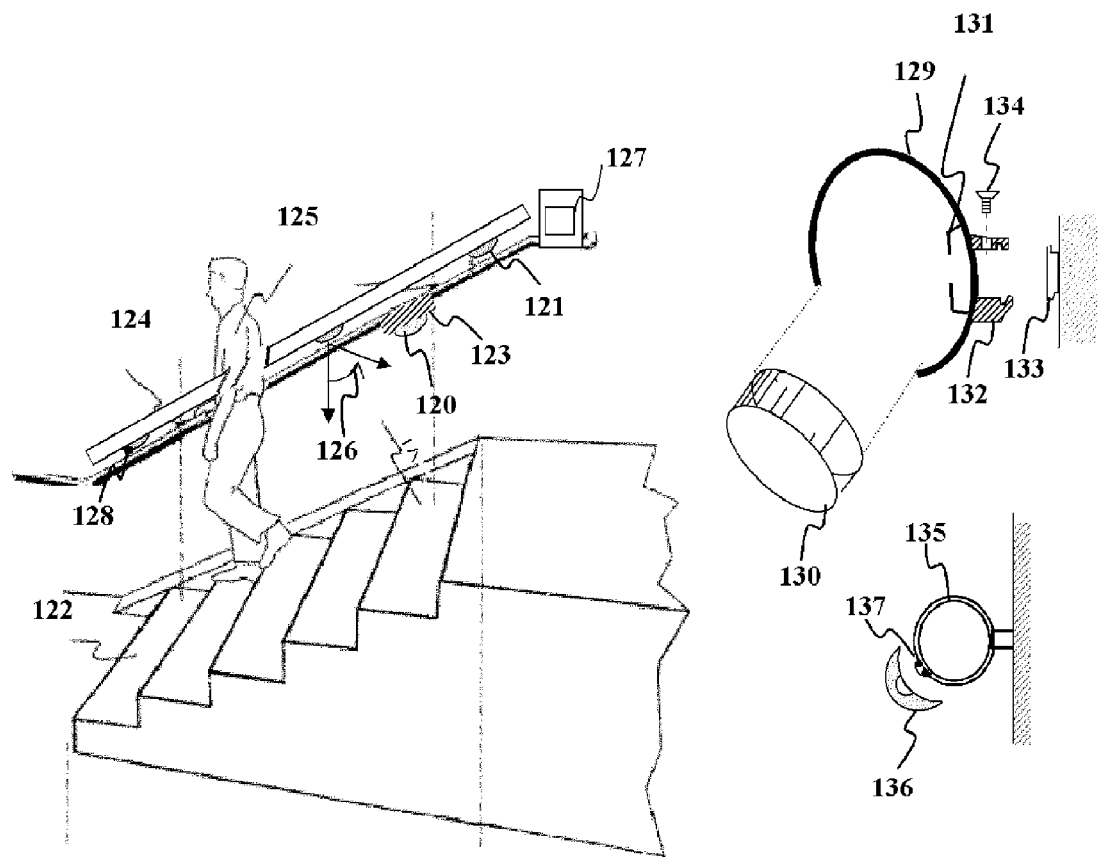
FIG. 7 illustrates an application employing the Discrete Unit Step Light.

FIG. 7 is an illustration of a typical application using the digital lamps as proposed in the present invention. A digital lighting fixture such as the puck shaped illuminating unit 66 of FIG. 4 described above shown here as 120 and 121 would be used to illuminate steps 122 by being affixed to the wall 123 or onto or within a railing 124. A pedestrian 125 using the stairs would not be blinded by stray light reaching his or her eye's since the highly controlled light beams of the SLS 50 in FIG. 4 are aimed downward and have a sharp cut off of light distribution at an angle such that even a pedestrian coming from below and looking up the steps would not see the light source (except from a great distance on long stairways where the light intensity is weakened by the distance and does not glare). A right handed and left handed fixture design would further prevent any blinding light by always illuminating the stairs with SLS aimed toward the nadir or at angles from the nadir in the upward direction of the stairs up to 70 degree angle 126 and by having the fixtures mounted below the eye height of short adults 125 or children who walk stairs at night. A low voltage transformer 127 located within or by the outlet box or at any other power supply juncture can supply power, free from the danger of causing electric shock. A motion detector 128 could be a separate device or as propounded in this invention, be an integral part of the fixture and could cause the fixture to change color and illuminate in amber, red or green to signal the approach of the last or first step.

In a solar energy powered application, the motion detector would turn the DLFs on or alternately increase power. To conserve energy, when there is no foot traffic, it would operate in a low power mode where it is visible and gives a general outline of the terrain to warn of approaching steps. When motion is detected it would switch to a mode where it actually illuminates the steps for correct foot placement to prevent mishaps.

In another embodiment the railing 124 is an aluminum or steel extrusion 129 specially constructed to accept the lighting fixture 130 and formed with brackets 131 to carry the conductors which supply electric power. The railing is actually a combined railing lighting fixture and carries out the both functions including providing elements for the power distribution. Grooves along the extrusion accept mounting brackets 132 that facilitate attachment to the wall or upright post 133 and also have a locking mechanism such as fastener 134. It is to be understood that any other shape or material of railing, fixture and combinations of bracket and extrusions can carry out the similar function of a combined railing—lighting fixture device.

In another embodiment the railing is a standard railing profile 135 available in the industry and the digital lighting fixture is shaped in an arced or banana shape 136 or has a bracket shaped to facilitate its merging with the railing. An insulated electrical conducting element, 137 runs along the railing to provide power to the fixtures at intervals along its length.

Figure 8:
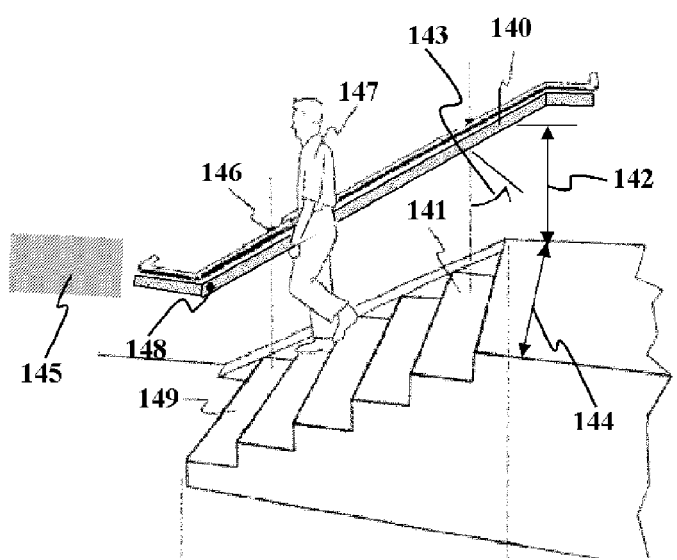
FIG. 8 illustrates an application using the LED based Distributed Step Light Fixture.

FIG. 8 illustrates the use of the linear packaged digital lighting fixture 70 as described earlier in FIG. 5, here shown as 140 in a step 141 or stairwell lighting application. The power and lighting need to be distributed substantially linear at constant distance 142 of the light source from the stairs to be illuminated and the correct light distribution for the task is designed into the SLS and or digital lighting fixture from ground up. The angle 143 of light distribution from the SLS is such that it takes the mounting height 142, step 141 width 144 and required illumination level into account. The lighting fixture may attach to the wall 145 or onto the handrail 146. The person's 147 presence is detectable by a motion detector 148 as he nears the last step 149 and indication by a change in color or frequency can be signaled by a segment of the lighting fixture. Alternately or in addition to, in order to save power as with a solar energy installation, the detector may cause a change in the power supplied to the DLFs.

Figure 9:
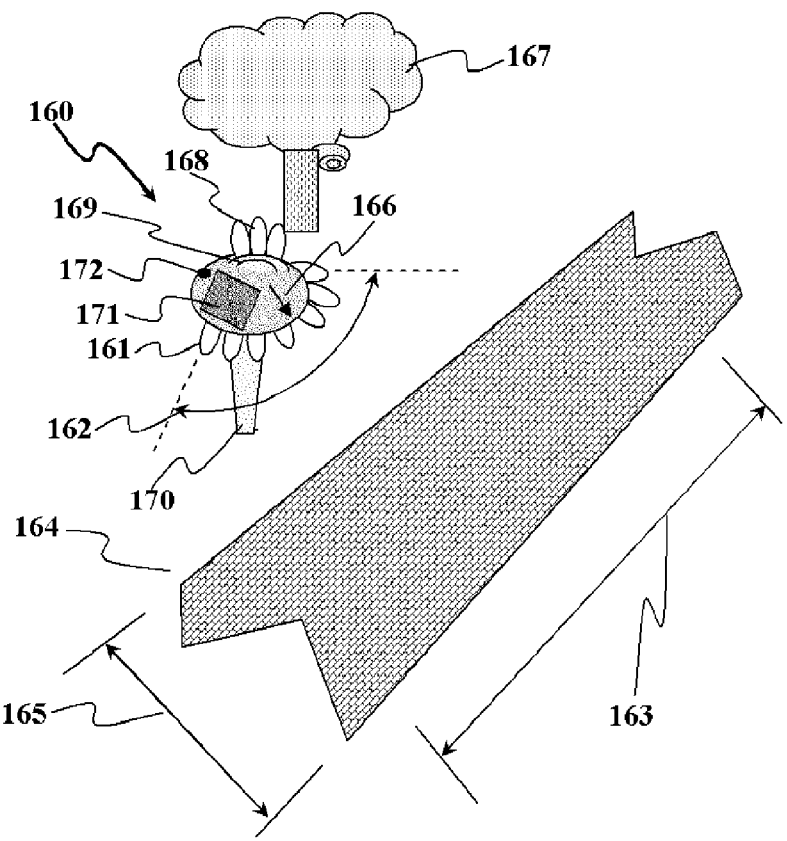
FIG. 9 is a path lighting application using an LED Stake-Top Path Light.

FIG. 9 depicts a DLF 160 which can be used in pathway lighting where upon being installed at the correct orientation the SLS 161 are aimed in a controlled wide distribution 162 (but yet not in the wasteful, present-day practice of 360 degrees), such that they illuminate a section 163 along a walkway 164 of standard width 165 with equal light distribution and there is no stray light upward or to the rear. A marker, 166 situated on the fixture 160, aids in orienting the fixture perpendicular to the path. Alternately, shrubbery 167 can be illuminated with another grouping of upward aimed SLS 168 with a more spotlight like distribution alternately of another color spectrum which may illuminate the green growth in a more aesthetic light. The group 167 may be mounted on a swivel base 169 so that it can be aimed independently of the path lighting SLS aimings. A dedicated shrubbery illuminating DLF configuration is another alternative. A stake 170 is used to install the DLF in the ground at the correct orientation and may be provided with an electrical connection box to hook up to power through piecing quick connectors as is known in the art. Alternately the DLF can be self-sufficient with an onboard power source consisting of solar cell 171 and batteries. As described in previous devices, in more embellished embodiments, onboard control logic circuitry and sensors are employed to control intensity, color spectrum and on/off switching. A motion detector 172 can control the transition from a standby mode to full operation.

Figure 10:
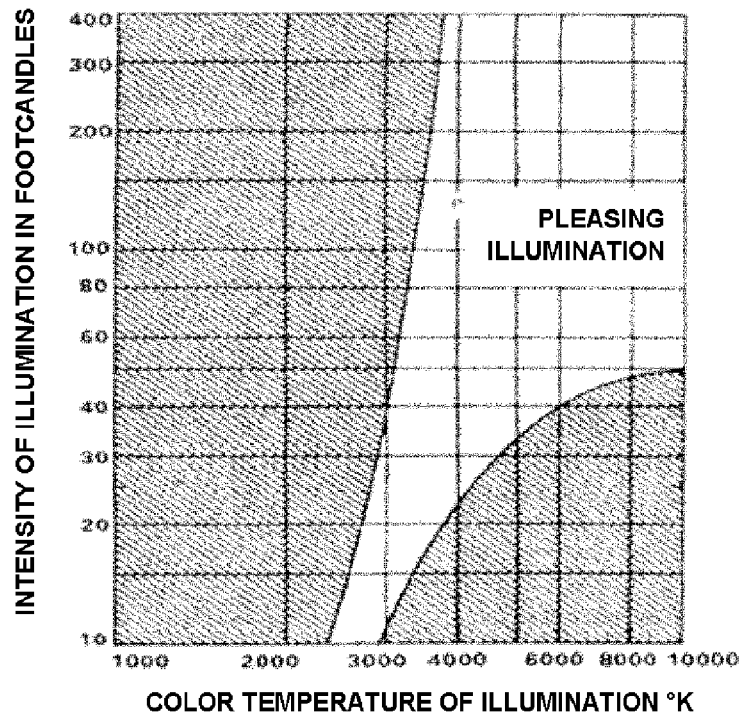
FIG. 10 is the Illuminating Engineering Society Preferred color Temperature vs. Intensity Correlation.

FIG. 10 is a graph of the preferred parameters for lighting color temperature at different illuminance levels. It is adapted from the IES Lighting Handbook 8th edition 1993 and illustrates the Kruithof effect. It is used here as a sample of one of the recommended lighting procedure templates used by controlling logic circuitry on a DLF to keep lighting parameters such as color temperature, color rendering properties, illuminance levels and distribution in optimal bounds. Other control parameters such as switching on and off and color change used to signal critical circumstances are examples of look up, truth tables and media storage data that can be provided to a controller.

Figure 11:
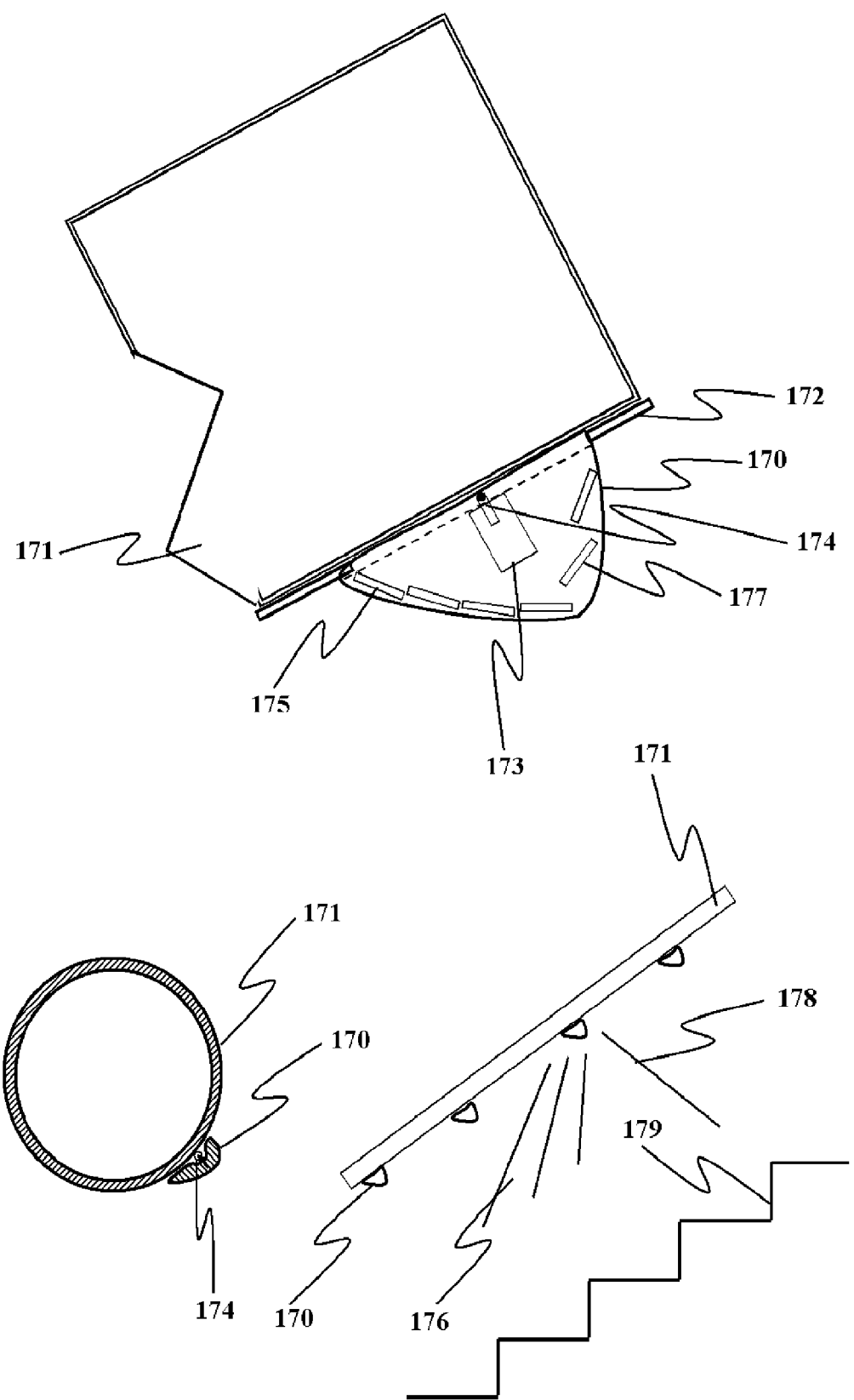
FIG. 11 depicts an integrated digital lighting fixture using discrete solid-state light source arrays deployed angularly about the geometric volume.

Shown in FIG. 11 is a revisited step light which incorporates the chip technology introduced in FIG. 6 into the step light application which has been used to demonstrate the general method of digital luminaire design as espoused by the present patent. The intent is to illustrate the advantages of the placement of the junctions on a facet configuration over the discrete component approach in the previously described step light design of FIG. 4. The significant feature that stands out is the size reduction. Many junctions are packed in a facet and the facets are cast in epoxy at the correct position and angle to properly illuminate the steps. Again the entire lighting fixture function is carried out in this properly shaped button-like device which yields the correct light distribution. A button shaped step light 170 is shown on the bottom side of the railing section 171. A power cable 172 single wire (it can be a single conductor with the railing serving as the other conductor) supplies AC or DC power, which for safety considerations can be low voltage. The power, sensor and control circuitry package 173 makes contact 174 with the power cable 172 and distributes power to the light generating discrete LED or multiple-packaged facet elements 175. The light facets 175 are strategically located on the relevant geometric surface of 170 such that their aimings contribute to the illumination 176 of the steps from the preferred direction and at even intensities. While facet 175 is contributing light at higher angles on the receding step surfaces facet 177 is illuminating 178, the close face of the upward step 179. In manufacturing such a luminaire the components must all be wired together and then positioned in their proper locations at the exact angles. This can be done with automatic machinery while the components are in the flat. Each component is placed by automated pick-and-place machinery in a hollow where it is temporarily set and where the wiring is attached as well. The hollow is actually a computer positionable setting and all the hollows are moved with the components in situ into the molding positions. An epoxy like spray is used to temporarily lay up the components until the final encapsulation into the final "button" shaped lighting fixture. This is a general lay-up method and applies to subassemblies as well, which can later be brought together before final encapsulation. Conductors that require subsequent electrical connection are mechanically or chemically covered during the spraying process.

Figure 12:
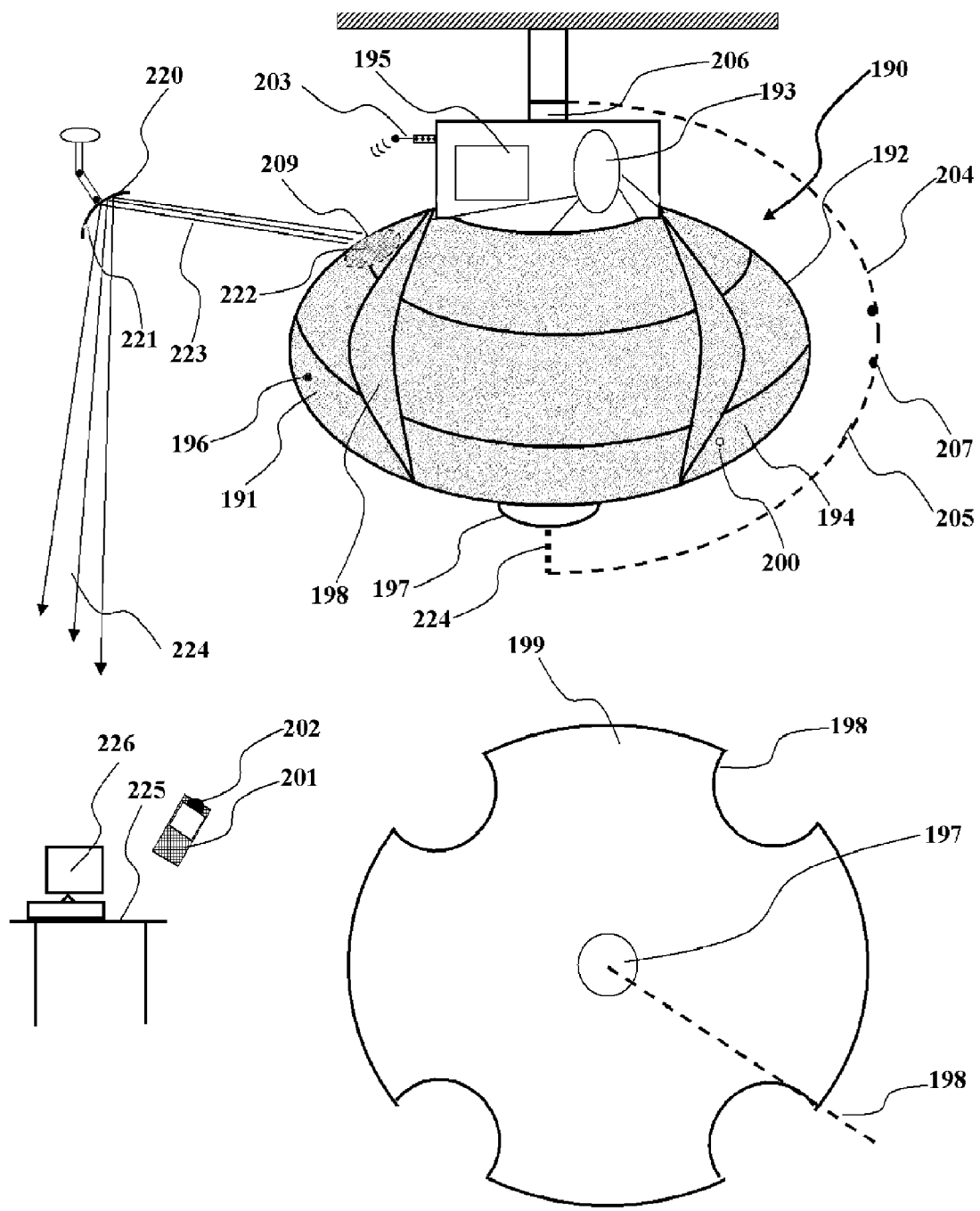
FIG. 12 is a universal luminaire embodiment using an adaptive digital lighting fixture which is programmed to illuminate the area as is needed.

In another preferred embodiment shown in FIG. 12 the DLF is an Adaptive Digital Lighting Fixture. As opposed to a DLF described earlier, is not pre-designed with light source aimings based on a pre-known application. Instead the DLF is equipped with a plethora of light sources ready for most of the conceivable lighting tasks in the illuminated area. The light sources are then controlled such as to adapt the lighting to the room construction and the lighting tasks at hand. The same technique applies to outdoor area lighting applications. This universal DLF is the preferred design when the cost of having an overabundance of light sources is low enough such that other economic considerations such as minimizing stocking units in inventory, repeated changing of the room tenants etc will be more expensive. It is similar to purchasing a 100-Watt lamp where a 40 W lamp would suffice and always operating it on 60% dimming. The capacity is there but it is unwise to use it since electricity is costly.

The adaptive or intelligent DLF 190 shown in FIG. 12 has multiple light sources 191 placed about the body 192 having a geometric shape. The shape, which influences the spatial light distribution, may be of a fixed or flexible design. In a flexible design, solenoids, servo motors, actuators, pumps, controlled fluid or air pressure devices 193 are used to realign surfaces, moveable plates or expandable tubes or cylinders 194 to morph the topology of the fixture. The ADLF is equipped with an electronic power supply, computer control and communications unit 195. One or more light sensors 196 are placed strategically to detect necessary inputs. Alternately one or more digital cameras 197 with a photodetector array which is equipped with a lens which can be a 360 degree lens or a fisheye lens is placed with a field of view of the area to be illuminated. The geometric shape of the body 192 is such that an asymmetric lighting pattern is produced for the provision of a non-circular lighting pattern in a typically rectangular room. Because more light needs to be directed to the far corners of the room, more surface area for projecting SLSs at that position is required. If multiple fixtures are used in a large room then squared lighting patterns will obviate the need for overlapping coverage as with circular distribution luminaires or the prior art. Concave section 198 increases the ADLF surface area available for light source mounting at the room corner orientations. In bottom view 199, a section of the body 192 is shown with asymmetric surface cut out 198 which increases the available surface area on the ADLF.

Spatially differentiated motion detectors 200 are provided on the Adaptive Digital Lighting Fixture along with the light sources 191 and light sensors 196. Typically motion detectors have been associated with lighting in motel rooms to shut off the lighting if there is no activity. There is another level of control that can include matching the lighting to type and amount of activity. On sport fields for example, 200 lux may be used general sport activities, 1,000 lux for night practice sessions while 3,000 lux is used in a televised game. Taken to the extreme, one or more limited field-of-view motion detectors 200, or camera 197, can be used to follow the whereabouts of room occupants. The DLF controller acts to provide heightened lightning to the to the occupants" present locations. A special or standard remote control unit 201 can be used to operate and program the ADLF. In one embodiment the control 201 is equipped with a laser pointer and/or light sensor 202 that is used to assist in providing positional an angular data on the location of work surfaces, room structures and dimensions. The control 201 can then pass on information concerning the visual task performed at that specific location. This data now enables the controller 195 to use stored algorithms and templates to calculate and program the correct lighting intensities and spectrum for that room location as explained earlier in the block diagram as functionality 7 and computer processes 7A. The photometer on the remote control 201 held at the specific location will then corroborate the illumination and spectral performance of the ADLF with the specific light source aiming being programmed at the particular instant. The communication can be optical in the visual or infrared wavelength or wireless. An antenna 203 is provided for wireless communication. The adaptive DLF is thus manually capable of being programmed with all the input parameters necessary for a computer program 7A as is practiced in the art of lighting design, to determine the correct intensities and spectrum to carry out the visual tasks at a specific room location. This is a unique property for a single luminaire. Lighting designers are usually forced to compromise and provide the entire room or area with the highest common denominator of lighting in the room. With the ADLF non-glaring, spectrally correct lighting at minimum intensities is provided and this affords significant energy savings. The added daylight and activity related dimming functions are another significant energy savings factor with its ensuing economic and environmental benefits.

A calibration system is provided in the form of calibration element 204 constructed such that it has coverage of the light source radiation on the ADLF body 192. The calibration element 204 is a reflective rod or strip the surface of which 205 has a wide spectrum, non-angle of incidence dependency and stable reflection characteristics over time. The reflectance of 205 is known at each wavelength and it serves as the standard reflector for the calibration routine. The reflective rod or strip is moveable so that it can reflect light back to the outward facing photodetector 196 based on the ADLF body 192. To test SLS performance the calibration element 204 is rotated about the body 192 by actuator or motor 206. When the reflecting surface 205 is opposite a column of SLSs 191, the controller times the firing of each independently addressable SLS 191 location and acquires detector 196 intensity readings uniquely for each SLS. The results of the test firing are analyzed in controller 195 which has the functionality described in FIG. 1 of components 7 and software 7A. Correction is made to the junction power supply parameters in order to maintain metametrically balanced outputs for white light and overall lumen production. The controller 195 repowers the SLS 191 again using the updated power supply instruction set and retests for accuracy. The process continues until the SLS performance is repeatable at different power levels. In another embodiment the ADLF is provided with a calibration wand 204 on which inward facing photodetectors 207 are placed. The calibration wand is capable being positioned such that the detectors 207 can detect SLS 191 performance as the wand 204 is rotated about the body 192 and SLS 191 are independently tested as describe in the previous embodiment. Both the reflective rod/strip and calibration wand 204 are narrow such that when not in use, rod/strip/wand 204 is parked at a specific position where it does not block light sources 191. In another embodiment the rod, strip or wand is stored and is only deployed when calibration is required. When called upon, the deployed rod, strip or wand 204 is rotated around the DLF body 192 to read SLS 191 intensities. Alternately, the DLF body 192 rotates and the rod, strip or wand 204 remains fixed.

An ADLF 190 outfitted with computer calculation, communication, calibration and other feature may be costly, such that using a number of units to illuminate a room is impractical. Correct lighting practice encourages the use of multiple point light sources to illuminate an area using a number of criteria. A single fixture cannot cover an area larger than glare and mounting height considerations allow. There is a limit on the maximum angle of light provision. Another consideration has to do with the production of shadows. Finally due to the cosine law there is a practical maximum angle at which the lighting can be delivered. At large angles the lighting effect becomes negligible. Therefore, due to all the above considerations it is advantageous to have multiple lighting fixtures in a room. A single ADLF 190 is used in a large room. The ADLF is deigned to be used with one or more satellite reflectors 220 which are strategically positioned about the room. The satellite has provision for being attached to a supporting structure such as a ceiling or light pole and being fixed with a certain orientation in relation to the ADLF 190 and the working surfaces below. The satellite's inward facing surface is a highly efficient specular, semi-specular or diffuse reflector or combinations thereof. A part of the surface 221 is provided with a full spectrum, white reflector which may be a spot or a band across the top bottom or middle or all combinations thereof used in calibrating the intensity and or spectrum photodetectors and/or light sources over the lifetime of the DLF. A part of the surface may be a special reflector 221 such as a retroreflector which will serve as a ray targeting aid useful in the installation process of the satellites. The targeting can be manual using a red laser pointer or automatic using the detectors 196 on the ADLF 190 and the retroreflector 221 on the satellite 220. A section 222 of light sources, which may be high power light sources, is dedicated to provide sufficient light to the other areas of the room or for specific task lighting applications such as to computer terminals which require lighting at small angles from the nadir. The section 222 may be on a swivel so as to be aimable at the satellite 220. Section 222 projects light 223 at the satellite reflector 220. In use, the satellite is installed substantially over the work area to intercept rays 223 from 222 so as to provide task-lighting 224. The specular reflector 220 is positioned and angled such that it concentrates and re-directs the light rays 224 downward onto an area or worktable. The downward directed light coming at very small angles will illuminate the worktable 225 but will not cause veiling glare reflections on the computer screen 226. To provide general lighting to room extremities, the satellite reflector is specular, semispecular or diffuse and has a surface geometry for reflecting the incident light 223 so that it spreads the light evenly over the area to be illuminated.

In place of the manual programming technique for ADLF 190, a semi-automatic self-programming process using luminance measurement via detectors 196 is provided. The camera 197 has a view of the room its contents and occupants. Pattern recognition techniques known in the art are used to identify room occupants, furniture, office equipment such as computers etc, room structures such as walls and windows.

The intelligent lighting fixture system 190 is adaptive to the room structure, usage and occupants on a dynamic basis. In one embodiment a hand held laser pointer and sensor on the remote control 201 is used to assist in providing positional an angular data on the work surfaces and room structure enabling the controller to corroborate program lighting for the location with the specific light source aiming being programmed at the particular instant. The room occupants also use the remote control 201 at any instant to input lighting preferences or call up stored lighting scenarios to the DLF 190. Thus the controller 195 or a controller 195 which communicates with a PC computer is provided with an interactive program which based on application look up tables will determine recommended light intensity and spectrum for the application at hand. Procedures useful in the lighting design process, lookup tables and specific application guidelines can be found in the IES Lighting Handbook 8th edition pages 447-903. A number of commercially available programs are available which prescribe lighting based on the application and calculate the illuminance based on the fixture. In this invention the procedure is reversed in that the recommendations are first used to generate the illuminance on or luminance from the room surfaces. The computer program 7A is used to calculate the light intensities required at each angle in order to produce the desired illuminance or luminance results. Luminance in $cd/m^2$ is the reflection of the light flux $lumen/m^2$ from a surface having a reflectance property and is more similar to what the eye sees. The algorithms are processed onboard the ADLF 190 or run on a PC which communicates with the ADLF. Computer programming for lighting calculations and correct lighting practice recommendations is known in the prior art. Commercial programs using procedures based on IES, ILDA and other standards and professional lighting engineering and design organizations are available. Lumen Micro® and Simply Lighting® from Lighting Technologies Inc are examples of such programs which provide tools to create and simulate lighting layouts for both indoor and outdoor applications. Simply Lighting® is a suite of Windows®-based lighting analysis tools that are designed to answer the questions you need answered using a step-driven application targeted at a specific lighting application. Lighting Analysts, Inc AGI320® is a program used to predict lighting system performance for any application from one to hundreds of luminaires, interior or exterior. Users can build environments for most any electric lighting application with unlimited luminaires, calculation points, and reflective or transmissive surfaces including day lighting effects. The program used in this invention is an adaptation of a state of the art lighting programs. It is capable of receiving data inputs automatically or manually interpreting them according to correct lighting practice and calculating the candlepower distribution from the illuminance back to the luminaire. A post processor and outputs the operational instructions to the controller 195 for the application at hand.

The operation of the system is demonstrated in home use but the method is the same for office, store and industrial applications. The input program 7A is user friendly including the use of icons representing pieces of furniture, e.g. table, lounge chair, equipment such as TV, computer etc, and visual tasks being performed such as reading, and watching TV. The homeowner moves about the room with the remote control 201. At a specific location the homeowner enters the furniture type, possible occupant postures, sitting reclining, standing etc, and visual tasks to be performed. The room and its surfaces is defined the by being positioned at a wall, entering into 201 that it is a wall at that position and at another position entering that it is a window. The control unit 201 is optionally outfitted with a photometer 202 which can be used to read the surface reflectance of the wall and transmit the data to the lighting program 7A. This is the same process a lighting designer uses to enter data to the lighting analysis programs. The lighting program as known in the art then specifies the correct lighting levels, aimings and spectrum for the different locations and uses throughout the room. This is reversing the typical design process as described earlier where the lighting fixtures performance is simulated on a computer and the results calculated. Here, the required illuminance results are known first and the fixture is then programmed to make them happen. The controller 195 uses its stored performance characteristics to determine the power supply to the SLS so that it provides the required intensities and obtain the required illuminance. The lighting calculations and programming of the power supply 195 of the light sources 191 is preferably performed in real time such that the sensor 202 detects the illuminance to corroborate the performance while the homeowner is still at the location. If the lighting is not to specification then the controller 195 readjusts the parameters so as to bring them in line. This trial and error process continues until the readings are within tolerance. The process is best carried out in the dark or when there is non-varying daylight. Alternately, the photometric reading sensors are on the luminaire and they are used to corroborate performance. Alternately, the process is automatic using feedback from the surroundings and pattern recognition to determine surroundings and applications.

Providing correct lighting for the various activities a homeowner in a room involves the use of numerous lighting regimes. Typically he or she would move about the room performing various activities with diverse lighting requirements. First, moving from the table where work was performed on the computer to a lounge chair to read the paper and finally moving to the sofa for a little relaxation watching TV. In prior-art practice, several lighting fixtures of different design are used to carry out the different tasks. In order to conserve energy each one would have to be turned on and off or dimmed as the resident moves about the room. A glare-shielded luminaire would be used for correct illumination in the computer task, while a floor lamp may provide lighting for reading on the lounge chair. General lighting from an overhead luminaire is sufficient for TV viewing. According to the present invention, as the room occupant moves about the room performing varied tasks, the motion detector 200 or camera 197 picks up the new location and from its stored templates which correlate location to lighting application, controller 195 provides the correct lighting regime.

According to the teachings of the present disclosure, the room lighting needs are provided by one or more DLFs or ADLFs including satellites or combinations thereof placed such that they are capable of providing lighting at the correct non-glaring angles for the lighting tasks at hand. The ADLFs are programmed as to the whereabouts of furniture, computer monitors, TVs etc as described above. The ADLFs and DLF can communicate with each other and an ADLF can control a DLF and vise versa so that level lighting is accomplished in the room. Two or more DLFs can share in the illumination requirements of a location located between them. The DLF turns off its illumination towards a specific location, reads the ambient luminance and then correctly powers the SLS to provide the additional illumination. An oscillating "singing" feedback network incapable of settling, is prevented by the provision of inexact timing. The DLF lighting assessment process occurs on a periodic basis as the controller surveys its numerous detectors and SLS, the complete cycle taking a number of seconds. The same process is occurring in the neighboring DLFs. A clock on the DSP controls the process. The DSP is programmed to randomly nudge the clock timing by a number of a multiple of milliseconds typical of the survey process from cycle to cycle. The similar timed assessment process with an independently random shift in timing occurs on the adjacent DLFs. Thus the chance of seesaw interaction between DLFs is insignificant. Alternately, communication between neighboring DLFs can also be used to synchronize the process and prevent feedback oscillations.

The novel lighting-application oriented approach to light-source construction, as taught by this invention impacts on the method involved with marketing the DLFs. Rather than speaking of a wattage for a lamp or lighting fixture, now with DLF technology, the area covered is the determining factor, somewhat like the coverage area of a can of paint printed on the container. The customer needs only to specify the room area and what the lighting is used for in order to select the correct luminaire. In today's prior-art process of selecting by lumen or wattage, there is an additional step, that of taking the effective lumen output and dividing it by the area of the room. Instead, a DLF is packaged and marked according to the area it will cover (when mounted at the designed for), mounting height (usually standard for most residential ceilings) and the lux it will provide or the visual tasks for which it is suited. Thus a homeowner in a store will be queried by the sales staff or be presented with instructional promotional media which allows for the determination of the room dimensions, type of room and typical activities carried out therein. The lists printed on the cartons for the various DLFs will include location types and task types. Location possibilities for consumer lighting include corridors, kitchens, bathrooms, bedrooms, play areas, garages, driveways, backyard, playing fields, steps, workrooms etc. Task possibilities which would generally be a subdivision in a location type will include reading, dining, TV viewing, exercise, sport etc. A single DLF may be suitable for more than one location and task type and be so marked. Thus typical DLFs would come in bathroom, kitchen, garage, bedroom, hallway, and etc models. The bedroom model comes in a 12 ft. by 12 ft. Coverage and is also the TV room model etc. An ADLF is suitable for many more locations and applications and is so marked.

Industrial and commercial lighting DLFs are similarly marked and marketed. Mounting height determines the maximum area covered according to correct lighting practice principles and adds another variant less prevalent in the consumer market. The many DLF models will not exceed the plethora of prior art luminaire designs, as they are also based on mounting height and lighting application. While prior art luminaires rely on large reflector and every variant requires new investment in tooling, in a DLF a basic carcass will support many MSLS configurations with their particular amount of SLSs and their aimings.

In non-color critical applications for example in low lighting used for orientation a further energy saving can be obtained. LED junctions are made of different materials. The blue, green, and white illuminators utilize InGaN LEDs and the amber and red utilize AlInGaP for the junction material. Some materials are more efficient at converting electrical energy to visible light than others. As an example, (in terms only relevant at the time of this writing since the efficiencies are increasing daily), while a green LED which has the advantage of high photopic eye sensitivity to its wavelength, is producing only 30 lumen per watt, a super flux red LED can produce over 50 lumen per watt. Thus, when color rendering is not important in the lighting application at hand it is possible to shift the workload onto the more efficient LEDs. This of course must also take the eye sensitivity at the specific lighting intensity into account. While a purely scotopic rod eye response at extremely low light levels, less than 0.01 lux gives added sensitivity to the 510 nano-meter green blue, photopic vision at levels above 100 lux is most sensitive to the greenish yellow 555 nm wavelength. In most illuminated cases low lighting would not be below 5 to 10 lux where the sensitivity peak is around the 550 nm yellowish green. Thus two factors are used by 7 in 7A to calculate the most efficient light color of the DLF; the LED radiation power per watt multiplied by the eye sensitivity curve for the present illuminance value. In a less rigorous embodiment, if the par between the LED efficiencies is large such as in the example above, then the red LED is used combined in ratios with other wavelengths, such that the color still found acceptable by the users.

In a preferred embodiment, using pattern recognition techniques the ADLF 190 is semi or fully automatic in programming itself to correctly function where installed. The DLFs or ADLFs will adapt to the seating arrangement of room occupants in real time. In the preferred embodiment, the addition of a machine vision system with pattern recognition capabilities as is known in the art, easily deduces room occupancy and usage. The camera 197 including a wide angle or fisheye lens camera is mounted on the DLF or ADLF. In an alternate embodiment, one or more cameras in communication with the lighting system controller, has coverage of all, or part of the area to be illuminated. The camera may also serve as an illuminance and spectral measuring device as the individual detectors in the array, for example as on a CCD or CMOS array, may be read for their individual stimulus. The detector array pixels are calibrated to the room coordinates. The calibration routine can be manual or automatic. A manual method includes walking a controller around the room and programming in the coordinate to the camera system or alternately using a PC CAD program to input room coordinates overlaid on the image obtained from the camera such that the lighting system coordinates and the camera coordinates are the same. An automatic routine as in 7A uses timed firing of a coordinate-specific light source, or array of light sources and the following reading of the camera detector of light reflected to that specific coordinates pixel, or set of pixels to corroborate action between light sources and the detectors. The detector pixels 197 can then be used to obtain images of the room which the controller 195 can assess as furniture, equipment or occupants. Pattern recognition methods known in the art, including neural networks, can provide a generalized stored application library of usages to the controller or the controller is an artificial intelligence controller and can learn the actual room usage with time. Outputs from the CCD arrays are analyzed by appropriate computational means employing trained pattern recognition technologies, to classify, identify or locate the contents. These techniques known in the art are covered in texts such as: Schalkhoff, Pattern Recognition, statistical, structural and neural approaches, John Wiley and Sons, New York, 1992 and Neural Networks for Pattern Recognition by Christopher M. Bishop, Chris Bishop, Oxford University Press; (January 1996) included herein by reference. Thus, the controller with or without human intervention will program the ADLF lighting system to carry out lighting within the realm of correct lighting practice. This includes providing the correct illumination in real-time based on occupant whereabouts, activity being performed and outside factors such as sunlight contribution, time of day factors etc. Advanced robotic vision techniques including object segmentation and selective-attention modeling (Itti, Visual attention and target detection in cluttered natural scenes in Optical Engineering, Vol. 40 No. 9, September 2001 included herein by reference) will aid in identifying various room objects and the lighting program 7A will associate with their location the visual tasks and recommended lighting characteristics. In case if the machine settings are not acceptable to the users, provision is made for human intervention. Through the data input device 201 a user, the ultimate "sensor" corrects or customizes the lighting arrangement and reprograms the controller.

In a further ADLF intelligent lighting system improvement over prior-art practice machine vision is used to control surrounding luminance. A prime example is an office application where a computer Visual Display Terminal is in use. This is an application where the quality of the localized task lighting is important. Contrast plays a major role in seeing and glare plays a role in producing veiling reflections as causing fatigue. The correct illuminating solution involves the control of surrounding luminances. A prior art workstation design will include partition, carpet, ceiling and desk surface reflectance which reduce the luminance in the workers field of view. Using the ADLFs ability to recognize the computer screen chair, desk and surrounding floor and ceiling, the illuminance in lux on each element is varied to obtain the optimal luminance. That now allows any color scheme to be used by the interior designer on the work cell decor. The ADLF will control the luminance by varying the spatial light intensity distribution over the different surfaces.

In another embodiment using the camera 197, the controller 195 is instructed to identify and track a roving speaker during a video presentation. A signaling device is used by the speaker to allow the pattern recognition program to initially lock-on and recognize a target attribute as is known in the art of object tracking. The signaling device can be a laser light pointer 202 aimed at the camera or a hand held remote control 201 in communication with the camera vision system. The controller 195, based on the camera input runs the pattern recognition routines, derives the coordinates and generates instructions to drive the specific light sources with aimings which will project light at the speaker as the speaker move about the room. It is to be understood that in a theater lighting application there is no need for a preprogrammed moving light using motors to change position. Instead a fixed DLF or ADLF with multiple light sources powers the necessary light sources to illuminate the performer as he or she moves about the stage. This actually is similar to the banks of shuttered lights used in present day stage lighting. Only now the digital aspect of discrete multiple light sources allowing for a smooth transition of aimings with instantaneous control of almost infinite variation of spectrum and intensity is accomplished. The controller, once locked-on to the performer using images from the camera 197, will now follow the performer around the stage illuminating instantaneously in the intensities and spectrum as preprogrammed in the choreographic setup or in correspondence to the music or some other characteristic as in known in stage lighting practice.

An emerging problem with LED light sources is that with the increase in light conversion efficiency the LEDs are becoming ever brighter and for their small size present uncomfortable sources of glare. These high intensity light sources would have to be used with diffusers which would impair the light control characteristic. One solution is to construct the DLF large enough such that the area over which the light flux emanates is sufficiently large that the luminance in candela per square meter will not exceed allowed luminous exitance values or glare limits. In this solution of increasing the luminaire area over which the light emanates, the number of light sources at specific location may not be sufficient to provide the continuum of light distributions and spectral combinations necessary to carry out correct lighting practice as per the teachings of this invention. Another way of looking at the problem is, that with added lumen output, a few high performance LEDs could provide the illumination for a room but due to even distribution and spectrum consideration many discreet SLS are required. That is, the SLS needed for the smooth continuum, digital aspect of the invention exceeds the number required for the maximum light flux.

In a preferred embodiment the DLF or ADLF is rotated about an axis such that the time any source in the glare causing zone is exposed to an observers eye is such that it is not observed as glaring and the time the source is out of view is below the flicker rate for that intensity level. HID and fluorescent lamps operated on 50 Hz have a 100 Hz flicker rate and are not considered to flicker. For aesthetic, aerodynamic and dynamic balance reasons the DLF can appear as the globe shape 190 of FIG. 12. However, the now reduced dimension DLF is spun rapidly on its axis 227 by motor 206. The LEDs can be concentrated in an arc from top to bottom along the surface 192 or be located in the concave arc section 198. The concentration of SLS in this section is sufficient to offer a large number of spectral combinations at any aiming. Two arcs of SLS 191 opposite each other for balance or one arc with counterweight can be used. With one arc a 6,000 RPM rotation rate is used to prevent flicker and with two a 3000 rpm rate. In an alternate embodiment instead of a complete globe just an arc section such as 198 runs from top to bottom. The arc is on an axis and is motorized so it rotates rapidly on its axis. The speed of rotation is such that the light source does not appear to flicker. This way a compact unit can be made since the apparent brightness is reduced. This process is possible because the eye is an integrator of light over time and persistence of vision minimizes flicker. The LEDs 191 disposed along the surface are timed to fire in the correct intensity according to the instantaneous position. The timed operation is coordinated with room location. Thus, when the spinning light sources 191 are facing a corner more intense light at higher angles is projected so the far corner is illuminated equally to the areas near the DLF. The positionally correlated timed firings of the rotating DLF will illuminate as need per location per usage requirements in real time. The side of the room near the window receiving ambient daylight will receive less illumination than the opposing darker side. This is also possible because the controller electronic 195 operates much more rapidly than the mechanical motion and that the rise time of the SLS is extremely fast measured in single digit microseconds. In a preferred embodiment, the globe or arc can be placed in an outer jacket which is partially evacuated of gas. The globe or arc is then rotated in a partial vacuum envelope to reduce air friction losses.

In FIGS. 13A through 13C a streetlight fixture designed according to the teachings of this invention is shown. The design and functionality distinction as compared to prior-art streetlights is derived from the multi-light source, digital design. In FIG. 13A the aesthetically designed DLF streetlight 240 is shown in a front view. The geometric shape is a derivation of the surface geometry for mounting the SLS perpendicularly thereon to obtain photometric light distribution compatible with the requirements of the street lighting application. These photometric distributions are expressed in terms of luminaire cutoff angle which refers to the angle beyond which rays capable of producing glare are prevented from exiting the fixture. Another type of classification used by the IES, refers to the elongation of the light pattern along the road in terms of Long, Medium and Short and another categorization, perpendicular to the roadway called "Type", describing the distance in units of mounting height (where the fixture is mounted), that is illuminated. The novel design includes SLS with over 100,000 hour lifetime allowing for the fixture to be factory sealed for life. This obviates the need for cleaning reflectors, as all the exterior surfaces are cleanable by rain and there are no light sources at the sharp bottom drip point where dirt normally accumulates. The compact design 240 shown mounted on a pole 241 in side view FIG. 13B has a small exposure area, reducing wind induced drag force loads on the pole. This low wind factor and low weight of the electronic components allows for the use of a less expensive pole. The pole arm 242 fits into slipfitter 243 which is provided to perform the mechanical fixing means of the DLF 240. FIG. 13C is a side section view through the center of the fixture. The electrical power and communications connection is made to a connector block 244 mounted such that it accessible for the external wiring of the fixture during installation. The grid power is connected to power supply 245 and the data to the controller DSP 246. A dedicated communications line is used or the data is sent over the power line using communications protocols as known in the industry and the DLF communicate with each other or with a central control. The SLS aimings are shown in front view FIG. 13A where the SLS aimings to the right 247 and left 248 along the roadway show how an even distribution pattern out to the maximum design distance from the pole center is obtained. This distance is a function of the fixture mounting height and cutoff angle. Hole-through SLS units have been drawn to illustrate the point but the principle the design is valid for SMD, SMT, the chip 94 design of FIG. 6 as well as other package arrangements known in the art. Many more SLS 249 are concentrated at the larger angles 250 to illuminate out to the extremes of the area covered by the DLF. Fewer SLS 251 are needed at the small angles near the pole to maintain with equal illumination. The SLS at the cutoff angle 250 have a tightly controlled beam spread 252 to maintain a sharp cutoff, minimize glare and eliminate spill light. The SLS 253 in the interior have a wider beam spread 254. The DLF 240 projects light in a highly controlled pattern perpendicular to the roadway as well SLS 255 as seen in the side sectional view FIG. 13C are aimed such that the cutoff angle 256 is out to the road width with or without the shoulders as designed. In applications where illumination for a sidewalk is required, "house side" illumination is provided by inward SLS aimings 257.

In all stages of the SLS positioning and aiming design process which works in reverse of the normal process by engineering from the illumination required on the working surface back to the light source. Glare ratings for the design are checked to make sure they are within the acceptable limits. If the light source concentration is such that drivers or pedestrians in normal eye viewing conditions would experience glare then the luminous exitance is lowered by design changes in the geometry or light source attributes. The ramifications of a dynamic and exact light control are numerous in a street light luminaire. First there is no spill light and no light trespass. If the position of a luminaire is such that light is shining into a house the individual SLS at that aiming is not powered by the control 246. All the light power is placed where needed in the designed for illumination intensity, neither in deficit nor excess. While prior art luminaire show 80% of the light falling in the area designed to be illuminated, the DLF will have a near 100% utilization factor.

When artificial intelligence methods known in the art is combined with the fine control and functional flexibility of the DLF additional advantages are realized. A detector or camera 258 in concert with a logic controller 246 is capable of providing the road lighting needs to a driver or group of drivers in according to the time of day, needs of the roadway layout and usage at any moment. The detector 258 will provide signal to the controller 246 of the ambient lighting conditions. When daylight is no longer sufficient for viewing such as at dusk the DLF will add lighting. At dawn the process is reversed. In an alternate embodiment the roadway lighting can be dimmed if there are no approaching vehicles. The detector or camera 258 is capable of detecting oncoming and retreating traffic. The headlights and backlights are used or more sophisticated pattern recognition is used to determine traffic on the roadway. When there is no traffic the luminaire will illuminate at a fraction of the power used to generate the 5 or 10 lux used in street lighting. Taken to the extreme the controllability of the DLFs or series of communicating DLF street lights allows for the lighting to precede the vehicle by the stopping distance, say 300 ft. at 65 MPH (91 meters), and dim the unused lighting behind the driver if it is not necessary for other drivers. In the late hours of the night when traffic is low this function can save significant amount of energy. A typical 250 W HPS streetlight will consume over 25,000 Kwh in its 20 yr lifetime. On moonlit nights the dimming of the DLF can be greater as moonlight provides up one lux. The dimming of SLS actually improves their lighting efficiency and prolongs lifetime. Dimming of HID sources has a negative return, typically 10% light at 50% power. The color spectrum of the light is also varied in the DLF to match the intensity levels. Here an additional efficiency boost is achieved when the added scotopic eye sensitivity to 510 nm bluish white similar to the pale moonlight is taken into account.

It has been shown that certain colors of light i.e. of different spectral power distribution (SPD) are perceived to be more glaring than others in night driving. Studies of drivers (Flannagan, M. J., (1999). Subjective and objective aspects of headlamp glare: Effects of size and spectral power distribution, Report No. UMTRI-99-36). Ann Arbor: The University of Michigan Transportation Research Institute.) indicate that blue-white color has been found to cause more glare discomfort than yellow light. On the other hand, studies have shown that driver night vision is better under the blue-white spectral power distribution. Recent laboratory studies have also shown, for example, off-axis detection peripheral detection can be better for bluish, metal halide lamps than for yellowish, high pressure sodium lamps at the same photopically specified light level (Bullough, J. and Rea, M. S. 2000. Simulated driving performance and peripheral detection at mesopic light levels, Lighting Research and Technology, 32 (4), 194-198). In the DLF streetlight luminaire it is possible to use the blue-white SPD to illuminate most of the roadway yet increase the cutoff angle, which is determined by glare considerations, by using yellow-white SPD light at the large angles which throw the light further along the road. The higher angle lighting provides more vertical lumens and is actually more effective at illuminating objects along the roadway. The increased visibility afforded by the added vertical lumens at high angles offsets the decrease in visibility due to the yellow-white SPD. This means that the overall visibility over the roadway sections is constant. Thus, SLS near the angle 250 would have a yellow-white non-glaring SPD while interior SLS such as 253 would have the superior blue-white SPD. The higher the cutoff angle, the fewer luminaires that are required to illuminate a roadway. The same differentiation would be possible with SLSs 255 in the side view of which some illuminate the sidewalk 257, some the right lane and others the left lane. The SPD of the SLSs at the high glare causing angles 250 facing the oncoming driver aimed to cover the near lane would be yellowish while those SLS covering the same lane but now to the rear of the receding driver, will still be of bluish-white SPD. The opposite is true for the far lane. The SPD of the SLS aimed 257 at covering the sidewalk would again be in the blue-white to aid in peripheral vision detection of pedestrians or objects approaching the roadway from the side.

As with all correct lighting practice the visual surroundings at any instant in time determine the amount of illumination required to carry out visual tasks including the luminance of background surfaces. Roadway luminance as detailed in the IES Handbook pages 751-779, is the preferred factor used in specifying required illumination levels. Freshly paved blacktop with its diffuse reflection will change over time to a mostly specular reflection. The higher luminance value pavement requires less illumination to see objects. This characteristic changes over time with wear and periodic road maintenance and illumination levels need to vary accordingly. A detection by 258 of this road luminance will provide the controller will the data necessary to set the required illumination. Roadway activity is another factor in determining illumination levels. This factor often changes over days of the week or seasons of the year. An adaptive DLF with detectors 258 and computer devices 246 capable of recording this traffic activity will provide the correct illumination for the traffic situation at hand.

Though the design of a streetlight has been detailed the same design process is valid for floodlights and other outdoor lighting applications. The use of the SLS of specific spatial candlepower distributions at particular aimings, the use of tighter beams at the edges of coverage, the non-glare design and the optional use of logical control are as applicable to DLF floodlight design as to the street light design.

Figure 14:
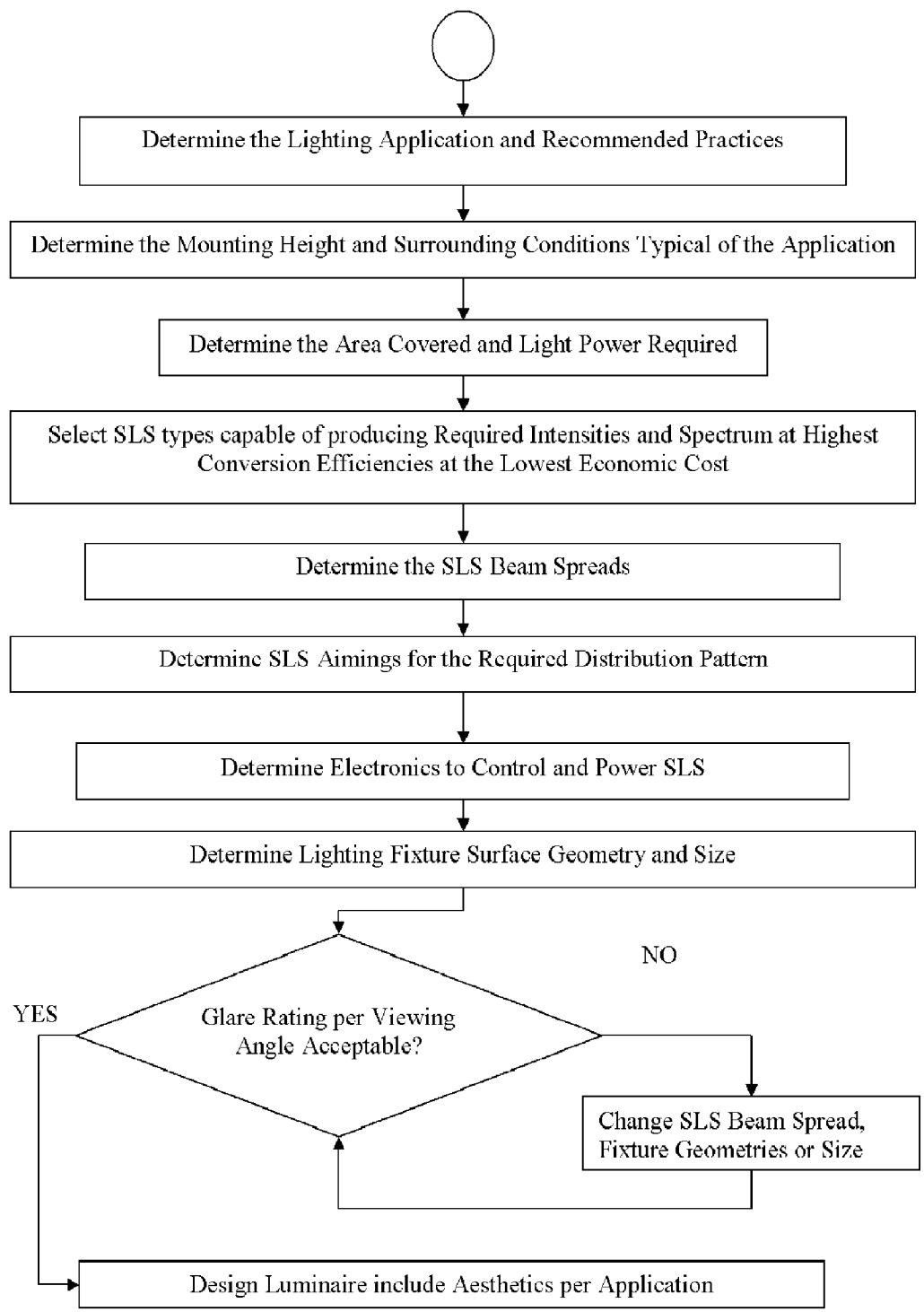
FIG. 14 is a flowchart of a typical design procedure for a multi-source lighting fixture of the present disclosure

FIG. 14 is a flow chart which illustrates the general design concept which allows anyone to build a multi-light source lighting fixture from the ground up, tailor made to the final application. This process differs fundamentally from prior art lighting fixture design. Rather than building a fixture around a common lamp and then coercing the usually isotropically radiating lamp to perform in a certain application, the lighting application is used to describe the light source construction. The light source construction is unique in that its flux density is spatially differentiated over its volume in concert with its final orientation when in use. The light source design then defines the supportive power, control and mechanical elements. These elements are then integrated into a single unit with shared components and packaging. The method for designing an application oriented luminaire designed according to correct lighting practice, providing the correct light intensity, spectrum, and spatial distribution of intensity and spectrum, suited to the specific lighting application, would comprise a number of steps some of which can be left out of the process while others may be added including a) determining the lighting application, and the recommended lighting practices for the application b) determining the luminaire mounting height, illumination area covered and surrounding conditions typical of the application c) determining candlepower required to effect the required illumination over the area d) selecting SLS types capable of producing required intensities and spectrum at highest conversion efficiencies at lowest economic cost e) determining SLS beam spreads f) determining SLS aimings for the required distribution pattern g) determining electronics to control and power SLS h) determining lighting fixture surface geometry and size i) testing whether the glare rating for the viewing angle is acceptable j) if the glare rating is not acceptable, then changing SLS beam spread, fixture geometries, or size, resulting in an acceptable glare rating; and, h) when the glare rating is acceptable, then designing the luminaire aesthetics for the application.

The digital lighting concept is extended to transportation vehicle applications. A headlamp for an automobile uses multiple light sources based on electro luminescence of semiconductor junctions. The proposed unique approach is to combine the lighting engineering function i.e. the correct light distribution, color spectrum and level necessary for the visual task at hand into the lamp such that the digital lamp obviates the need for additional light controls and fixtures. The digital electronic lamp utilizes ⅓ the energy and has over 100,000 hours lifetime versus 2000 for an automotive incandescent lamp and can be rapidly switched on and off without deleteriously affecting lifetime. (Quite the opposite, off time is not part of the lifetime). The multiple light-source, digital device, is an electronic headlight which provides the driver with the correct aiming, illumination level and distribution (e.g. parking lights, low beam, high beam, lighting around curves and corners) based on input from the vehicle's speed, steering wheel position, turn signal indicator and detection of approaching headlights. These functions are carried out automatically however; the standard manual override controls are still maintained.

Headlamp glare is addressed in two alternate ways. European regulators recognize the danger presented by excessive headlamp glare, and so European cars with HID lamps must have dynamic headlamp leveling. On-the-fly headlamp vertical aim adjustment has been required by European directives for quite some time now, but dashboard dial control of the vertical aim is no longer acceptable. Recent European regulations require that the headlamp leveling of HID-equipped cars be linked to the suspension system of the car so the lamps don't glare as much to oncoming traffic when the rear of the car is loaded-down or the car is heading up a small hill. The digital headlamp solves this problem by automatically sensing the angle of the headlamp assembly and will employ in real time only the properly aimed light sources to illuminate so as not to glare oncoming traffic.

An alternate method of glare control is accomplished by rapidly switching on and off the headlamp light output or only the high beam portion thereof at such a rate that flicker is not observed by the driver. This persistence of vision is the same effect on which motion picture viewing operates using shutters to intermittently block the light while the frame changes. On the oncoming vehicle, a variable light transmitting element, an electronic shutter, located in the driver's field of view is rapidly switched to a blocking state synchronized in time with the on state of the oncoming car's headlamp. The situation is vise versa for the driver in the other vehicle such that in the instant one driver is seeing the other is not.

The Spectral Power Distribution, SPD, of the headlamp is also variable as a function of the area being illuminated. Studies by Flannagan cited earlier, have shown a preference by drivers for yellow tinted headlights on oncoming vehicles. The drivers find the yellowish colored light of an incandescent less glaring vs. the bluish "white" light of an HID Metal Halide lamp. On the other hand recent studies by Bullough, cited earlier, on driver's peripheral night vision show the clear benefits of HID MH headlamps in detecting pedestrians and objects along the side of the road. Thus an ideal solution is to have the SPD in that part of the beam visible to oncoming drivers be of the less glaring yellowish type while the beams headed everywhere else would be of the blue-white SPD for increased driver visibility. In fog or snow the color spectrum would also be adjusted so as to maximize visibility. Yellow colored lights are used in fog and snow conditions to prevent flashback. Thus according to the teachings of this invention the DLF headlamps serve as the fog-lamps. The digital headlamp will automatically or manually be adjusted to the optimal intensity and SPD lighting parameters for the environmental conditions at hand.

Present advances in automobile lighting include Adaptive Frontal-lighting Systems which aid in seeing around curves and other features in the road. In these systems the light distribution pattern and color spectrum will be changed according to the instantaneous road conditions at hand. Thus, the headlamp now has much more flexibility than the high beam/low beam variation of today. At any instant in time the intensity, spectrum and beam pattern of the headlamp may be varied as a function of the drivers intent, lay of the road and environmental factors. A GPS system on the car may also let the headlamps system know of curves up ahead, one way traffic and others factors such the headlamp may be operated in the optimal mode at that instantaneous location. With sensors sensitive to environmental surroundings such as ambient light, fog or snow conditions etc. lighting can be adapted to the optimal operating regime.

Additional features include an optional concentrated flashlight type of beam to illuminate distant overhead and roadside signs, which due to the narrow directed beam will not blind oncoming traffic. Image recognition via a camera will allow the beam to follow the retroreflective sign as the vehicle moves or the signs will be provided with a special marker for this purpose. In this way the headlamp cutoff above horizontal except for the concentrated sign beam can be total.

Figure 15:
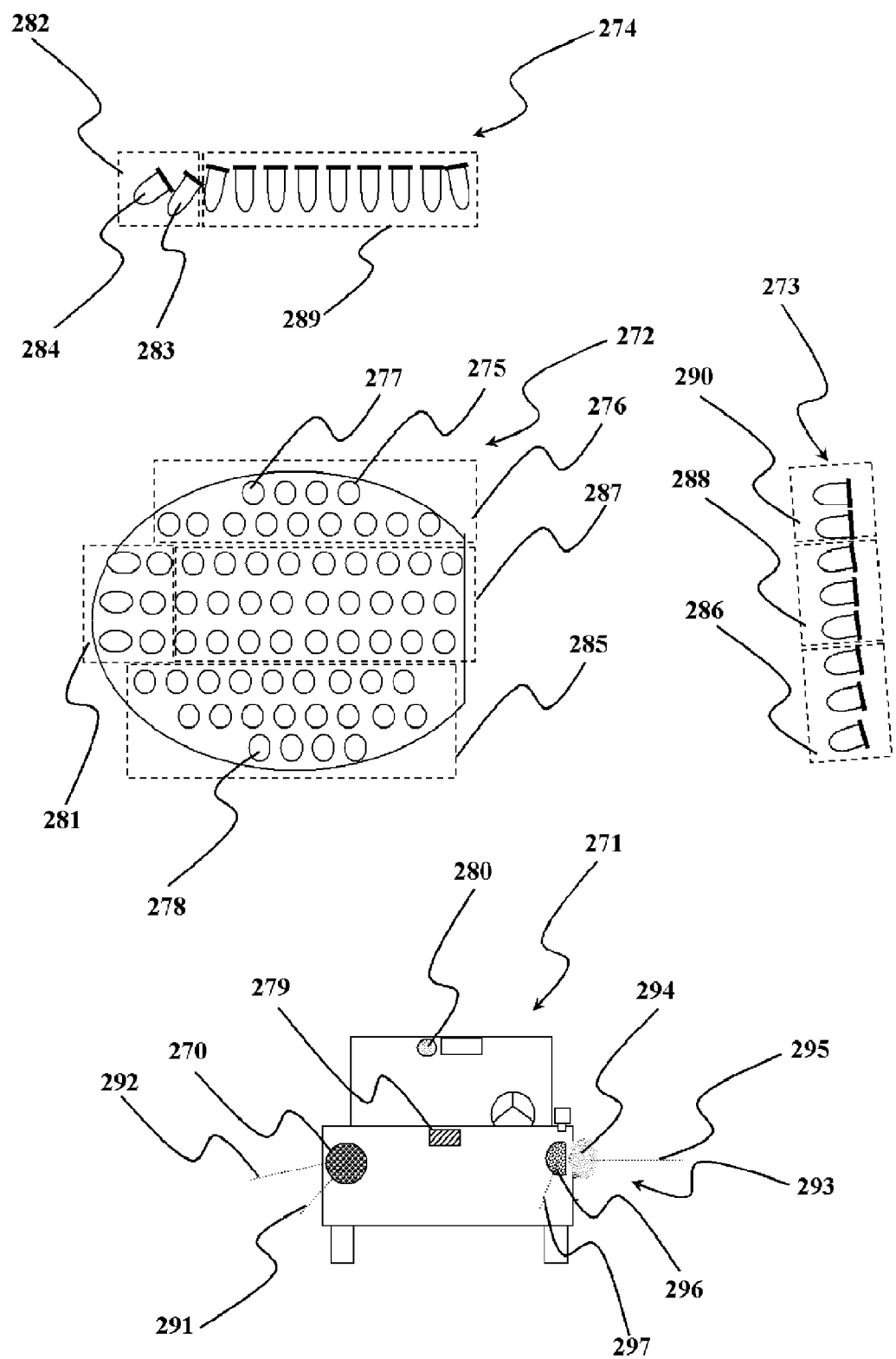
FIG. 15 shows a multiple light-source headlamp capable of optimally carrying out the diverse illumination functions used in driving under various environmental conditions and surroundings.

FIG. 15 illustrates a preferred embodiment of a digital automotive headlamp. A headlamp is a specialty lighting application unrivaled in terms of the need for controllability and is especially suitable to the methods and devices described in this disclosure. The headlamp fixture is unique in the continuum of beam patterns, intensities and color spectrum. The number of possible control modes are: 1. Parking Lights. 2. Low Beam lights; 3. High Beam; 4. Cornering Lights; 5. Load leveling adjustment; 6. Integral turn signal indicator, 7. Programmable alternate beam spread selection so that one headlamp fulfills the different sets of legal regulations for the high and low beam in different regions of the world such as the U.S.A., Japan and Europe; 8. Driver preferential color; 9. Oncoming vehicle or vehicle-ahead driver's preferred color 10. Color of ambulances extra headlamp provides red flashes to be more easily picked up in rear view mirror; and 11. Non-Glaring pulsed headlamps.

Input data to the controller would first and foremost be in the control of the driver and would consist of an overriding manual selector switch. Otherwise headlamp control is automatic, from turning on automatically when ambient lighting levels fall to such a level where it is advantageous to have headlamps on, either to aid in illuminating the way ahead or facilitate being seen by others, to automatic dimming of high beam due to detection of oncoming vehicles and shut off when ambient lighting levels are sufficient. A possible control system for such purposes is described in U.S. Pat. No. 6,281, 632 by Stam, et-al from Aug. 28, 2001 titled: A Continuously variable headlamp control incorporated herein by reference. The patent describes how continuously variable headlamps offer greater flexibility for roadway illumination but offer challenges in automatic control design. Each continuously variable headlamp has an effective illumination range varied by changing at least one parameter from a set including horizontal direction aimed, vertical direction aimed, and intensity emitted. Stam discloses a system for automatically controlling continuously variable headlamps on a controlled vehicle includes an imaging system capable of determining lateral and elevational locations of headlamps from oncoming vehicles and tail lamps from leading vehicles.

Using a control system such as that above, many driver functions are automated. With the digital headlamp, automatic control of headlight beam is a function of speed of travel, that is: when vehicle is in Park the parking lights are on, when speed is low the lamp beam is aimed sufficiently forward to give ample reaction to brake for objects in the vehicle's path per the speed it is traveling up to the intensity, angle and thus distance which is the upper legal limit for the beam. If there is no oncoming traffic then it operates as the high beam. If there is oncoming traffic then it acts as the regular low beam.

Additional features can include an optional very narrow flashlight type of beam. Present day LEDs come in very narrow aimings such as two half angle 8 degrees which may not be narrow enough (a 10 meter spread for 150 meters down the road which may be sufficiently aimed to the right) but with need, smaller angles are also feasible. Such a beam at the correct narrow aiming can continue to illuminate far ahead (in high beam) without blinding oncoming traffic. Analysis by a detector or an imaging system of the oncoming vehicles position (using its headlights for example) can be used to determine which exact aiming is the maximum allowable for any given traffic situation and road layout.

Using color and pattern recognition techniques it is possible to determine what is a sign. It is then possible to provide the equivalent of "task lighting" and use the controller and properly aimed SLS to follow and illuminate distant overhead and roadside signs for a longer time, yet not blind oncoming traffic due to the narrow beam.

Wavelength specific SLSs in the infrared or near Ultra Violet spectrum, not visible to the driver by the unaided eye are used for communication between vehicles and roadway controllers or toll booths. Infrared SLS will provide radiation to be reflected from objects for night vision cameras. UV SLS are used for or illuminating UV fluorescent dyes in clothing bicycles and baby carriages to increase pedestrian visibility as is known in the art.

In FIG. 15 a headlamp 270 of a land, sea or air vehicle 271 is shown in front view 272, side view of a section 273 and top view of a section 274. A discreet SLS light source such as an LED 275 with specific location within the cluster 276 has a specific spatial light distribution, color wavelength and aiming relative to the vehicle, such as straight ahead, and or downwards and or off towards the right or left. The SLS may have one junction and be monochromatic or have a many junctions and provide a wide spectral power distribution and the power to the SLS may be varied. An SLS can also be a "white" LED. For example a typical "white" LED such as a Luxeon® white LED such as LXHL-XXXX will have a colder "bluish" 4,500K color temperature. LED 277 at a second location within the same cluster may have a similar or dissimilar aiming, wavelength and spatial light distribution. The concept cluster shown by the dashed lines, is used to describe a control function and is not necessarily related to contiguous placement. In general a cluster may be deemed a separate grouping due to a function it performs, either exclusively or in conjunction with other clusters or sub-clusters, such as high beam function versus a second cluster 278 which may provide a parking light function. The same SLS may be used, albeit at different intensities, for both the above functions and thus clusters may overlap and be discontinuous. As two LEDs may be of different wavelengths, operating in unison at different power levels will yield a variable light "color". A possible combination of two or more LEDs such as a blue, 470 nanometer and an amber 590, nanometer wavelength LED would yield a "white" light similar to the yellow tint of sunrise at the correct power intensity setting for each lamp. Coincidentally aimed LEDs 275 and 277, at the correct output intensity of each LED, with more power in the amber will accomplish this. Thus when following another vehicle, assuming, as drivers have reported, that they find yellow incandescent colored headlamps less offending than the HID blue-white color, the external controller 279 which receives traffic data from sensors 280 would shift wavelength specific radiant power contributions of SLSs such that the resultant on the CIE chromacity diagram would be yellowish. If however there is no car immediately ahead or oncoming traffic, then assuming as drivers reported they see further with bluish light, then the energy of the 490 nanometer LED is increased and the resultant color will shift to bluish white, allowing the driver to better ascertain road conditions further up ahead. The LEDs, their packages, wavelength and light source type are mentioned by way of example and it is clear that any other types of discreet light sources, such as the chip 95 of FIG. 6, with differing aimings wavelengths and distributions could be used to accomplish the same functions.

To further illustrate the innovative DLF headlamp device, a cluster 281 would be used to illuminate around a corner. Thus when the turn indicator has been selected or the steering wheel has been rotated by the driver, the DLF headlamp is powered by the controller to illuminate sideways at angles which according to the speed of travel is correct. (A driver can't make a 90-degree turn traveling 90 kph but from a stop, the turn may be around a corner.) In a preferred embodiment a multitude of LEDs in 281 are differently aimed in top view 274 showing the top view of the cluster 282 with SLS 283 angled less outwards and SLS 284 angled more outward with the forward aiming (distance ahead of the vehicle) of the more angled SLS 284, closer in for illuminating sharp turn, than that of the less angled SLS 283 for a shallow curve. Side sectional view 273 shows a general downward aiming with SLSs of front view 272 cluster 285 corresponding to cluster 286 shown from the side. The cluster 286 is the most angled downward such as for a slow driving as in a parking light type of application where the idea is not to cause glare yet be seen. The parking light function can also be done with higher angled LEDs by just lowering the intensity to very low non-glaring intensities. Cluster 287 of the front view would be the main illuminating workhorse and is shown in side view 273 as angled SLSs in cluster 288 and top view 274 as cluster 289. The top cluster 276 shown in side view 273, as 290 would perform alone or in tandem with part of 287 the high beam lighting function.

Many more degrees of flexibility are possible with the digital headlamp by varying the timing of the LED operation. For example, more intense illumination of red LEDs for a fraction of time would give the effect of flashing ambulance lights if required by the type of vehicle and could be effected by programming alone without the need for a different type of headlamp greatly reducing the different types of headlights that need to be installed on a vehicle or maintained in inventory. That is the same MSLS light engine device could be placed in different aesthetic packages by different manufacturers and could provide different functions. In one embodiment the digital headlamp carries out all the functions in a single unit 270. SLSs have different locations and aimings 291 and 292 to carry out the functions. In another embodiment 293 the spotlight sign illuminating function or corner lighting function is in a separate package 294 with its aiming 295. The low and high beam lighting is accomplished with fixture 296 and its general aiming 297. The separate units may be dictated by design or sales considerations and yield more flexibility but are within the scope of the overall integral digital lamp headlight device. The controller 279 will addresses the power supply of each DLF headlamp 270, 296 and 294 independently such that each lamp performs its functions separately.

Figure 16:
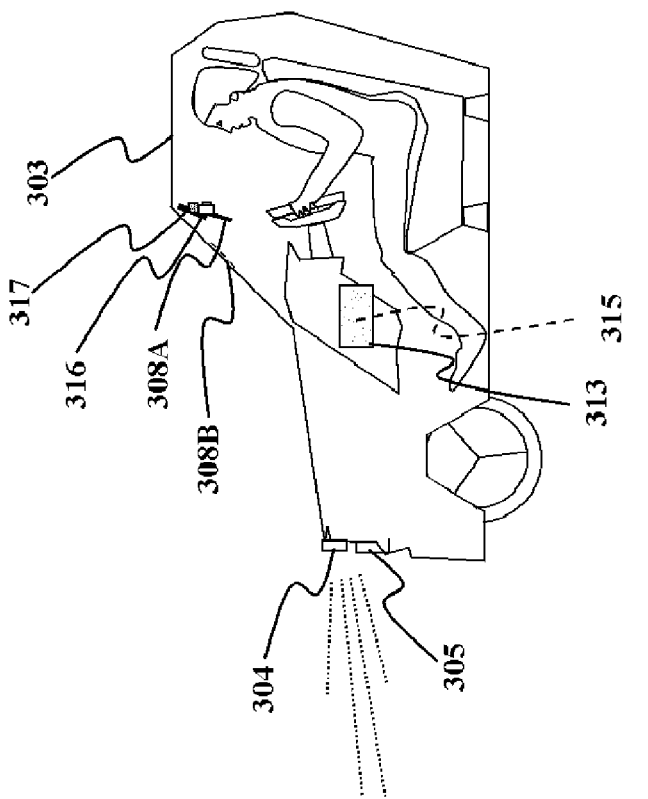
FIG. 16 is an illustration of an anti-glare system using the multiple light source headlamp.
Figure 16:
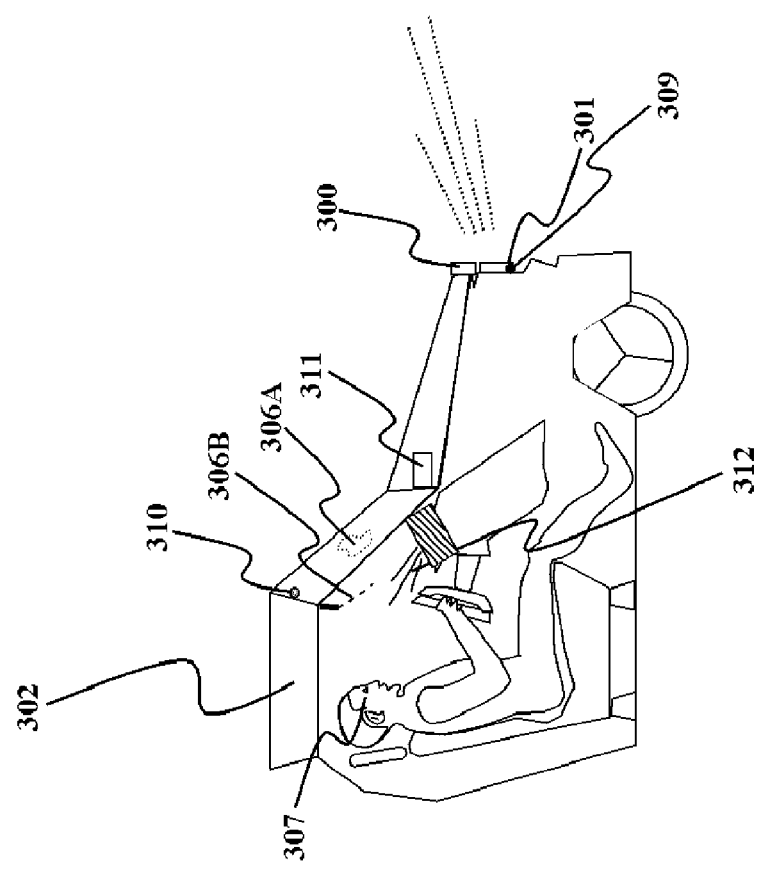

In another embodiment FIG. 16 the digital headlights 300 and 301 on vehicle 302 are also part of an anti-glare system operating between two or more vehicles 303. The system is designed to prevent discomfort and disability glare from oncoming headlights or glaring headlights viewed in the rear view or side mirrors. The anti-headlight-glare system works based on the "persistence of vision" of the human eye-brain system and is accomplished by the synchronization of the illuminating and light attenuating or blocking devices which intermittently enable the driver to see the night scene ahead but not the counter-timed glare of oncoming vehicles. The elimination of blinding glare will increase traffic safety, as a driver may lose vision may for a number of seconds following a glare event. It will also prevent driver fatigue caused by glaring headlights. Another of the advantages of the anti-glare system is that it increases the distance that a driver can see at night by allowing the use of more powerful headlamps aimed at higher angles, thus illuminating more of the road ahead while not blinding oncoming traffic. The anti-glare system consists of pulsed headlamps 304 and 305 on the oncoming vehicle 303 and a synchronized on/off switched light filtering or blocking element 306A in between the driver's eyes 307 and the glare sources 304 and 305. The light attenuating element is normally highly transmissive of light i.e., see—through. When energized, the light-attenuating element turns non-transmissive and attenuates or totally blocks the glare intensity. The attenuating element is similar in operation to the fast acting automatic darkening welding helmets commercially available, only here the off switching is also very rapid.

The glare, or light-attenuating element may be the windshield, a part of the windshield be a specific element located on or within the windshield 306A and 308A or on a visor located in front of the driver shown in 306B and 308B. The light attenuating device 306A or 306B is synchronized with the oncoming headlight such that when low-beam or even high beam, glare causing headlamps 300 and 301 of vehicle "one" 302 is "on" the light attenuating device 308A or 308B on vehicle "two" 303 is toggled into a mode which reduces or totally blocks the light beams. Conversely, in the next instant, when the headlamps 304 and 305 of vehicle "two" 303 is "on", that is, in the glare causing mode, the light attenuating device 306 on vehicle "one" 302 is switched into a mode, which reduces or totally blocks the light beams. The light-attenuating device 306A or 306B consists of an LCD, ferroelectric, SPD, electrochromic or any other medium that can be switched between substantially light transmitting to substantially light blocking in the form of a screen, visor or film. It may be placed on the windshield from without or within, in between the glass layers of the windshield safety glass 306A or positioned anywhere in between the drivers eyes and windshield 306B including being worn as eye glasses. A motorcyclist would have it installed in the visor of the helmet or on a windscreen. The speed of vision is slow relative to electronic pulsation and depending on the illumination level persistence of vision will fuse on/off levels into a constant flicker free level. Motion pictures operate at 24 frames per second. For scotopic nighttime levels 10 HZ is sufficiently flicker free while at high levels of illumination 60 Hz is required. Totally flicker-free operation is assured at 120 Hz operation even for peripheral vision which is more sensitive to movement.

LEDs are excellent light sources for a pulsed lamp since they are not damaged by on/off cycling (actually off-time adds to the overall lifetime) as are the prior-art incandescent and other cathode based lamps. Rise time to full output is on the order of microseconds, much faster than necessary. The pulsed SLS is operated at a higher power during the on-time of the duty cycle to offset for the off-time in order to produce the required illumination. This is typical of normal LED operation which may be run in DC mode or pulsed, AC operation. Actually, HID lamps cycle on/off at twice the line frequency and the eye integrates the light intensity over time. However, it should be understood that incandescent or any other lamp switchable within the constraints of the flicker free visual requirement are acceptable for use according to the teachings of this invention. In an alternative embodiment, the lamp may be a state of the art incandescent, halogen or HID lamp and the switching is accomplished by an additional light-attenuating element placed in front of the light source. Alternately, electronic signal control circuitry can rapidly switch an HID or incandescent headlamp used in the anti-glare system. The lamp need not totally turn off, the requirement is that during the seeing portion of time when the driver's light attenuating element is letting light through un-attenuated, the light intensity reaching the eye is non-glaring. Therefore it shall be considered that present state of the art incandescent and HID headlamps operated in a pulsed mode fall under the realm of the present invention. That is, any headlamp system where the high beam is toggled such that it is synchronized with a light-blocking element before the driver's eyes in the approaching vehicle is included within this disclosure. It is also to be understood that the headlamps when not in high beam mode may not be totally off rather they can be in a non-glaring low beam mode. This leaves the vehicle visible to oncoming traffic.

It is to be understood that for the system to work, all oncoming vehicles using high beam synchronized blocking must be working according to the same timing among them versus all the traffic headed in the opposite direction. A timing protocol based on major heading determines the synchronization. Thus, on a substantially north south route, a train of traffic headed north will all be similarly timed and counter synchronized with all southbound traffic. The blocking screen's timing is synchronized with the oncoming high beam headlight's timing either universally, through a global clock system such as that of the global positioning system GPS or the National Institute of Standards and Technology atomic clock broadcast over radio station WWVB located in Fort Collins, Colo. or locally through communication among vehicles in proximity to being within the line of sight. A combination of directional data together with a timing protocol based on direction will determine the synchronization among proximate north/south and east/westbound vehicles. The vehicles direction data is derived from an onboard compass or gyro or GPS to eliminate the influence of roadway curves in cases of borderline directionality, the vehicle's direction for synchronization is not the instantaneous reading but rather is based on distance traveled over time and previous headings history. A stop and turn for example will change the synchronization while a smooth curve will wait for an oncoming cars synchronization to indicate that the road ahead is actually in a new heading unless sufficient elapsed time makes it clear the car is on a new course. The protocol will give benefit to the north on a 45 degree North/East heading and to the south on a 135-degree heading. GPS location and route recognition can also be used to set synchronization protocols for opposing vehicles. In one embodiment, the communication between vehicles for synchronization is effected through the headlamps themselves either through modulations in visible light LEDs of the digital headlight itself or with LEDs, radio or infrared emitters dedicated for the purpose 173. Detectors 174 on the vehicle, pick up the signal and signal-processing equipment passes the information on to the controlling unit 175.

Glare attenuating elements can be placed over the mirror surfaces or the side windows where the glare from the side mirrors passes. Thus not only the glare from oncoming headlights through the windshield is blocked but also glaring beams emanating from following vehicles, reflected off the rear and side view mirrors is controlled. To eliminate glare off the mirror 176 from reaching the driver's eyes from the side mirrors 177, a pulsed blocking screen or film 178 is placed on the driver facing side of the mirror's the reflecting surface. Similarly a rearview mirror 179 is embodied with a pulsed blocking screen or film. The timing of the modes in this instance is such that the light-attenuating mode occurs at the same time as the glaring or high beam headlamp mode since all cars in the same direction are in glaring mode at the same instant. All mirrors are synchronized to block the headlight glare coming from the rear which are on at the same synchronization time as that of the first lead vehicle in the traffic train.

In another embodiment additional information used to control the headlight aiming can come from analysis of the driver's eye movement and gaze. The headlight aiming system obtains information from a driver eye tracking system concerning the driver's gaze (i.e. what the driver is looking at). Analysis of saccade can be used to instantaneously predict where the driver will end up looking and the headlight intensity in that aiming changed to illuminate the area where the driver wishes to see in advance of the driver's re-accommodation. A machine vision system using pattern recognition and other object identification techniques to discern eye gaze direction, is contrived of the camera 316 with a view of the driver's eyes, infrared emitters 317 and the computer logic system 311. The data obtained is analyzed according to eye tracking methods and algorithms known in the art of in a computer routine 7A to adjust the light aimings of the headlamps according to the drivers gaze at required intensities. The allowed intensities at any aiming take glare considerations into account so as not to cause offending glare. In another embodiment an outward and inward facing camera 316 is used to acquire both images of the scene ahead and the driver's gaze and using both sets of data adjust the headlamp illumination.

Accordingly it has been illustrated in the streetlight and headlamp application the benefit of a multiple-light source illuminating device. The flexible characteristics of the DLF allow for spatial variations of the intensity and spectral power distribution of the light over the area covered. When the element of variation of intensity and SPD with time over the area covered is introduced another dimension of flexibility is introduced. These properties are unique to the DLF and allow them to deal with dynamic lighting situations in away not afforded by prior-art lighting devices. When combined with devices capable of detection changes in the surrounding environment the flexible DLF is capable of changing the illumination so as to provide the optimal lighting solution in real-time.

Figure 17:
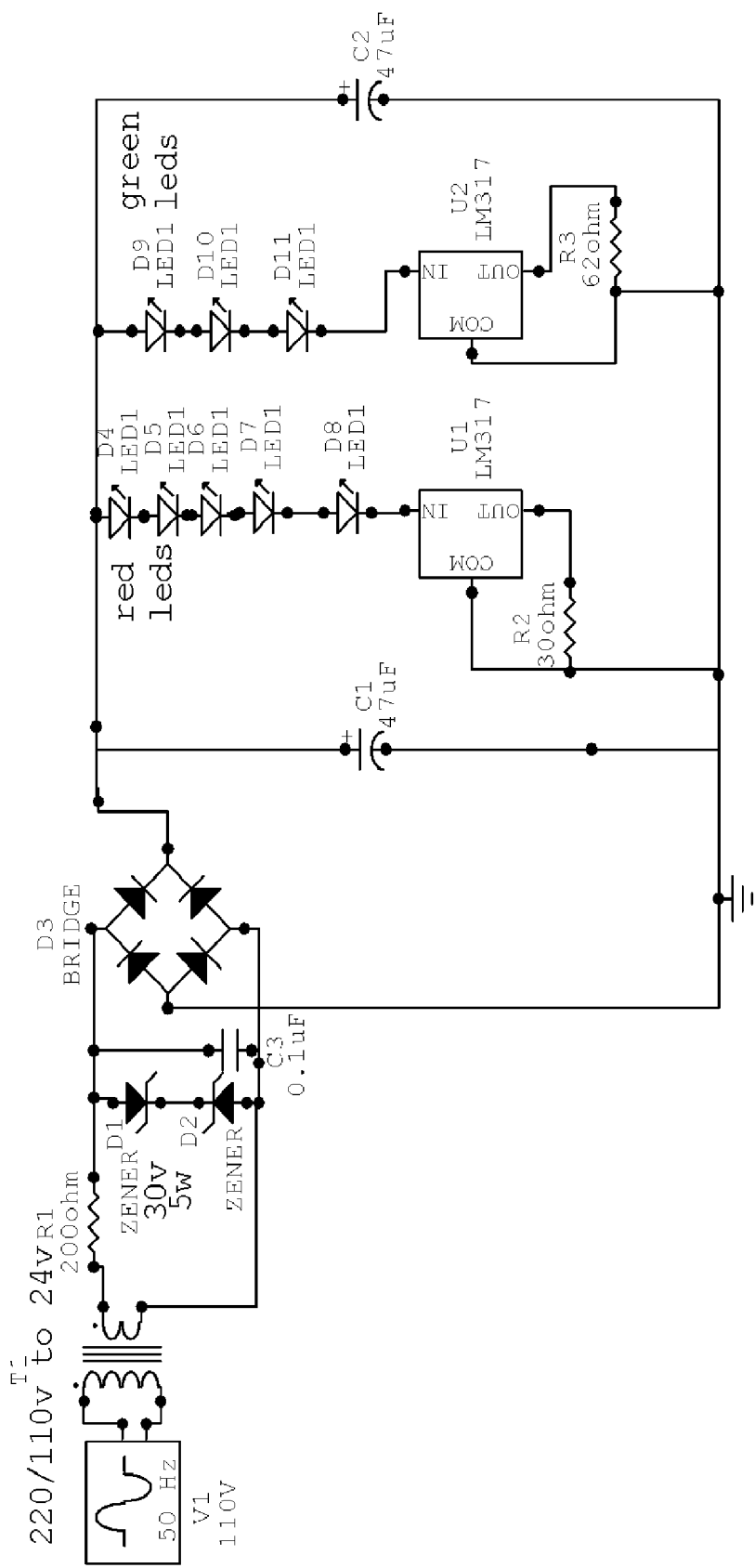
FIG. 17 a representative Electronic Power Supply Unit for Surface or Railing Mounted Luminaire.

FIG. 17 illustrates a power supply circuit used on a DLF such as the Surface or Railing Mount Discrete 66 or Distributed 70 Digital Lighting Fixture of FIGS. 4 and 5. The circuit controls current and illustrates the use of two disparate LED sets one red colored with specific voltage and current characteristics and the other green colored with its own voltage characteristics. When operated in this quanta and regime of voltage and current the combined output light is whitish in color according to the earlier teachings of this disclosure.

It has been shown a method and apparatus comprising a multiple light-source illuminating device, the design and construction of which is derived from the lighting requirements of the specific application back up to electroluminescent light source. The resulting illuminating device 16 provides illumination according to the principles of correct lighting practice for the optimal performance of visual tasks in the most efficient, cost effective manner. Coupling with sensors 21 and logical control 20 allows illumination intensity and spectrum to be varied according to changing user needs. The integrated device incorporates ancillary electronic circuits for power, detection and control that best take advantage of the small size, compact beam spread, low operating voltage and long lifetime of solid state electroluminescent light sources and constitutes a complete lighting fixture design. The lighting fixture is comprised of multiple discrete light emitting components of different spatial intensity distribution and color spectrum mounted in specific orientations such that the application oriented combined lighting effect is created. The control is provided via a differentiated power supply 19 capable of affecting the current, voltage and duty cycle determining the relative contribution of each light source effecting a different spatial intensity distribution and color spectrum. Aspects of the invention include: lighting fixtures which adapt to ambient lighting, movement, visual tasks being performed, perform self-calibration feature to compensate for LED aging; lighting fixtures having spatial distribution of spectrum and intensity, providing both "background" room lighting, and "task" lighting, said spatial distribution of spectrum and intensity, further including positional dependence of spectrum vs. intensity and a specified design range of spectrum vs. intensity. A number of specific designs based on these capabilities are presented. The teachings of this invention are meant to illustrate the design methods, devices and construction of multiple light source luminaires. The methods and devices taught in on embodiment are not restricted thereto but may be applied to other embodiments. It is possible mix and combine the features of one embodiment with another to create a DLF with differing characteristics as taught in the method herein.

There has thus been shown and described, among other things, a multiple-source lighting technology which allows for the design and construction of illuminating devices. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention without departing from the spirit or scope of the following claims.

The invention claimed is:

1. An illuminating device intended for positioning relative to one or more predetermined surface areas having an overall light distribution pattern calculated to efficiently illuminate the predetermined surface areas with a design illuminance and color, comprising:
   a) a multiplicity of light sources having respective spectral distributions and respective light intensity distribution patterns which are directional about an axis and subtend lesser angles than those of the overall light distribution pattern, and
   b) a light source mounting structure configured to mount the light sources.
   c) a positioning apparatus to uniquely affix the structure relative to the predetermined surface areas to be illuminated,
   d) where said light sources are uniquely disposed on the structure relative to the positioning apparatus and angularly mounted on the structure with the light distribution axis having a vertical angle α from the nadir and a radial angle β relative to the positioning apparatus and
   e) where said unique disposition and angular mounting is determined by the greater or lesser luminous intensity required from portions of the relatively positioned lighting fixture structure so as to substantially illuminate the predetermined surface areas with the design illuminance,
   whereby the respective directional light distribution patterns and the respective sectral distributions combine to form the overall light distribution pattern calculated to efficiently provide the predetermined surface areas with the design illuminance.

2. The illuminating device of claim 1 further including apparatus uniquely orienting the structure relative to the predetermined surface areas.

3. The illuminating device of claim 1 wherein the respective spectral distributions combine to form the overall light distribution pattern calculated to efficiently provide the predetermined surfaces with the design illuminance and color.

4. The illuminating device of claim 1 wherein the predetermined surface areas are equidistant from the light source and the design illuminance on the respective predetermined surface areas are not equal.

5. The illuminating device of claim 1 wherein the predetermined surface areas are non-equidistant and the design illuminance on the respective predetermined surface areas are equal.

6. The illuminating device of claim 1 wherein any of the design illuminance and color is any of different and similar combinations for respective predetermined surface areas.

7. The illuminating device of claim 1 wherein the design illuminance level is uniform illumination over to at least one of the surface areas and a certain height relative to the surface areas irrespective if the surface area is directly below the illuminating device or off in a distant corner of a room.

8. The illuminating device of claim 1 wherein the design illuminance level is increased task lighting illuminance on certain surface areas and general lighting illuminance level over the rest of the surface areas.

9. The illuminating device of claim 1 wherein the light source is at least one of substantially monochromatic LEDs and white LEDs.

10. The illuminating device of claim 1 wherein the illuminating device is a luminaire based on specific lighting application criteria according to principles of correct lighting practice to provide the design illuminance and color such that the luminaire provides a controlled illumination intensity, spectrum, luminous exitance and spatial distribution of intensity and spectrum, suited to the specific lighting application, and optionally where the luminaire design criterion includes any items from the list comprised of: a requirement of maintaining an acceptable continuum of spatial illumination and a requirement of maintaining an acceptable continuum of spatial color effects and the requirement for maintaining an acceptable glare rating for the luminaire.

11. The illuminating device of claim 10 wherein the intensity, spectrum, and spatial distribution of intensity and spectrum is adjusted for changes in a living space to be illuminated in accordance with the lighting application comprising:
  (a) a means for sensing the changes; and
  (b) a means for changing the light emanating characteristics of the light sources, thereby providing the correct intensity, spectrum, and spatial distribution of intensity and spectrum as a function of time.

12. The luminaire of claim 10, further including any digital lighting fixture accessory items from the list comprised of:
  (a) a power connection apparatus in communication with the mains power;
  (b) a power supply element providing current at a voltage to the light sources and other ancillary equipment;
  (c) a differentiated power supply element capable of varying power to the respective light sources said power supply arranged to effect an independent electric power signal differentiated in voltage, current or frequency to the respective light sources or group of light sources;
  (d) a controller for adjusting the power signal to the light sources such that a particular amount of power supplied to the light source generates a corresponding intensity and provides the correct intensity, spectrum, and spatial distribution of intensity and spectrum for the lighting application;
  (e) a storage media device capable of storing and recalling stored data relating to performance, algorithms and lighting parameters;
  (f) a controller capable of receiving inputs and by means of recalling stored parameters, processing algorithms, and calculating results, generates output control signals to adjust the illuminance according to the correct lighting practice;
  (g) a photosensor for providing light spectrum and intensity information to the controller, said information for use in said adjusting;
  (h) a motion detector for providing occupant sensing information to the controller, said information for use in said adjusting;
  (i) a communications element coupled to the controller comprised of a receiver for receiving a data signal from an external device;
  (j) a communications element coupled to the controller comprised of a transmitter for transmitting a data signal to an external device;
  (k) a remote control man-machine interface input device capable of communicating data with the communications element;
  (l) a machine vision system comprised of an imaging device, and object recognition coupled to the controller and
  (m) a mechanical assembly for the support of light sources, power supplies, controllers, sensors and other ancillary equipment.

13. The illuminating device of claim 10, having a controller for adjusting a power signal to the light sources is selected from the list consisting of:
  (a) an open-loop controller, factory programmed, for use in general lighting according to correct lighting practice;
  (b) an open-loop controller, user-programmed, by use of a programming method taking into account the lighting requirements of the environment in which the luminaire is to be used;
  (c) a closed loop controller, user-programmed, by use of a programming method taking into account the lighting requirements of the environment in which the luminaire is to be used;
  (d) a closed loop controller user-programmed, by use of a programming method taking into account the lighting requirements of the environment and self-adjusting in response to the changing lighting requirements of the environment in which the luminaire is located;
  (e) a closed loop controller, self-adjusting in response to the lighting requirements of the environment in which the luminaire is located, without pre-programming.

* * * * *